United States Patent [19]
Edelman et al.

[11] Patent Number: 5,136,687
[45] Date of Patent: Aug. 4, 1992

[54] CATEGORIZATION AUTOMATA EMPLOYING NEURONAL GROUP SELECTION WITH REENTRY

[76] Inventors: Gerald M. Edelman, 35 E. 85th St., New York, N.Y. 10028; George N. Reeke, Jr., 430 E. 63rd St., #11E, New York, N.Y. 10021

[21] Appl. No.: 419,524

[22] Filed: Oct. 10, 1989

[51] Int. Cl.$^5$ .............................. G06F 15/00
[52] U.S. Cl. ............................. 395/22; 295/21
[58] Field of Search ................ 364/513, 201, 807

[56] References Cited

U.S. PATENT DOCUMENTS

| | | | |
|---|---|---|---|
| 4,044,243 | 8/1977 | Cooper et al. | 235/152 |
| 4,146,924 | 3/1979 | Birk | 364/513 |
| 4,254,474 | 3/1981 | Cooper | 364/900 |
| 4,305,130 | 12/1981 | Kelley | 364/513 |
| 4,319,331 | 3/1982 | Elbaum | 364/515 |
| 4,326,259 | 4/1982 | Cooper | 364/715 |
| 4,739,476 | 4/1988 | Fiduccia | 364/200 |
| 4,796,199 | 1/1989 | Hammerstrom et al. | 364/513 |
| 4,852,018 | 7/1989 | Grossberg et al. | 364/513 |
| 4,884,216 | 11/1989 | Kuperstein | 364/513 |
| 4,918,617 | 4/1990 | Hammerstrom et al. | 364/513 |

OTHER PUBLICATIONS

Rumelhart, D. E. et al., *Parallel Distributed Processing—Explorations in the Microstructure of Cognition*, vol. 1, pp. 318-361, 1986.
Linsker, R., "Self-Organization in a Perceptual Net- (List continued on next page.)

Primary Examiner—Michael R. Fleming
Assistant Examiner—Robert W. Downs

[57] ABSTRACT

An apparatus capable of sensing the presence of objects in its environment, categorizing these objects without a prior description of the categories to be expected, and controlling robotic effector mechanisms to respond differentially to such objects according to their categories. Such responses include sorting objects, rejecting objects of certain types, and detecting novel or deviant objects. The invention includes a device called a "classification n-tuple" (of which a "classification couple" is a special case) capable of combining signals from two or more sensory modalities to arrive at the classification of the object.

The invention operates by simulating certain features of animal nervous system, including neurons with responses determined at each moment of time by inputs received along synaptic connections from sensory means or form other neurons. In this invention, neurons are arranged in "groups", which permits them to act cooperatively while still retaining characteristic individual responses. Groups in turn are arranged in "repertoires", which provide a totality of response specificities sufficient to respond to any of a range of possible input objects. Some of these repertoires are organized as "maps", such that groups responding to inputs that are similar along some dimensional (spatial or abstract) are close together in the repertoire, enabling the repertoire to respond correctly to novel objects that are similar to objects it has encountered previously. Maps in this invention are linked by connections, called "reentrant" connections, that enable the responses of one map to be reentered into the system as inputs to another map. Reentrant connections permit signals from different sensory modalities to be correlated in an ongoing fashion, and they are the basis for the operation of classification n-tuples.

The responses of the apparatus of this invention may be improved and optimized for a particular task through the operation of "neuronal group selection", a process which enhances the responses of those neuronal groups in the apparatus which were active in some time interval preceding the production of a useful output action. This process operates by modifying the strength of selected synaptic connections. The value of various output actions is determined, for the purpose of regulating selection, by means which are internal to the apparatus of this invention. Accordingly, the invention is capable of self-organization and learning, and does not require a predetermined specification of correct responses for all possible inputs.

20 Claims, 59 Drawing Sheets

OTHER PUBLICATIONS work", *IEEE Computer*, Mar. 1988, pp. 105–117.

Josin, G., "Neural Network Heuristics", *Byte*, Oct. 1987, pp. 183–192.

Carpenter, G. et al., "The Art of Adaptive Pattern Recognition by a Self-Organizing Neural Network", *IEEE Computer*, Mar. 1988, pp. 77–88.

Edelman et al., "Selective Networks Capable of Representing Transformations, Limited Generalizations, and Associative Memory", *Proc. Nat. Acad. Sci., Biol. Sci.*, 1982, vol. 79, No. 6, pp. 2091–2095.

Finkel et al, "Computer Simulations of Dynamic Functional Changes in the Topographic Maps of Adult Animals", 1989 IEEE Conf. on Neural Information Processing Sys.—Natural and Synthetic.

Zipser et al, "A Back-Propagation Programmed Network That Simulates Response Properties of a Subset of Posterior Parietal Neurons".

Hopfield, "Neural Networks and Physical System with Emergent Collective Capabilities".

Kuperstein, "Neural Model of Adaptive Hand-Eye Coordination for Single Postures".

Finkle et al, "Interaction of Synaptic Modification Rules with Populations of Neurons".

Reeke et al., "Selective Neural Networks and Their Implications for Recognition Automata", *Internat. Journal of Supercomputer Applications*, vol. 1, No. 1, Spring 1987.

Barto et al., "Gradaent Following Without Back--Propacation in Layered Networks" pp. 629–636.

Pearson et al., "Plasticity in the Organization of Adult Cerebral Cortical Maps", Jour. of Neuroscience, Dec. 1987, vol. 7, No. 12, pp. 4909–4923.

Hopfield et al., "Computing with Neural Circuits: A Model".

Reeke et al., "Selective Networks and Recognition Automata".

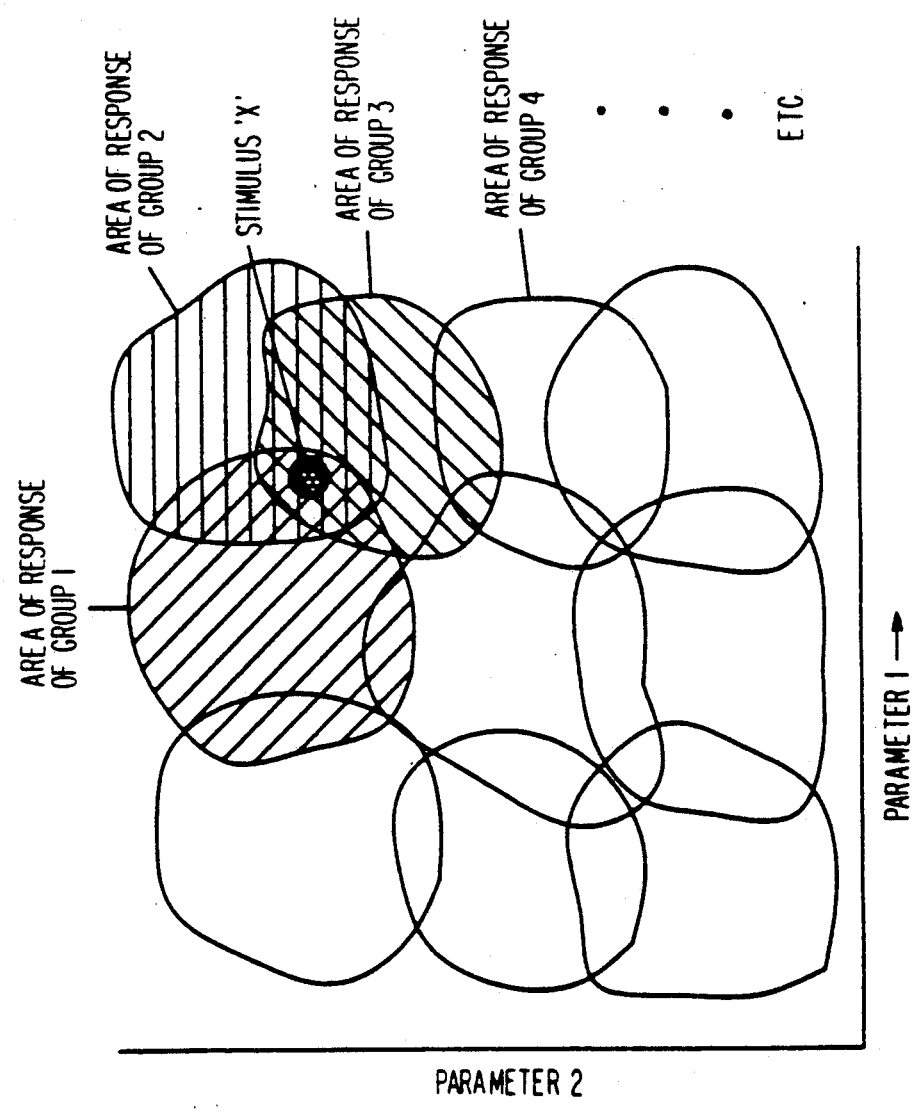

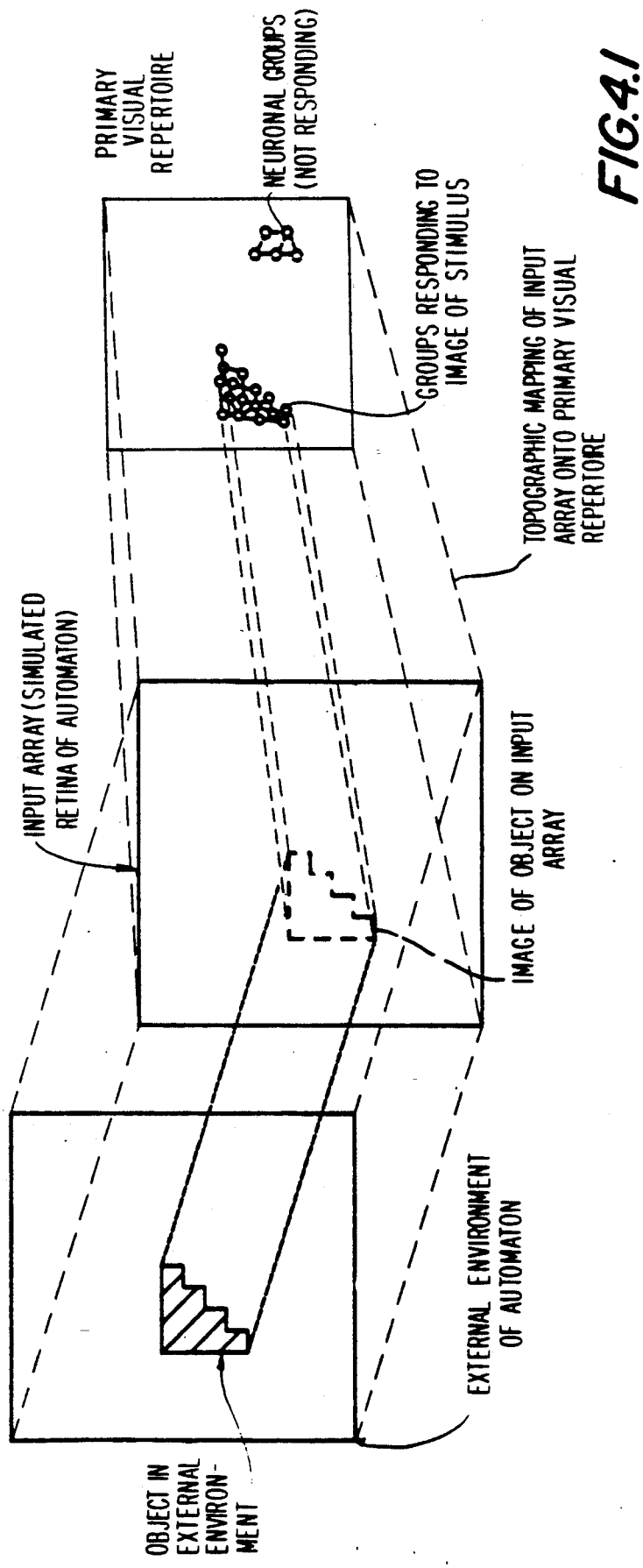
FIG.4.1

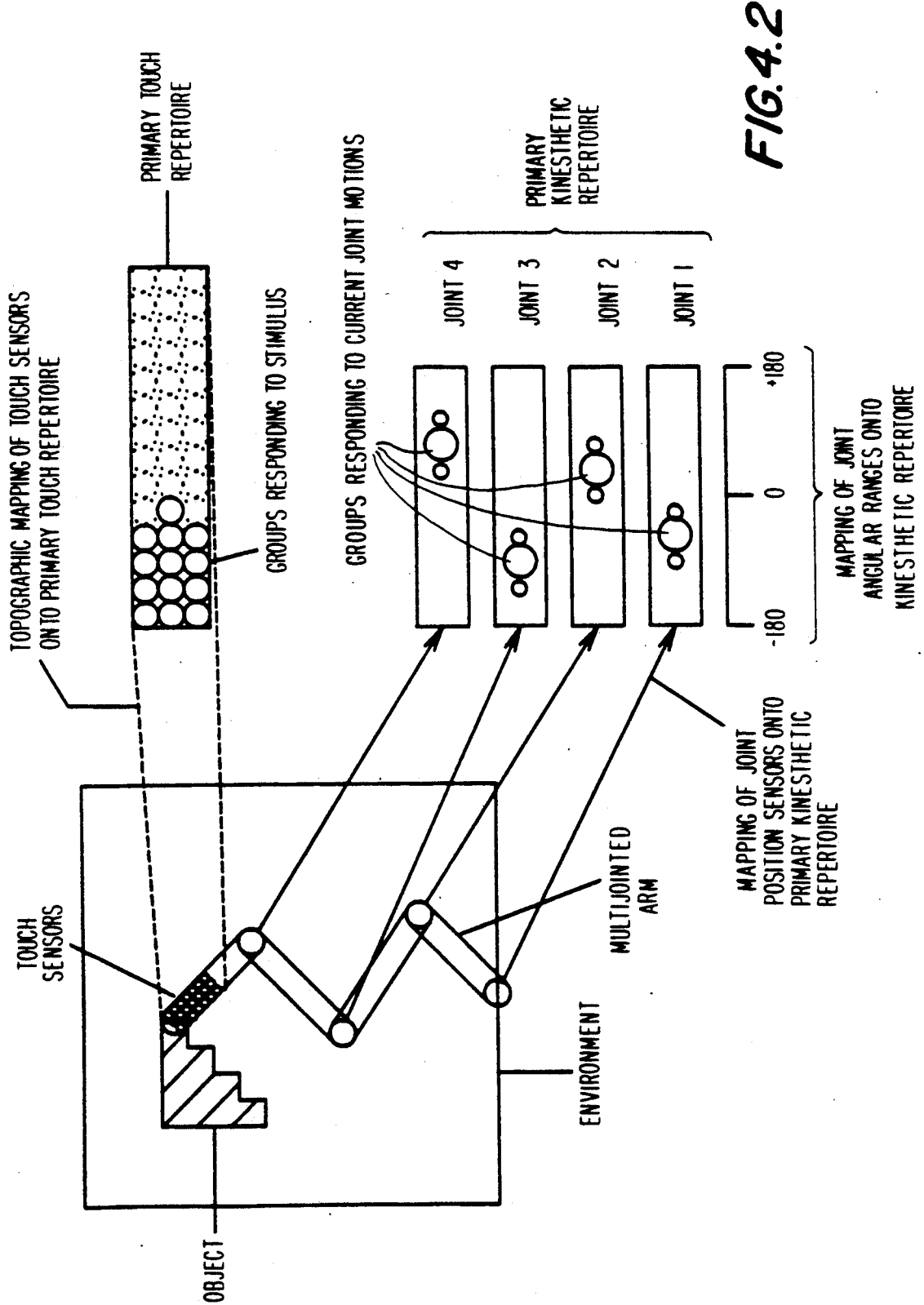
FIG.4.2

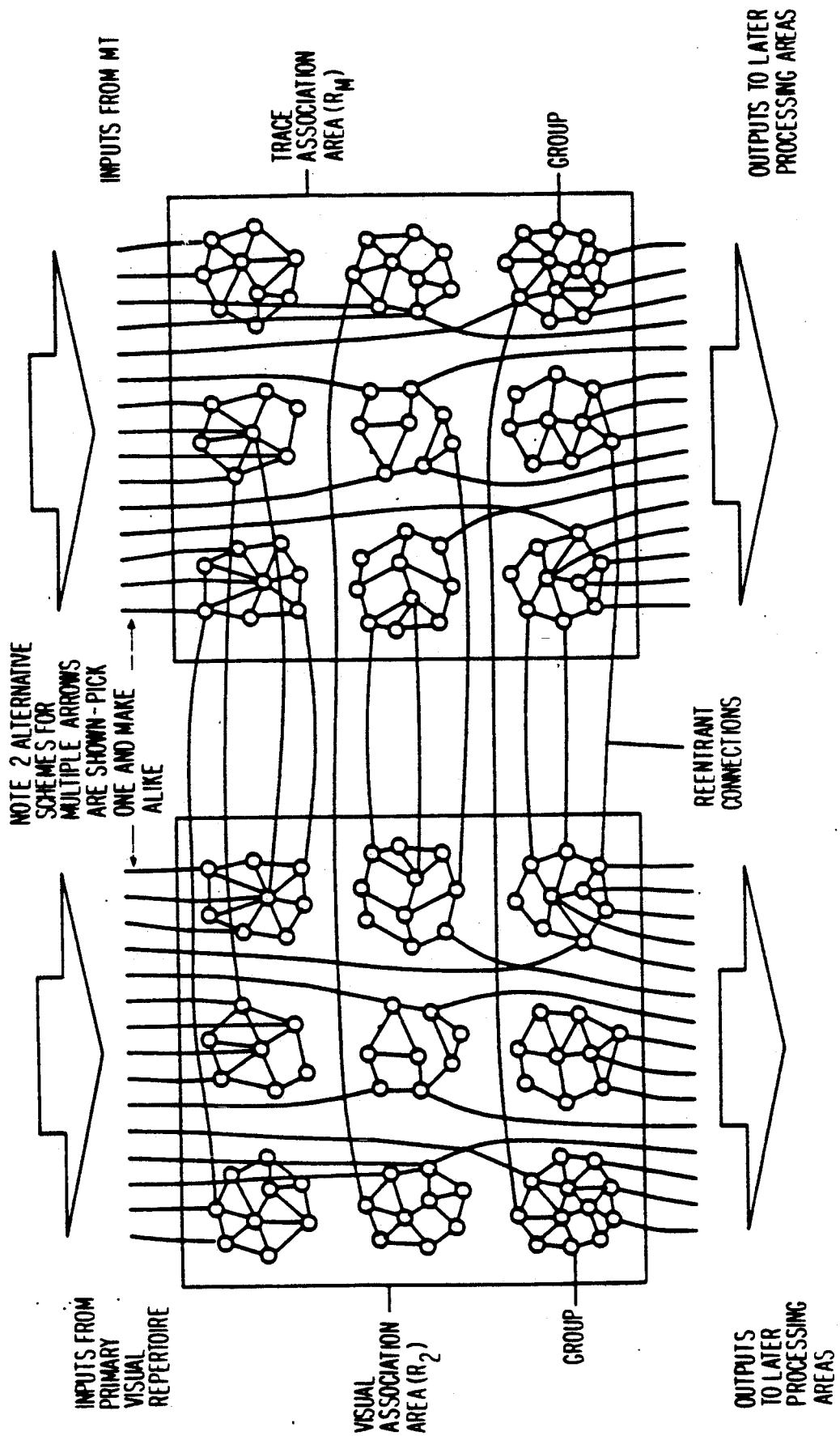

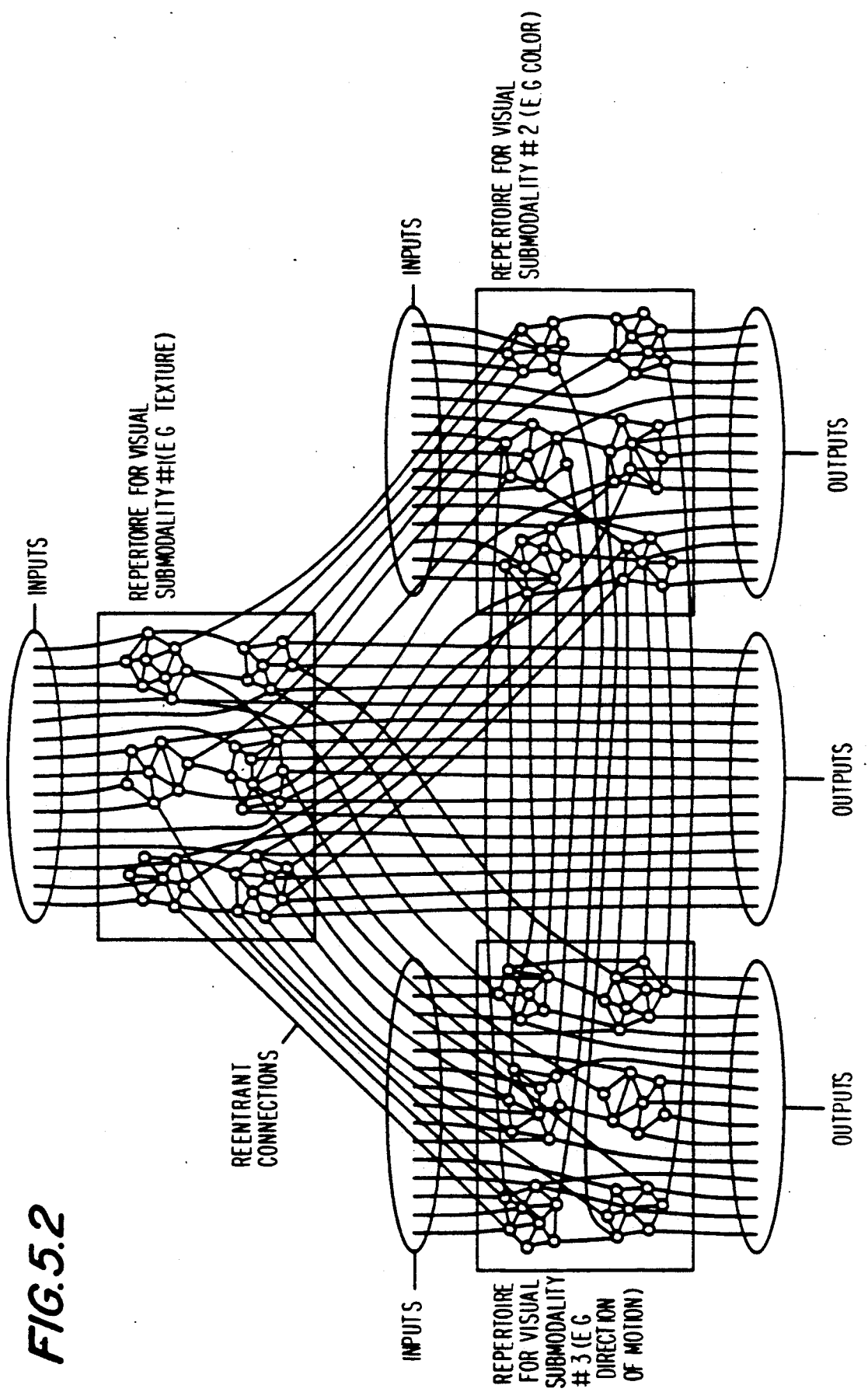
FIG.5.2

NOTE • INDICATES STEPS WITH MORE
DETAILED FLOWCHARTS IN FOLLOWING FIGURES

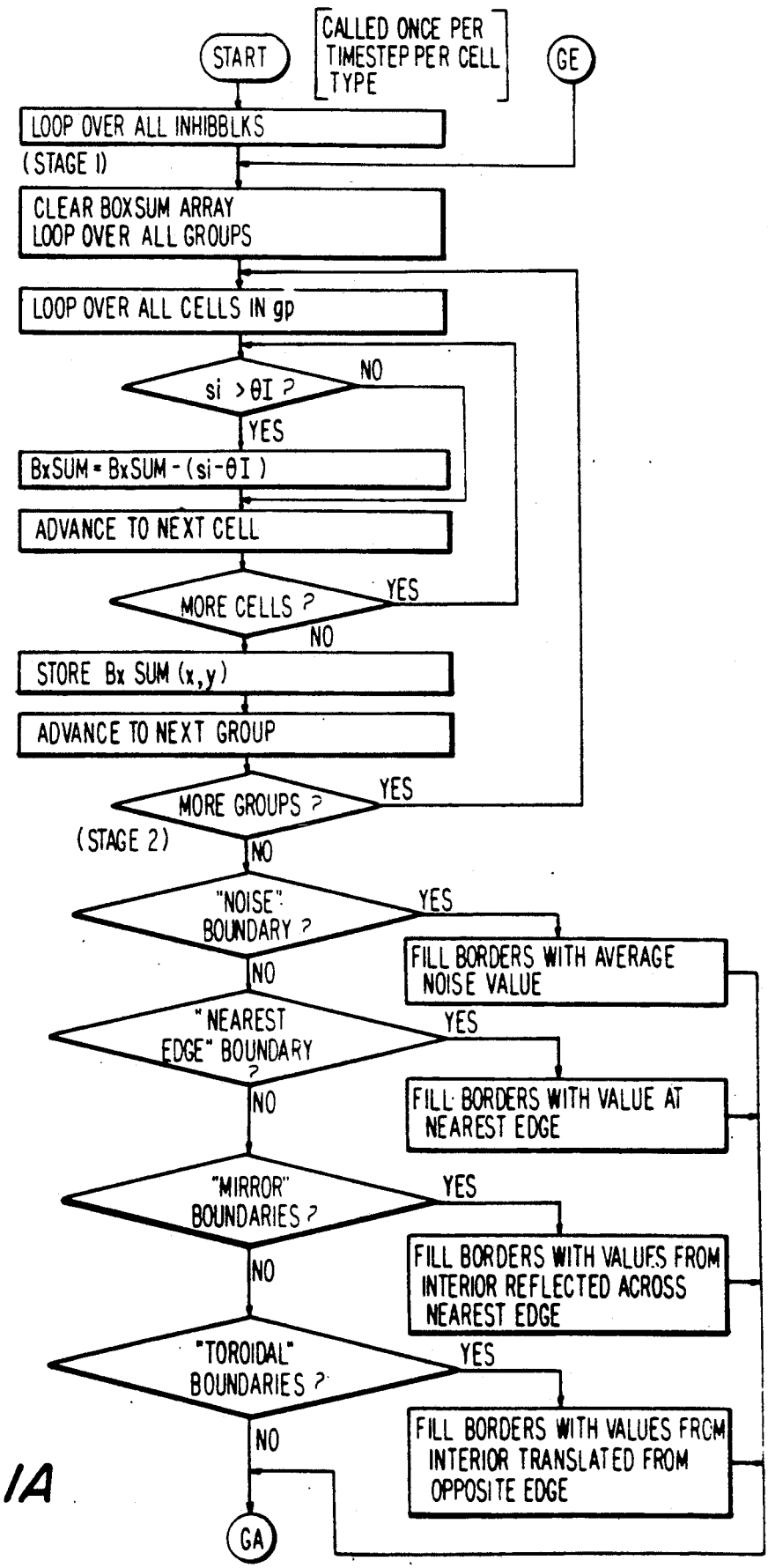
FIG.23.1A

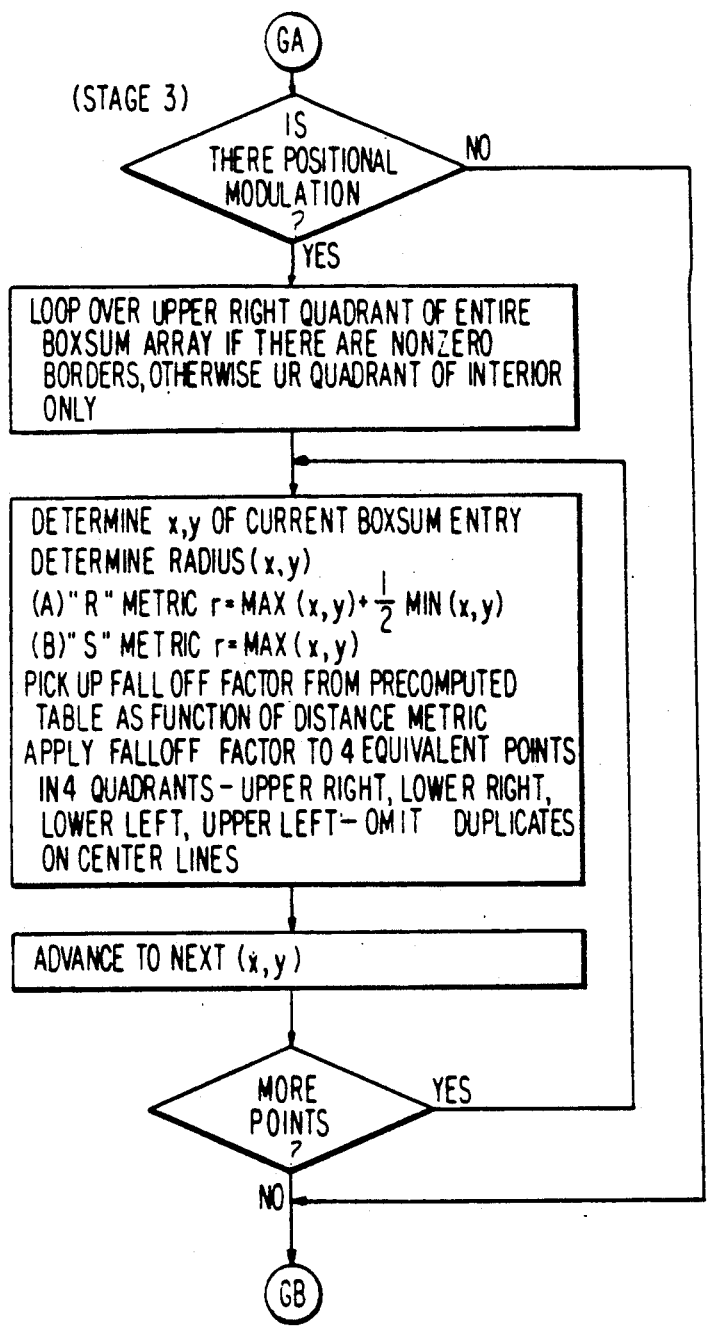
FIG. 23.1B

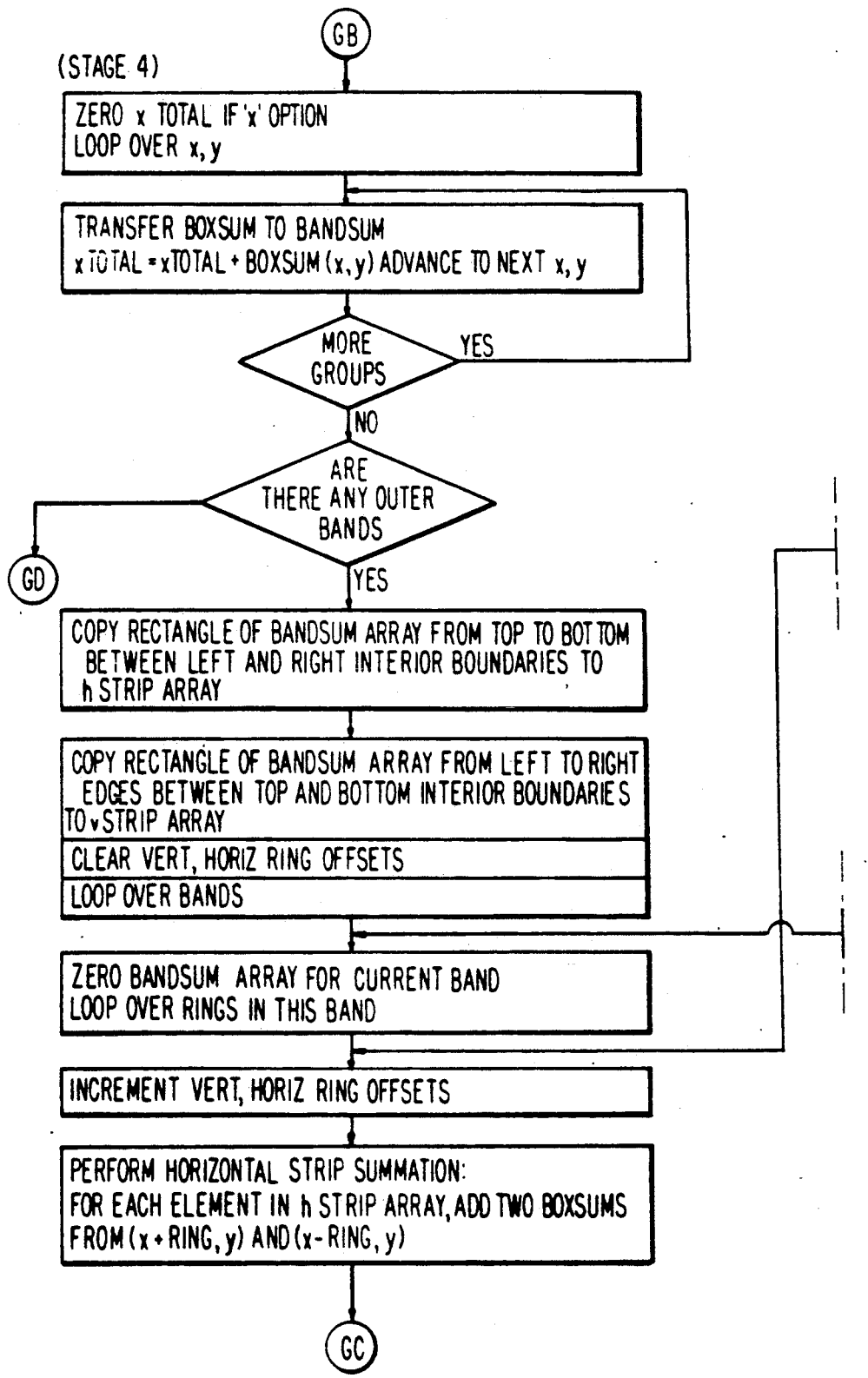
FIG.23.IC

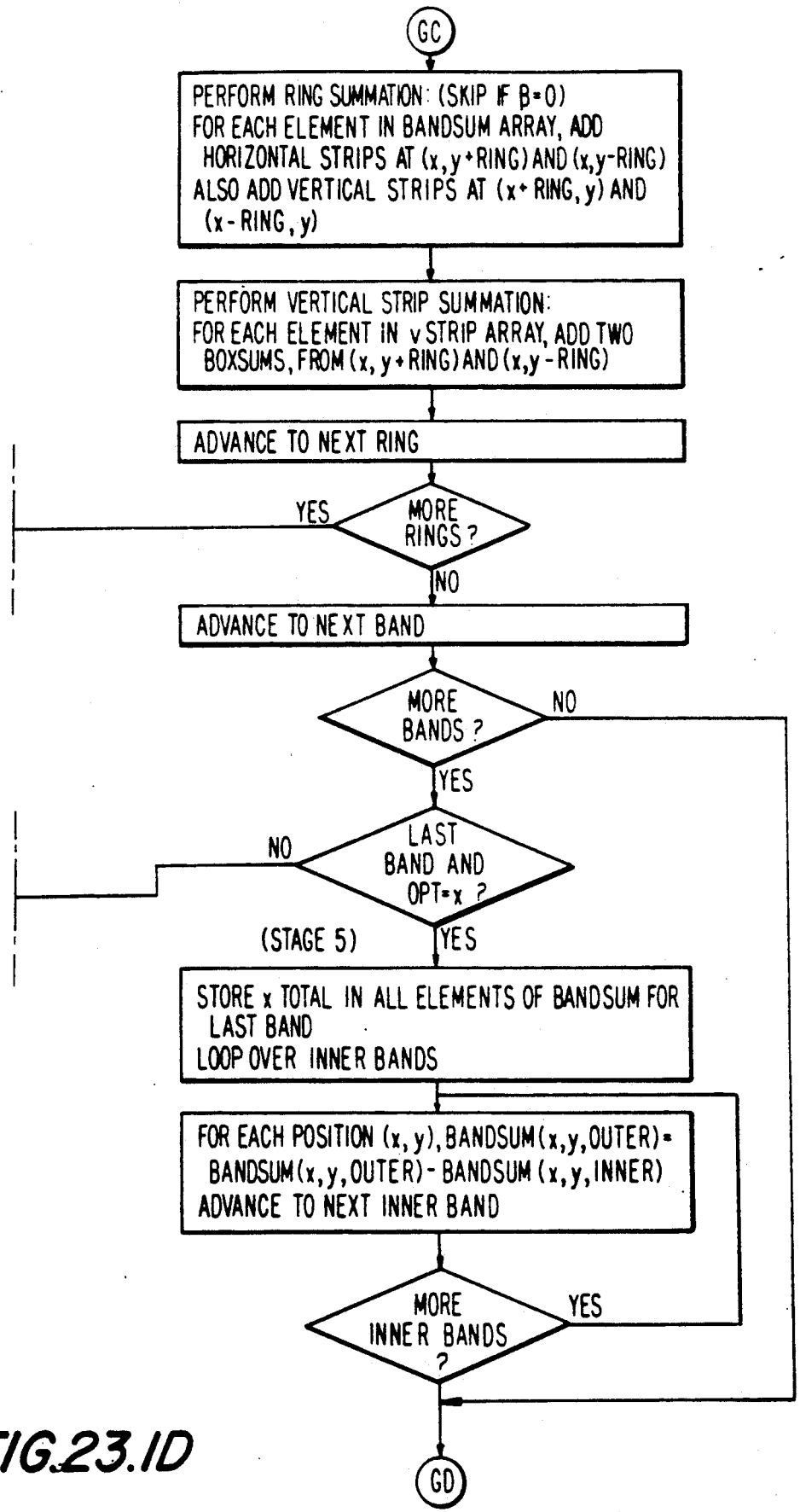
FIG.23.1D

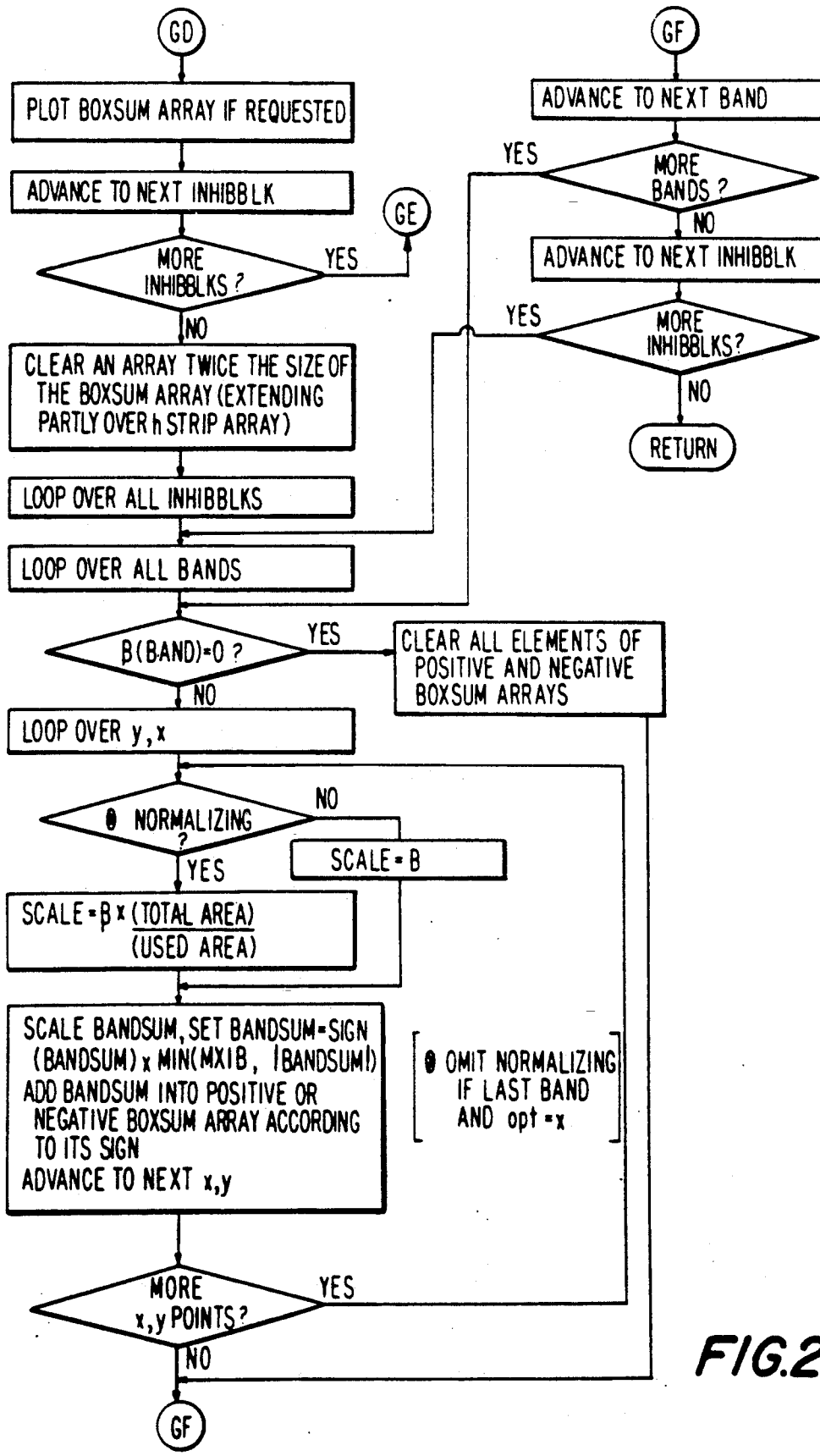
FIG.23.1E

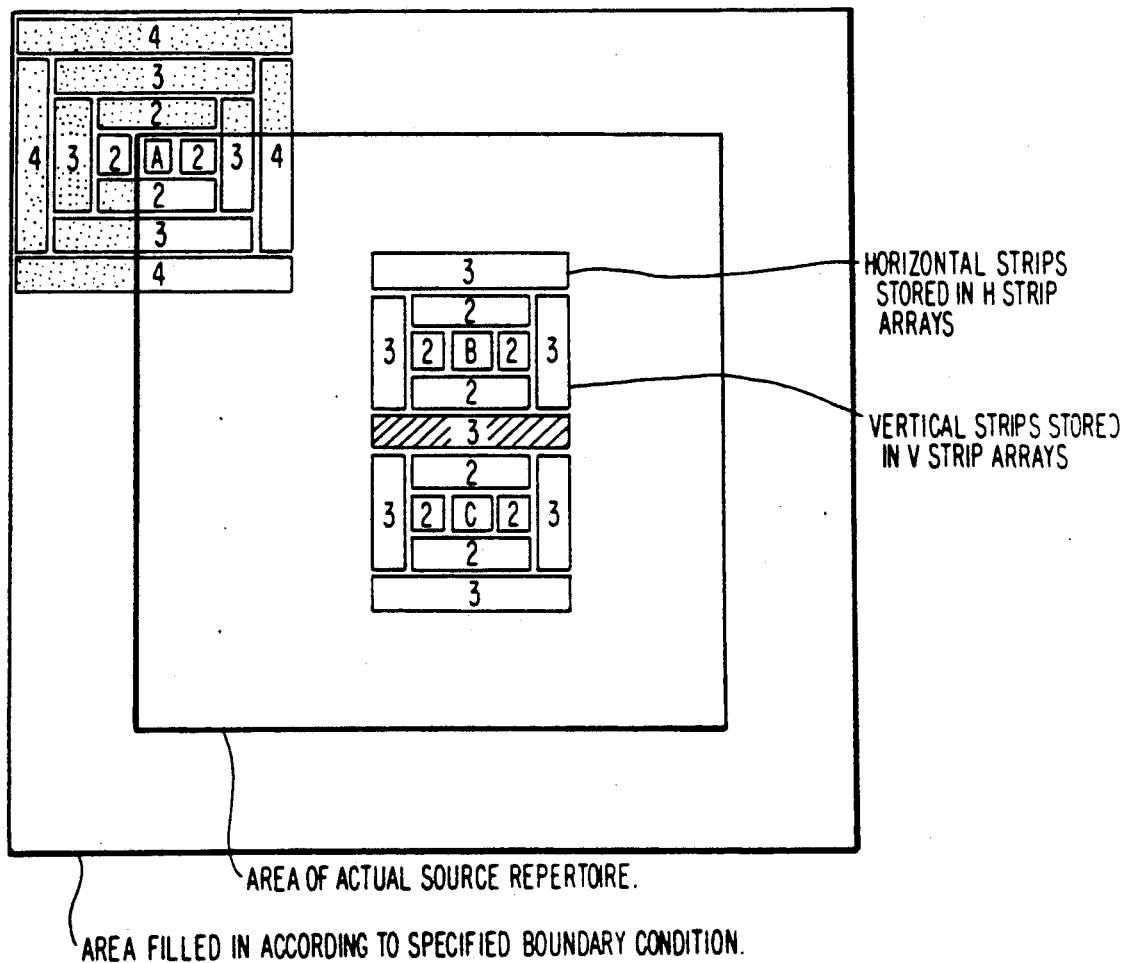
FIG.23.2

CATEGORIZATION AUTOMATA EMPLOYING NEURONAL GROUP SELECTION WITH REENTRY

BACKGROUND OF THE INVENTION

This invention relates to neuronal network simulation and in particular to the use of simulated neuronal networks in computerized apparatus called "automata" for performing basic intellectual and physical tasks. Such tasks may include as an example the recognizing, discriminating, and sorting of various objects or inputs.

The simulated networks and the automata of the present invention are distinguished by their ability to learn as opposed to the mere training of sensorimotor components. During use they develop or improve the criteria by which they recognize and discriminate between input signals. They are capable of categorization, association, and generalization and capable of adaptive behavior based on these abilities. Thus, in use the networks and the automata of which they are a part do not require pre-programming that anticipates all possible variants of the input data they will receive, nor do they have to be pre-programmed with information anticipating the relation of the input data to the output operations of the automaton.

The foregoing features are observed in natural creatures and it has long been the goal to develop neural network simulations that would exhibit them. However, nervous system function is not currently accessible to detailed experimental analysis at the level of adaptive behavior. Prior attempts to simulate nervous system function have relied upon analogy with certain features found in natural neural systems but have been limited in their success. To that end there has been extensive study of the physical characteristics of neural networks in organisms. At present two things are undeniably clear about such systems. First, the physical characteristics of the naturally occurring systems (e.g. the neurons or synaptic junctions) are extremely complex and the number of parameters that are necessary completely to describe such a system is vast. The selection therefore of a group of characteristics that might enable operation of an artificial neural system on a useful level is an extremely complex problem that could hardly be carried out without some kind of automated method. Second, the sheer number of components in any animal is huge compared even to the number of components that are available with the largest of present day computers.

Nature therefore provides examples that display a level of performance that would be desireable in a computerized automaton, but also offers an overabundance of possibilities in how this may be effected and no guarantee that with present hardware it is even possible that an activity of interest can be simulated in a useful manner.

For example, in a preferred embodiment of the invention to be described below, a total of 153,252 simulated synaptic connections are made among 5,747 simulated neurons of 62 different types. In an alternative embodiment of the visual system, also described below, there are 8,521,728 synaptic connections among 222,208 simulated neurons, for an average of 38 connections per unit. In contrast, it is estimated that the human brain has $10^{10}$ neurons and $10^{15}$ synapses, with an average density of 120,000 neurons/mm$^3$. The density of synapses is on the order of $4 \times 10^8$ per mm$^3$, for an average of approximately 4000 synapses per neuron.

It has been surprisingly discovered that despite the relative paucity of connections received by units in the simulation, which undoubtedly reduces the variety and subtlety of their responses, if a careful selection of characteristics is made, sufficient complexity remains to generate useful automata capable of learning and executing tasks of interest.

Others have suggested ways to model integrated cortical action. There has been proposed a hierarchical model in which the visual cortex computes a series of successively abstracted "sketches" of the visual scene. This model, unlike the present invention, is aimed at producing a symbolic description of objects in a scene, and does not incorporate means for categorizing objects or responding to them. Connectionist models for cortical function have also been proposed which incorporate simplified abstract neurons connected to form networks. Systems based on these models have been used to accomplish a number of tasks, including recognition of shapes, pronunciation of written texts, and evaluation of bank loan applications. Most such systems incorporate a "learning algorithm", which adjust the connections of the network for optimal performance based on the presentation of a predetermined set of correct stimulus-response pairs.

A model of sensorimotor coordination has been reported that claims an attempt to replicate real neuronal structures and to utilize neural maps in sensorimotor coordination. However, the model has only limited utility: It is not capable of categorization of the incoming data but merely permits visual signals to drive the position of an arm after training of the system.

Another neurally based model for nervous system function is primarily concerned with visual pattern recognition. When a new stimulus is presented to that model, it searches sequentially in its memory for a recognition template that matches the stimulus; if such a match is not found, the system is able to create a new template which then becomes available for matching in subsequent searches. The present invention, on the other hand, relies upon selection among preexisting, variant recognizing elements to provide responses to novel stimuli. The concept of reentry, used in the present invention to integrate the responses of multiple sensory modalities, is also lacking in the visual pattern recognition model.

The present inventors have also described predecessors of the present invention. The present invention differs from its predecessors by, inter alia, its ability to interact with the environment through motor output, which enables responses that affect sensory input. This feature is termed "reentry". The responses have degrees of adaptive value leading to more complicated behavioral sequences and the possibility of learning. Such learning is accomplished by selection, operating through a new synaptic change rule.

BRIEF DESCRIPTION OF THE INVENTION

An automaton constructed according to the principles of the present invention comprises devices for sensing the state of its environment, including an input array on which patterns or visual scenes are captured, (for example, by use of a television camera), an assembly of interconnected networks or "repertoires" of recognizing elements that transform input patterns, and an arrangement for coupling these networks to specified motor-output functions. Patterns represented on the input array correspond to objects in the real world which may move; mechanisms for detection of motion and for development of translational and a partial degree of scale invariance has been provided in a preferred embodiment of the automaton. Each recognizing element, called a "group" (as a short form of "neuronal group"), is a component of a repertoire and implements a connected assembly of neuron-like units ("cells"). Cells have multiple inputs that may come variously from the input array or other senses such as touch or kinesthesia or from the outputs of cells in the same or different repertoires. The state of each cell is characterized by a single time-dependent scalar variable, $s_i(t)$, variously referred to as the state of cell i at time t, or the output of cell i at time t. It is dependent upon "synaptic strengths", $c_{ij}$, also referred to as the "connection strengths". The term $c_{ij}$ refers to the strength of the jth input to cell i ($c_{ij}>0$, excitatory; $c_{ij}<0$ inhibitory). The pattern of connections is specified by a matrix with elements $1_{ij}$.

The present invention achieves its performance in part because of the arrangement of neuronal repertoires to form an overall system, in part because of the choice of initial values of the connection strengths, and in part because of a novel amplification function, which is the rule controlling the alteration of the "synaptic strength", $c_{ij}$, of a connection according to the activity of the pre- and postsynaptic groups.

The rule utilized in the present invention provides, among other possibilities, for the weakening of connections between pairs of units of which one, but not both, are active. This scheme provides for the strengthening of connections if both presynaptic and postsynaptic levels of activity are low. In addition, and most importantly, it provides for modulation of the amount of synaptic change according to a second input, known as a "heterosynaptic" input, which signals the success or failure of recent behavior to the synapse undergoing modification as determined by a "value repertoire". This more elaborate, heterosynaptic amplification rule enables the present invention to achieve learning. As a result the invention, aside from its direct utility, provides an apparatus with which to analyze critical problems involving the acquisition and maturation of integrated sensory and motor behavior.

The present invention has value repertoires, which favor the learning of activities of "value". A value repertoire has connectivities which predispose them to respond to the sequelae of adaptive behaviors, but their constituent neuronal groups may be normal in all other respects. Characteristic features of the value repertoires include the presence of sensory afferents, a relative lack of internal order and topography, and diffuse and widespread efferents that heterosynaptically influence large populations of synapses.

Selection is a major feature of the present invention. Common selectional mechanisms are used to implement learning in both sensory and motor control portions of the invention. This has several advantages: (a) common training of both through encounter with a common set of real-world situations, (b) no need to design codes for communication of information between the two parts of the robotic system—meaningful signal combinations are automatically selected during the training process. The use of selection against a preexisting repertoire of variant recognizing elements has also been developed to train a recognition system. This allows natural selection to be imitated in a machine in order to eliminate the need for precise programming for a particular recognition task. Programming is replaced by training based on experience with stimuli similar to those that will be encountered later by the device.

A method has been devised permitting a digital computer (serial or parallel) to simulate the activity of any number of neurons connected together in any desired anatomical arrangement. There is no programmed limit on the number of cells or connections between them, nor on the number of different kinds of cells or kinds of connections between them. This has entailed representing in computer memory the geometry of the network being simulated and the means of correlating generic parameters contained in linked record structures with the specific parameters of a given cell.

A means for simulating desired anatomical arrangements of neurons with specified realistic biophysical properties has also been developed. It includes a means for representing the connectivity of neuronal segments in matrix form so that a computer simulation can efficiently traverse a list of simulated elements and compute the response voltage of each in a cyclical manner.

Among the advantages of the present invention are the following: The construction of a recognition machine from a large repertoire of variant recognition elements avoids the need to specify precisely the characteristics of each element and the detailed way they are connected together.

The invention is intrinsically reliable against failure of its individual components. The "degeneracy" of such a system covers the space of possible inputs with units having overlapping response specificities. This degeneracy differs from redundancy. Degeneracy in this invention is the presence of multiple, nonisomorphic but functionally interchangeable units, whereas redundancy is the duplication of isomorphic structural units to achieve fault tolerance. Once the permissible "envelope" of design parameters is determined, the individual elements are constructed with random variation, greatly simplifying the mass production of computational elements for the invention.

A further advantage of the selective learning mechanism employed in the present invention, is its ability to adapt automatically to different environmental conditions, such as, for example, different frequency distributions of objects which the system is required to sort, different distinguishing features of those objects, or different mechanical characteristics of its sensory and effector devices.

It is an object of the present invention to provide an automaton having sensory and motor systems and which is capable of learning.

It is a further object of the present invention to provide such an apparatus capable of establishing categories of input objects and sorting the input data in accord with such categories.

It is a further object of the present invention to provide such an apparatus having one or more sensory means identified with specific sense functions for sensing input data and having processing means for receiving the input data, for categorizing the input data and for generating output actions in response to said input data and having output effector means for receiving said output data and for sorting objects in response to said output data, each of the output effector means being identified with a specific motor output function.

It is a still further object of the present invention to provide such an apparatus where the processing means comprises simulated neurons, each of which is characterized by a state of activation determined by a response function; and synapses, each of which has a unidirectional connection between two of the neurons. Each of the synapses has an efficacy or strength capable of differential modification determined by an amplification function according to a selective learning rule.

It is a still further object of the present invention to provide the aforesaid apparatus having groups of neurons of one or more types connected more strongly among themselves than they are connected to neurons in other groups, and neural maps comprising repertoires of neuronal groups, corresponding to one of the sense functions or one of said motor output functions.

It is a still further object of the present invention to provide the foregoing apparatus with reentrant signaling means between the neural maps.

It is still a further object of the present invention to provide a further set of neural maps, corresponding to the various functions which the automaton is designed to perform and comprising value repertoires constructed from neuronal groups.

It is yet a further object of the present invention to provide such apparatus in which the modification of the synaptic efficacies alters the contribution of selected neuronal groups to behavior, thereby providing integrated sensory and motor behavior.

BRIEF DESCRIPTION OF THE DRAWINGS

FIG. 3 is a drawing depicting degeneracy in the responses of groups in the present invention.

FIG. 4 is a drawing of generalized input means in the overall process of the present invention.

FIG. 4.1 is a drawing of input vision means in the overall process of the, present invention.

FIG. 4.2 is a drawing of input touch and kinesthesia means in the overall process of the present invention.

FIG. 5 is a drawing depicting reentry in classification n-tuples in the overall process of the present invention.

FIG. 5.1 is a drawing depicting reentry in a classification couple of the overall process of the present invention, and how a classification couple is formed using reentry connections.

FIG. 5.2 is a drawing of a classification n-tuple in the overall process of the present invention.

FIG. 23 is a drawing depicting the evaluation of geometrically defined connections for the automaton of the present invention.

FIG. 23.1 A-E is a drawing depicting the steps in evaluation of geometrically defined connections.

FIG. 23.2 is a drawing depicting the layout of geometrically defined connections.

DETAILED DESCRIPTION OF A PREFERRED EMBODIMENT OF THE INVENTION

As shown in the figures, the preferred embodiment of the present invention is an automaton having a visual sensing means which detects objects moving in a two dimensional plane, (for example, objects restricted to a table top or a television image of the three dimensional world) and reaches for them with a effector arm that both senses the object by touch and engages it when appropriate to move the object. The automaton comprises a cortical network which resides in a digital computer or other processor. The cortical network comprises neuronal cells, which are associated with each other during the operation of the automaton into various neuronal groups and maps.

Figure 1:
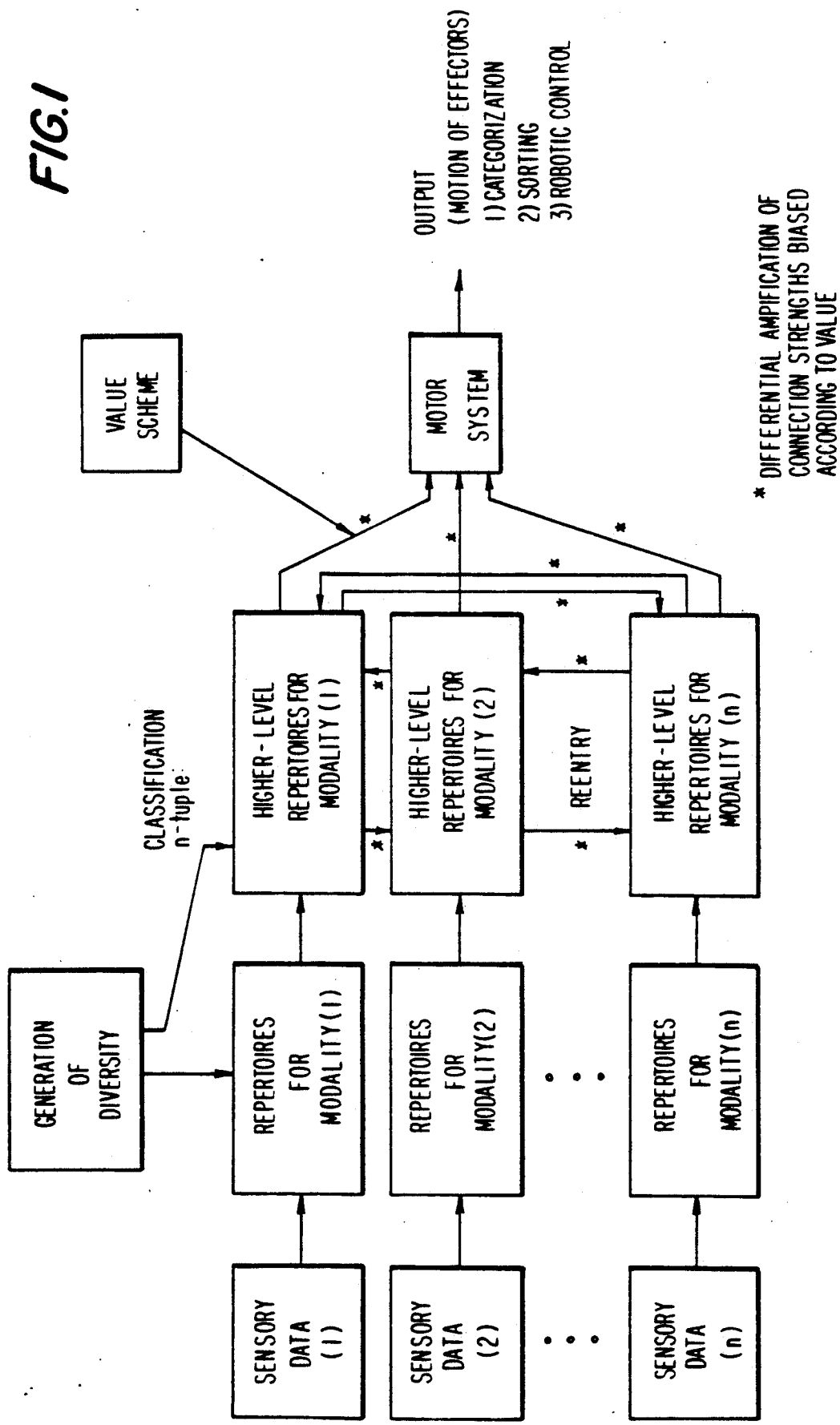
FIG. 1 is a top level schematic of the present invention.

FIG. 1 is an overall schematic diagram of the organization of the preferred embodiment. As depicted in the figure, a collection of repertoires entitled Repertoires for Modality (1) thorough (n) are created by a process termed the Generation of Diversity. Each of these repertoires receives Sensory Data from an associated sensory input device designated as Sensory Data (1) through (n). Examples of such devices are television cameras and pressure transducers. The conversion of such sensory data to signals that are interpretable by a computer is well known to persons schooled in the relevant arts.

At a next level is a classification n-tuple of repertoires called Higher Level Repertoires for Modality (1) through (n) each of which receives data from the repertoires for modalities (1) through (n). The higher level repertoires, also termed neuronal maps in the following, are connected by reentrant signalling means to form classification couples or classification n-tuples, which categorize stimulus objects and in turn provide output data to a motor system that controls the action of effectors for such functions as sorting and robotic control.

Within the system, signals which are exchanged between the higher level repertoires are termed reentrant signals and are shown passing between all of the classification n-tuple pairs. The connections between the various elements are shown as arrows in the figures. The asterisks on the figure indicates the differential amplification of connection strengths biased according to values assigned by a value scheme.

Figure 2:
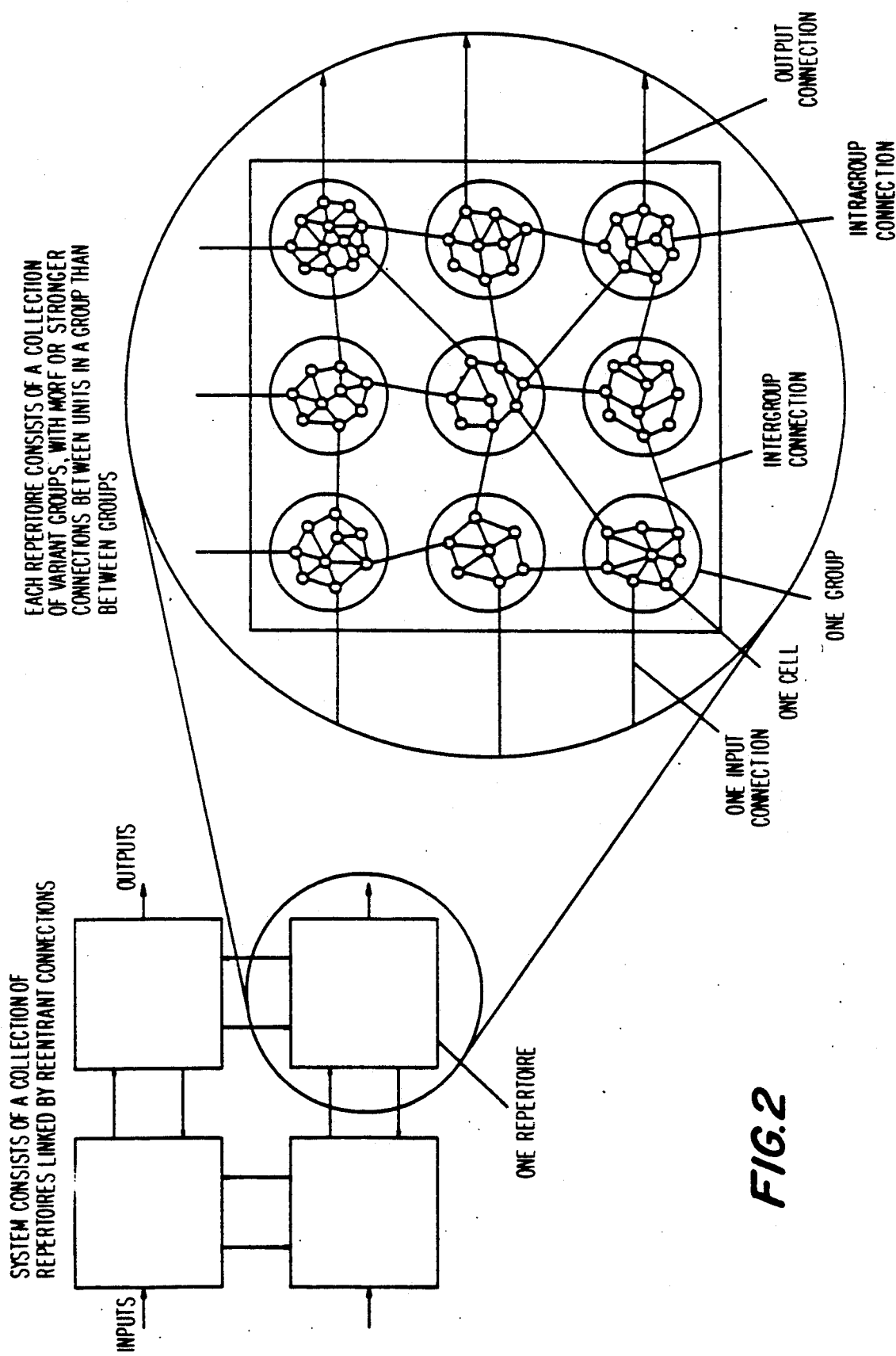
FIG. 2 is a schematic drawing of repertoires showing the constituent groups and their manner of interconnection.

As shown in FIG. 2, each repertoire consists of a collection of variant groups, with more or stronger connections between units in a group than between units in different groups. For example in the preferred embodiment the strengths of connections, $c_{ij}$, between units within a group is typically 0.5–1.0 (arbitrary units) while the strength of connections between units in different groups is typically 0.3. As shown in greater detail in FIG. 2 the repertoires are linked by reentrant connections and each repertoire comprises a collection of groups of cells having intragroup connections as well as intergroup connections within the repertoire. The output connections are associated with individual cells, although it is the intent of the construction (inasmuch as groups are collections of cells and not entities in and of themselves) that it is not important which of the cells in the group has the output connection, by virtue of the high correlation of activity levels among cells of a group. This provides a system in which cells could change their group membership or groups could fragment or reorganize themselves without sudden and dramatic loss of functionality of the repertoire as whole. Although this implies a degeneracy that appears to sacrifice the efficiency of the construction as a whole, it is more than made up by the flexibility that is achieved in the functioning of the preferred embodiment as a whole. Indeed, portions of the construct could fail without any overall loss of functionality of the entire system.

FIG. 3 shows a multidimensional parameter space describing input stimuli, in this case a two dimensional space. In the illustration, a stimulus object X stimulates three groups termed groups 1, 2, and 3, but not the group marked 4. The groups shown have overlapping response specifications illustrating the principle of degeneracy. Sensory signals arising from the stimulus are transferred via direct input and intergroup connections to all groups in the sensory repertoire; however, as depicted in the figure only groups whose input specificity matches the input signal sufficiently well are actually excited.

A specific input means associated with vision is shown in FIG. 4.1. Here the input relates to vision and involves an input array that constitutes the retina of the automaton. The external environment contains an object that produces an image upon the input array. The input array is topographically mapped onto a primary visual repertoire of groups that respond to the image of the stimulus. Other neuronal groups that are not responding are also shown. The term topographic refers to a mapping that preserves geometrical relationships. One of the discoveries of the present invention is that it is necessary to have both topographic and non-topographic mappings in order to provide sufficient functionality to the device.

Other specific input means, depicted in FIG. 4.2, are associated with the senses of touch and kinesthesia. Here the real object in the environment is contacted by touch sensors comprising transducers such as are known to a person of ordinary skill in the relevant art and connected at the end of a multijointed arm. The touch sensors map onto the primary touch repertoire having groups that respond to such stimulus. An additional primary kinesthetic repertoire is associated with each of the joints' angular ranges.

FIG. 5.1 depicts reentry in a typical classification couple. In this case, reentry between the visual association area repertoire ($R_2$) and the trace association area repertoire $R_M$ (to be defined below) is shown. As depicted, the visual association area repertoire receives inputs from a primary visual repertoire and has outputs to later processing areas. The trace association area repertoire (denoted MT) receives its inputs from the primary kinesthetic repertoire and also outputs to later processing areas. The reentrant connections are those shown between the $R_2$ and $R_M$ repertoires.

FIG. 5.2 is an example of a classification n-tuple (in this case with $n=3$). Input signals are received by a repertoire for a visual submodality, such as texture. Outputs from this submodality are sent by reentrant connections to two other submodalities, in this example for color and direction of motion. Each submodality has directed outputs, and in addition bidirectional reentrant connections with each of the other members of the n-tuple.

Figure 6B:
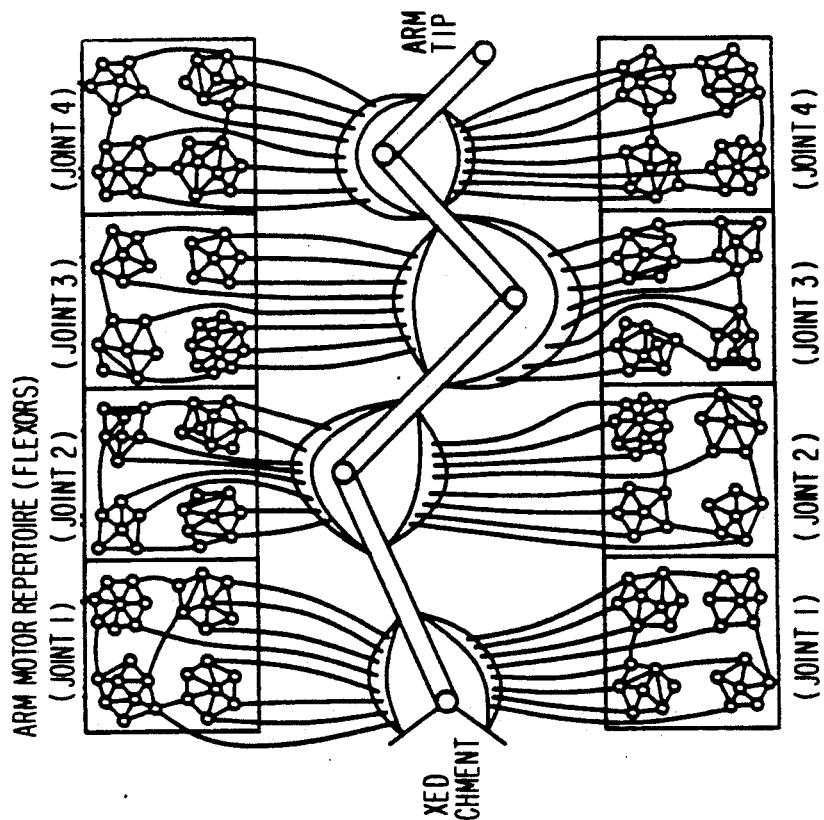
FIG. 6B is a drawing of output means in the overall process of the present invention depicting an arm motor repertoire.
Figure 6A:
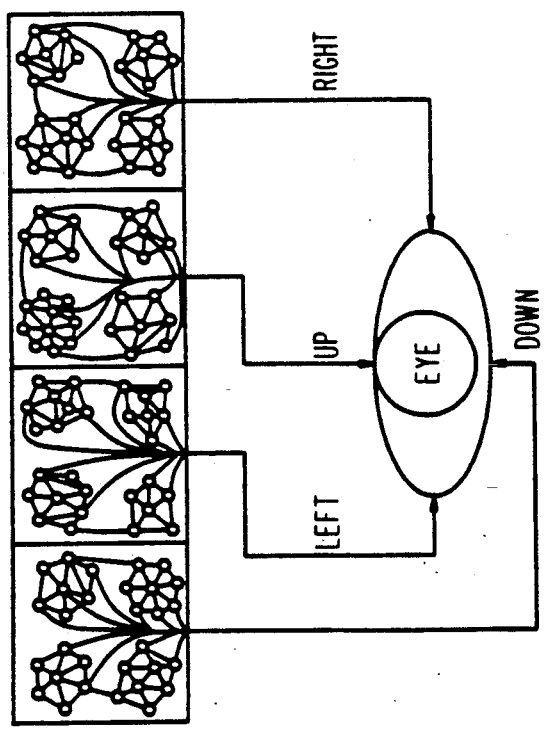
FIG. 6A is a drawing of output means in the overall process of the present invention depicting an oculomotor repertoire.

FIG. 6A and 6B show the arrangement of a typical output means. Shown are the oculomotor repertoire implementing two opposing pairs of movement means similar to muscles that move the eye or TV camera left-right and up-down respectively, and the arm motor repertoire implementing flexor and extensor movement means at the various joints of the arm. The various motor components receive signals from neuronal groups. In the case of the arm motor repertoires there are separate neuronal groups whose output activates flexors and others to activate extensors.

Figure 7:
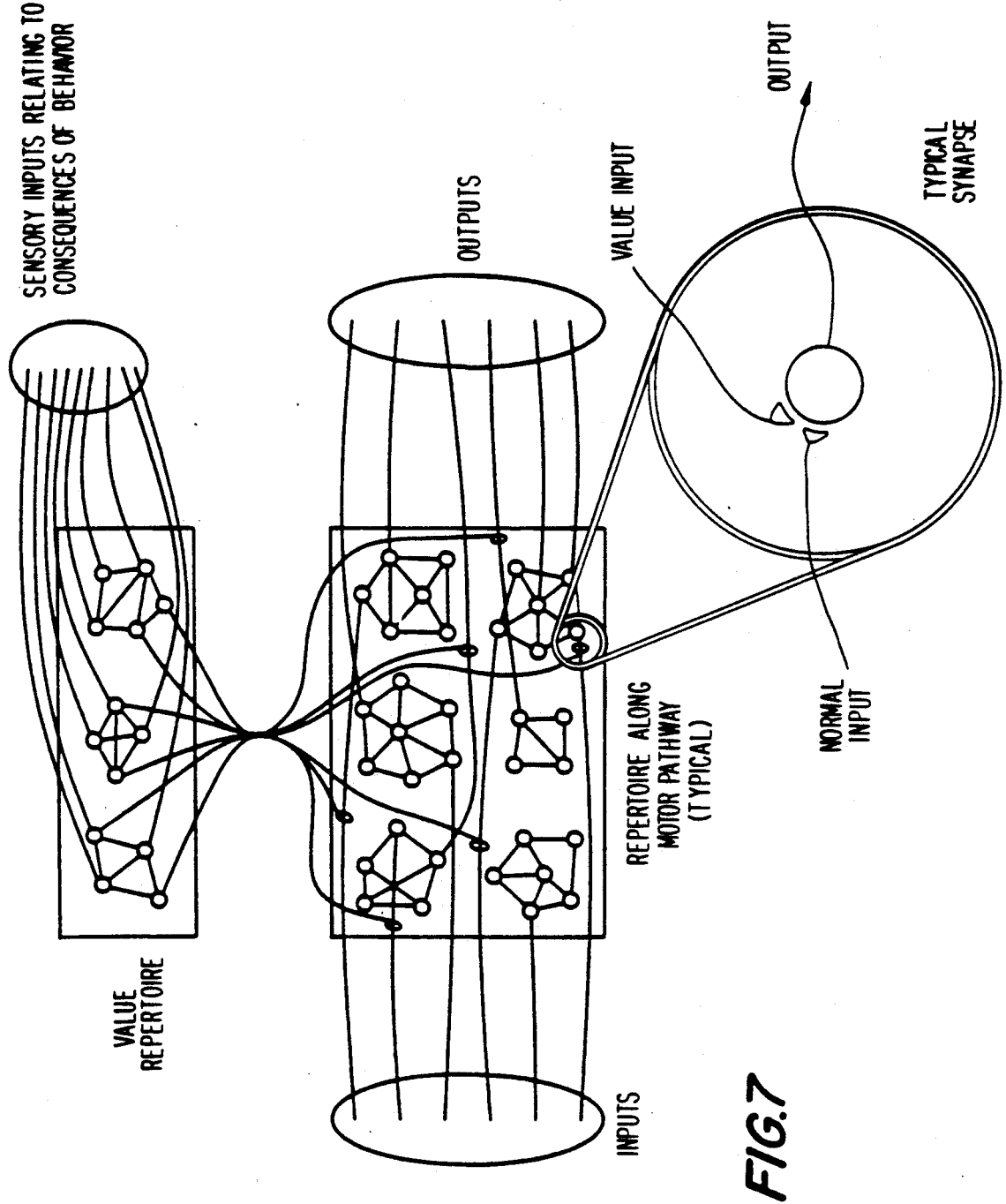
FIG. 7 is a drawing depicting differential modification in the overall process of the present invention.

Training by selection is depicted in FIG. 7. Sensory inputs relating to the consequences of behavior are connected to a value repertoire. The value repertoire is arranged in such a way that its response to these sensory inputs is larger when the action has been more successful in attaining a particular goal, and smaller when the action has been less successful. This arrangement allows differential synaptic modifications based on behavior. The value repertoire has a single output which is connected as a heterosynaptic input to cells in a repertoire along the motor pathway between the input and output means. Unlike the case with other methods for training neural networks, only a single input (in the present case, an input from a value repertoire) is needed to regulate synaptic modification at all synapses in a particular motor system, because value input is required solely to indicate the relative degree of success of past behavior, and not to indicate in detail the amount of correction required at each synapse to generate better behavior. The normal input of cells in the motor pathway is joined with the value input in the sense that both are factors in the determination of modifications in the strengths of synapses.

Figure 8:
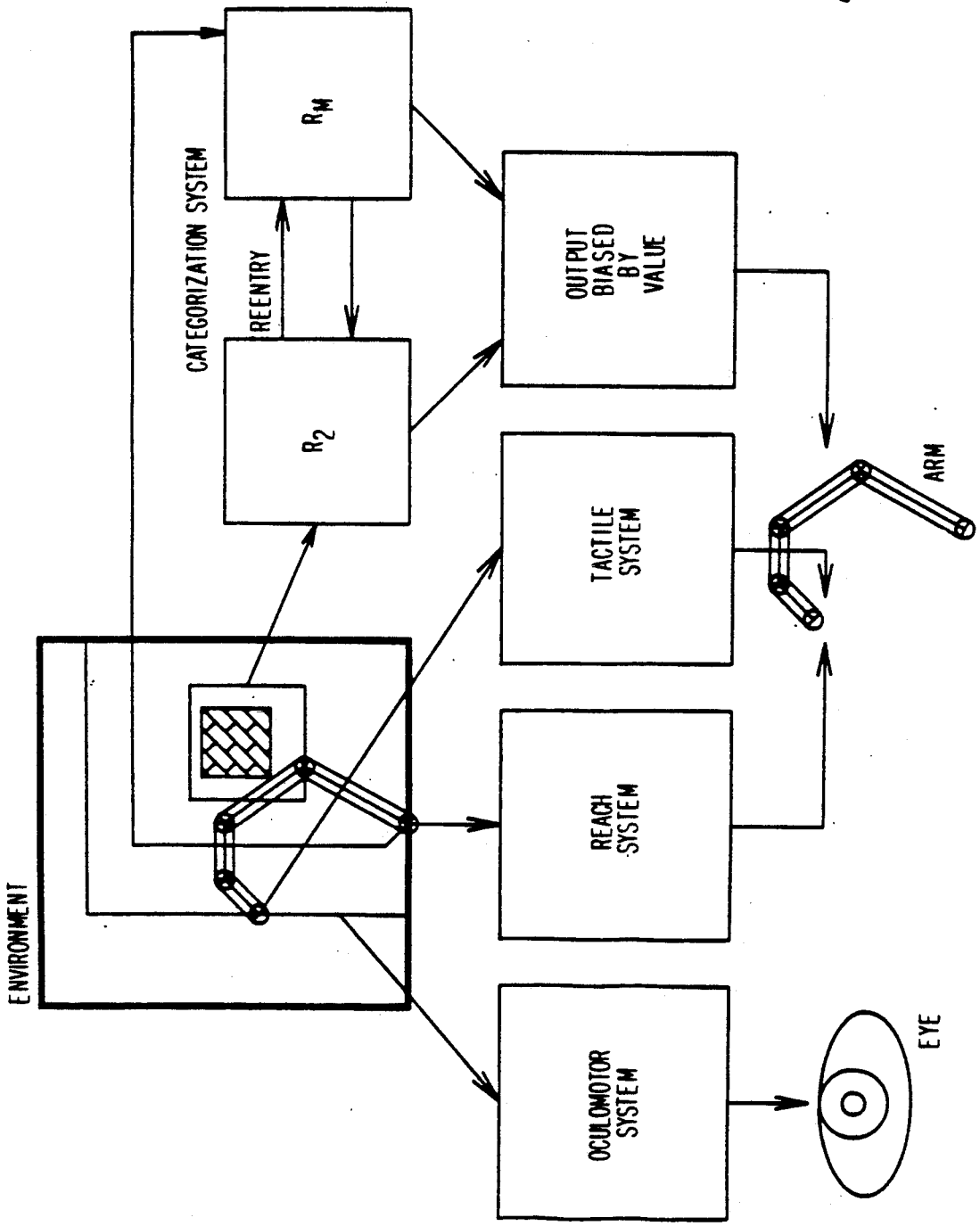
FIG. 8 is a drawing of the overall view of the automaton in a preferred embodiment of the present invention.

FIG. 8 is an overall diagram showing the component neuronal subsystems of the preferred embodiment. These subsystems are shown in more detail in the following figures.

The following conventions are used in FIGS. 9–15.

| | |
|---|---|
| O | A cell |
| —— | An excitory connection |
| ——\| | An inhibitory connection |
| ——\|. | An ambiguous connection (excitory or inhibitory) (Member of a bidirectional set.) |
| ——▶ | An ambiguous connection (excitory or inhibitory) (Member of unidirectional set.) |
| ══θ— | A connection biased by value. |

Figure 9:
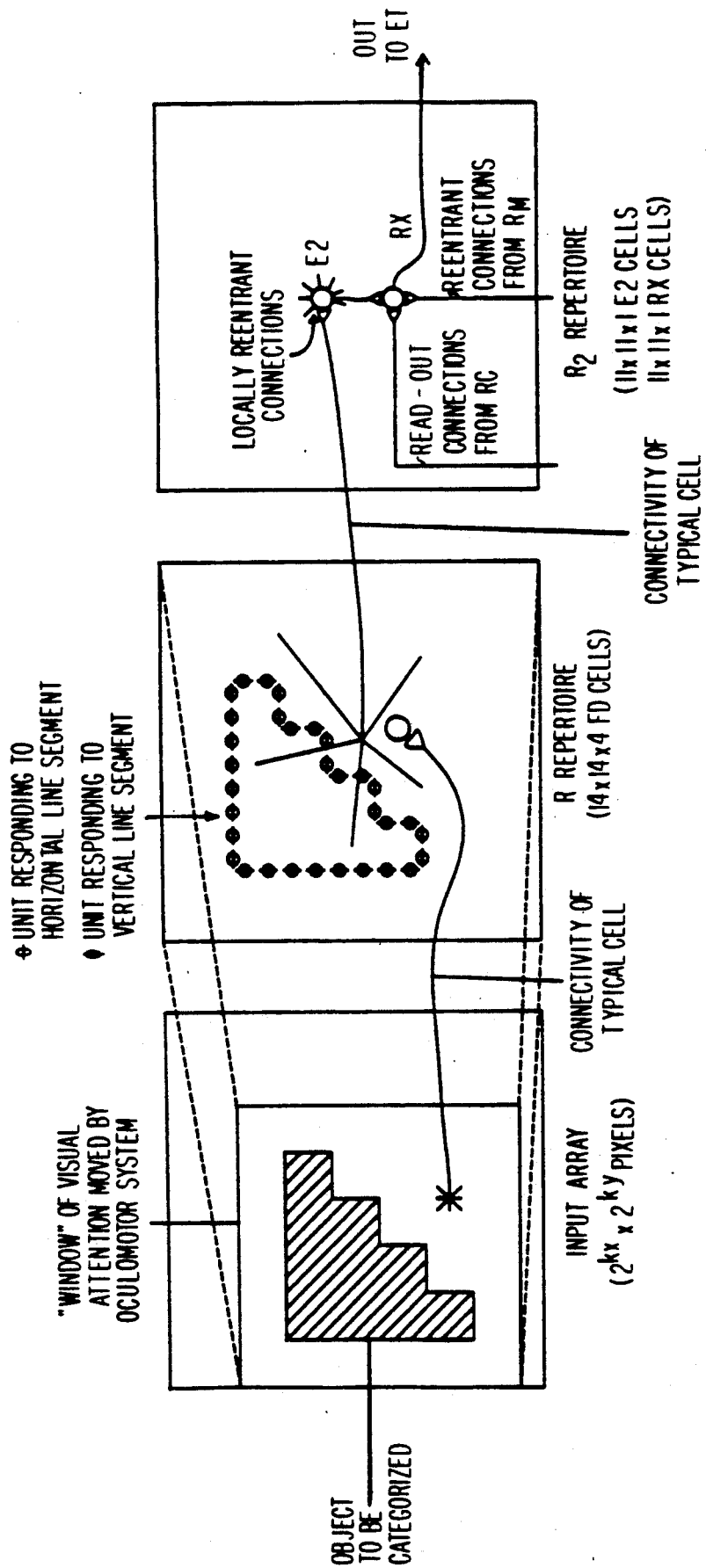
FIG. 9 is a drawing of the visual system in the preferred embodiment of the present invention.
Figure 10:
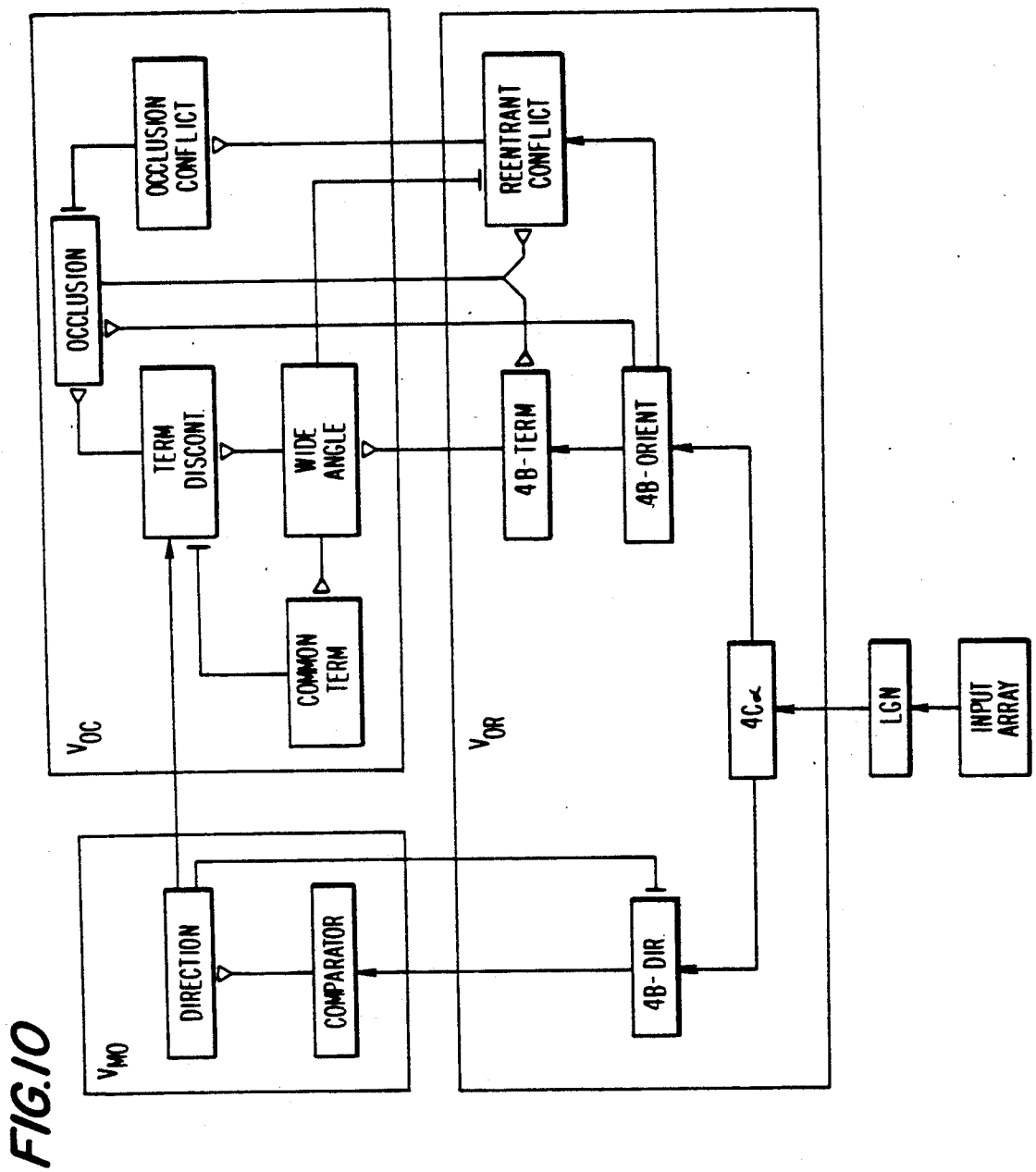
FIG. 10 is a drawing of an alternative (RCI) visual system for an automaton in an alternative embodiment of the present invention.
Figure 11:
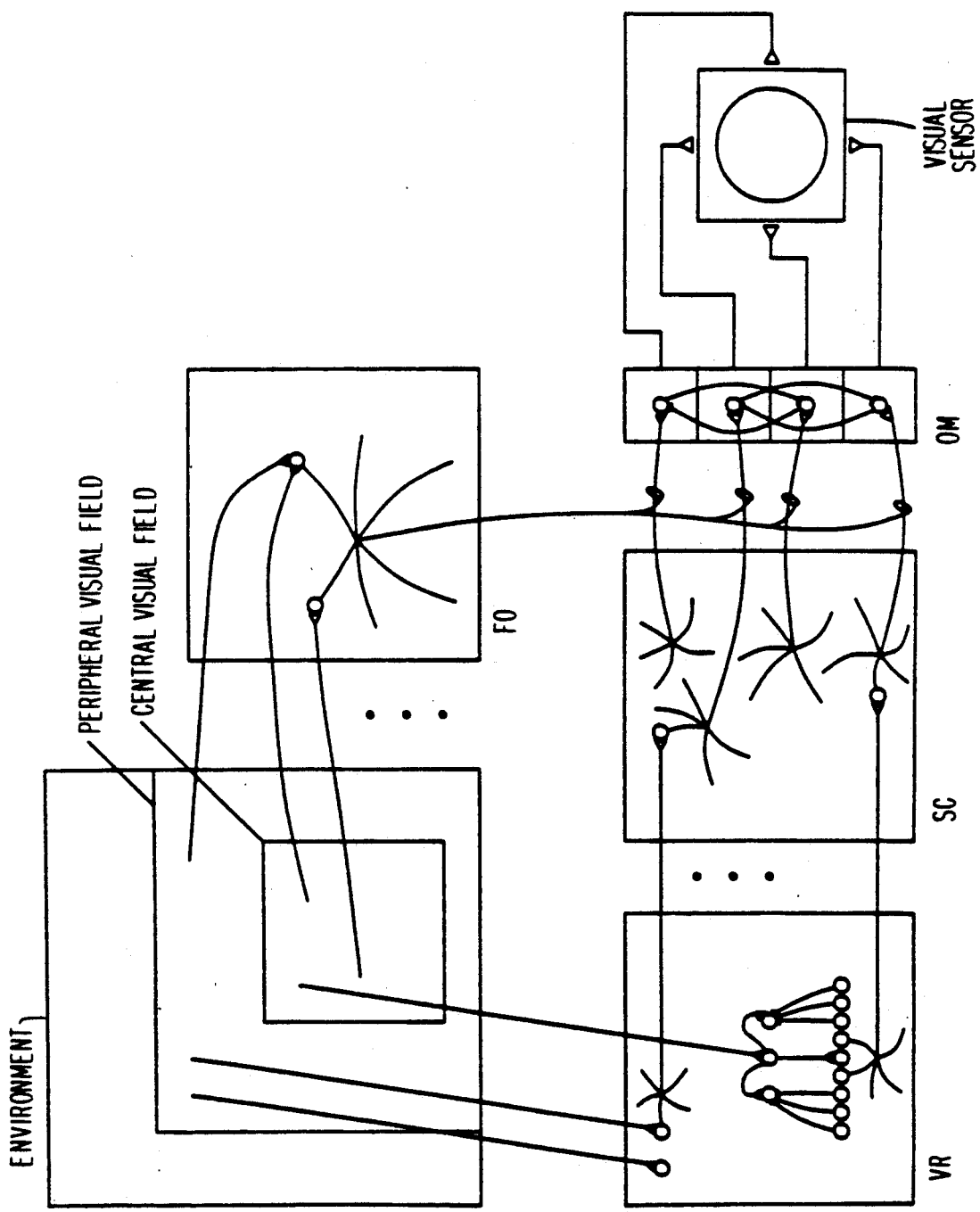
FIG. 11 is a drawing of the oculomotor system for an automaton in the preferred embodiment of the present invention.

FIGS. 9–11 show an object to be categorized within a "window" of visual attention that is moved by the oculomotor system as depicted in FIG. 6. The object is imaged on an input array of $2^{kx} \times 2^{ky}$ pixels. The output from the array provides input to an R repertoire of FD (feature detector) cells. These cells may be of several different kinds, responding, for example, to line segments in different orientations (vertical, horizontal, or oblique), to bent lines, or to line ends. The choice of these types may be made when the automaton is set up, to maximize its sensitivity to features of input objects that are likely to be relevant for identifying and sorting them. In the preferred embodiment described here, four such kinds of FD cells are used, which respond to line segments oriented vertically, horizontally, and at the two possible 45° positions (northeast—southwest and northwest—southeast). Whatever choice of feature-detecting cells is made in a particular embodiment, one cell of each type is placed at each position in the R repertoire. In the preferred embodiment described here, there are $14 \times 14$ positions in the R repertoire. Each response of an FD cell thus indicates both the type and position of a corresponding feature in the input array, and therefore also in the object of attention. These responses are sent as data and combined with locally reentrant connections in an $R_2$ repertoire of $11 \times 11 \times 1$ E2 cells and $11 \times 11 \times 1$ RX cells for categorization. The output pattern is then sent (see FIG. 15) to the ET repertoire and read out to an RC repertoire while interacting with reentrant connections from an $R_M$ repertoire.

FIG. 10 illustrates an alternative version of the visual system which utilizes reentrant connections among three visual areas to obtain a unified visual response to more complex objects which may contain contours defined by moving points and which may contain contours which are occluded by other objects lying between the object in question and the eye of the automaton. This alternative visual system consists of three sections, or areas, each of which has several repertoires which are described in detail later. The $V_{OR}$ section is a visual orientation area containing groups that respond predominantly to the orientation of visual contours. This section receives input from the input array via an intermediate "LGN" repertoire that responds to visual contours. The $V_{MO}$ section is a visual motion area containing groups that respond predominantly to the direction of motion of visual contours. This section receives inputs from $V_{OR}$ and also provides reentrant inhibitory connections to $V_{OR}$ that sharpen the specificity of the directional responses. Finally, the $V_{OC}$ section is a visual occlusion area containing groups that construct responses to invisible, occluded contours by the action of connections from the other two sections, along with reentrant connections back to $V_{OR}$.

FIG. 11 depicts the oculomotor system used to direct the visual sensor (television camera or other visual means) toward a target object and to follow moving target objects. Visual repertoire VR receives topographically mapped inputs from the input array, and repertoire SC receives similarly mapped inputs from VR. An oculomotor repertoire OM in turn receives inputs from SC, so arranged that each cell of OM receives inputs from cells covering the entire area of SC. The OM repertoire is divided into four areas, indicated by R, U, L, and D in the figure, which are specialized to move the visual sensor respectively to the right, up, left, or down. The right-left and up-down pairs are mutually inhibitory. FO is a value repertoire which responds weakly to objects in the peripheral visual field of the automaton, and strongly to objects in the central visual field. Outputs from FO provide heterosynaptic bias to the selection of connections between SC and OM such that motions of the visual sensor that bring objects into the central visual field are selectively enhanced.

Figure 12:
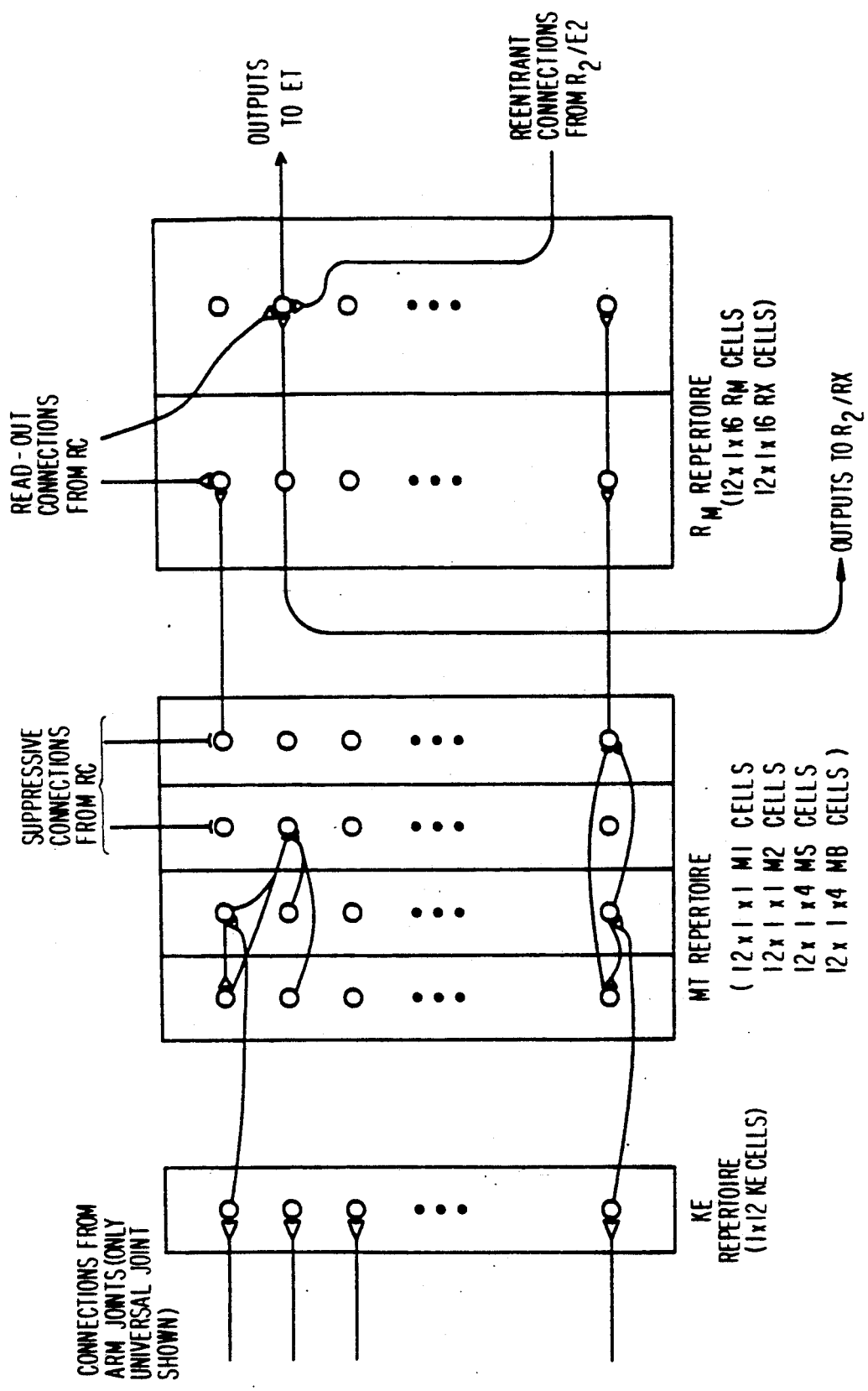
FIG. 12 is a drawing of the kinesthesia system for an automaton in the preferred embodiment of the present invention.

The arrangement of the kinesthetic system used in categorization is depicted in FIG. 12. Connections from position and/or motion sensors in arm joints are received by the KE repertoire of $1 \times 12 \times 1$ cells. Outputs are sent in turn to an MT repertoire of $12 \times 1 \times 1$ M1 and M2 cells and $12 \times 1 \times 4$ MS and MB cells. The MT repertoire also has suppressive connections from an RC repertoire. An RM repertoire having $12 \times 1 \times 16$ RM cells and an equal number of RX cells receives output from the MT repertoire, readout connections from an RC repertoire and reentrant connections from E2 cells in the $R_2$ repertoires. Its outputs go to the RX cells in the $R_2$ repertoire and to the ET repertoire.

Figure 13:
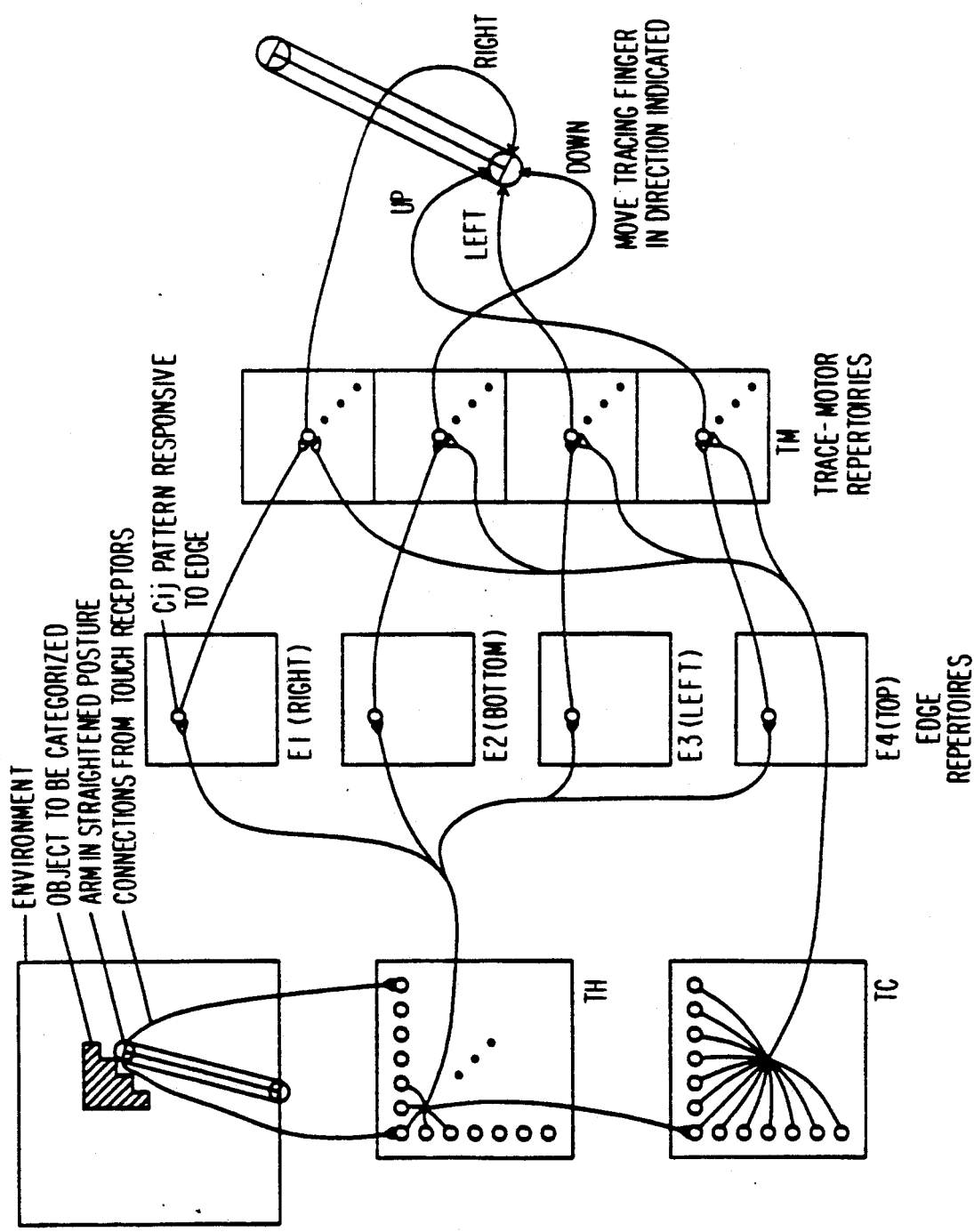
FIG. 13 is a drawing of trace system for an automaton in the preferred embodiment of the present invention.

The trace system of the preferred embodiment is shown in FIG. 13. The object to be categorized is detected in the environment by vision and the arm is brought to the object by the reaching system, then moved into its straightened posture. Connections from the touch receptors are input to the TH repertoire and from there to the TC repertoire. From the TH repertoire signals are received by four edge repertoires E1–E4 which are constructed with a $c_{ij}$ pattern responsive respectively to right, bottom, left and top edge positions. These in turn input to the TM trace-motor repertoires which output in turn to the motor drives that move the tracing finger in its four directions.

Figure 14:
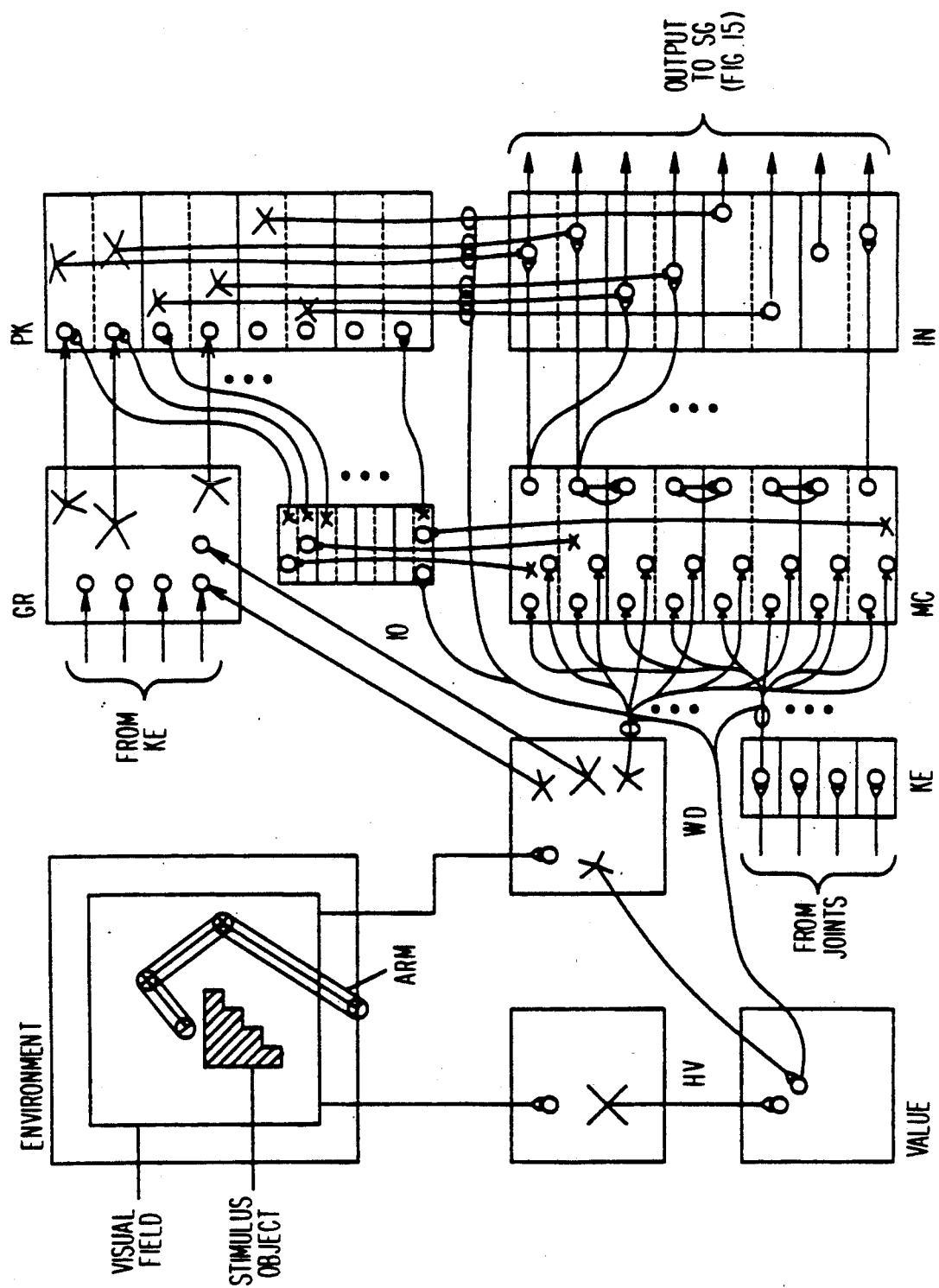
FIG. 14 is a drawing of reaching system for an automaton in the preferred embodiment of the present invention.

The reaching system of the preferred embodiment is shown in FIG. 14. A repertoire MC receives both visual input (from repertoire WD) and kinesthetic input (from repertoire KE, which is the same repertoire as repertoire KE in FIG. 12). These inputs are arranged in such a way that activity of groups in MC corresponds to arbitrary combinations of positions o objects in the environment (signalled by WD) and positions of the arm joints (signalled by KE). Groups in MC are connected in a dense, overlapping fashion to cells in an intermediate repertoire IN. These cells in turn are connected to motor control repertoire $\sigma$ (see FIG. 15). A value repertoire (lower left) views the position of the distal end of the arm (vial visual repertoire HV) and the position of the stimulus object (via visual repertoire WD). These inputs are topographically arranged such that cells in the value repertoire respond most strongly when the hand is near the stimulus object. Activity in the value repertoire biases the selection of input connections to MC.

Also shown in FIG. 14 are repertoires GR, IO and PK, which are responsible for inhibiting unproductive motions of the arm. Cells in repertoire GR receive both visual input (from repertoire WD) and kinesthetic input (from repertoire KE). Cells in repertoire IO receive mixed excitatory and inhibitory connections from MC, and their activity is modulated by excitatory input from the value repertoire. Cells in repertoire PK receive large numbers of input connections from randomly selected cells in GR, and sparse but strong connections from cells in IO. Cells in PK inhibit activity in IN.

Figure 15:
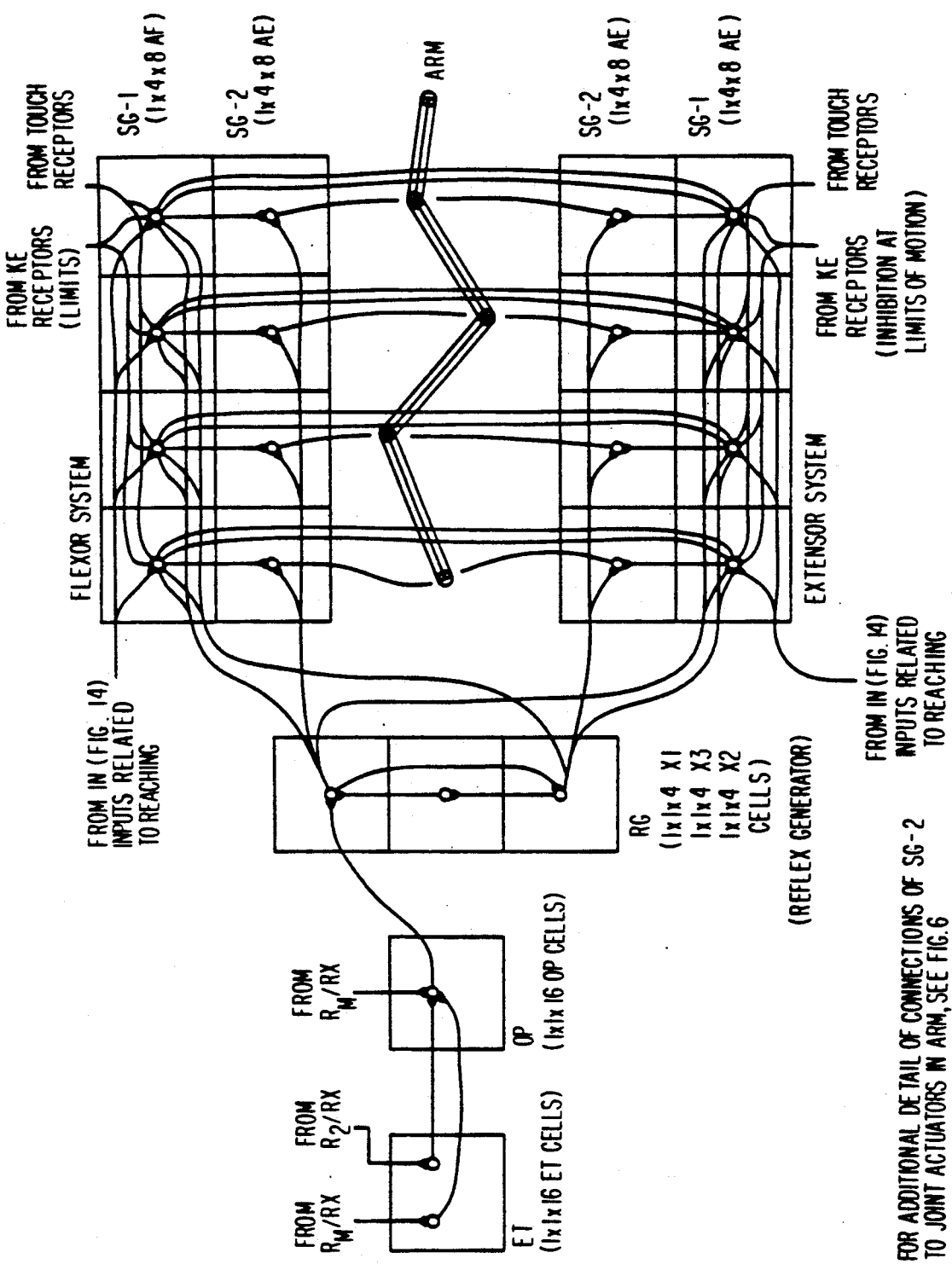
FIG. 15 is a drawing of the output system showing reaching and object manipulation for an automaton in the preferred embodiment of the present invention.

FIG. 15 together with FIG. 6 depicts the output system for reaching and object manipulations. The ET repertoire receives input from RX cells in repertoires $R_M$ and $R_2$ outputs its signals to the OP repertoire, which also receives signals from the RX cells in repertoire $R_M$ and outputs to the RG (reflex generator) repertoires. These have reentry with each other and output to the flexor and extensor systems of cells in repertoire SG. The latter control the individual joints of the arm. The flexor system comprises subrepertoires SG-1 and SG-2 of $1 \times 4 \times i$ AF cells. The extensor system comprises similar subrepertoires SG-2 and SG-1 repertoires of AE cells. The SG-1 repertoires also receive inputs from KE receptors (for inhibition at the limits of motion), from touch receptors, and from IN repertoires related to reaching.

Figure 16A:
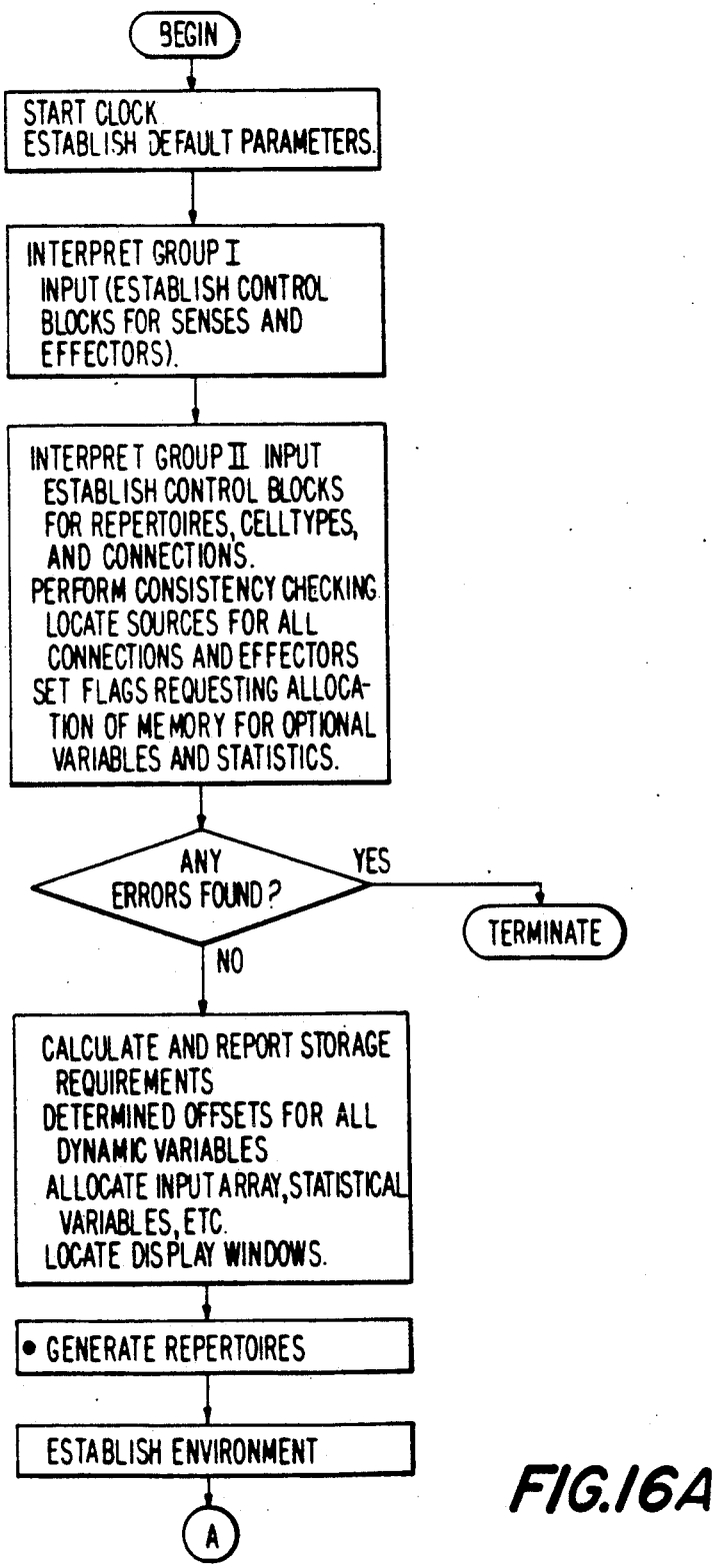
FIG. 16 A-B is a drawing of the overall flowchart stages of operation of a preferred embodiment of the present invention.
Figure 16B:
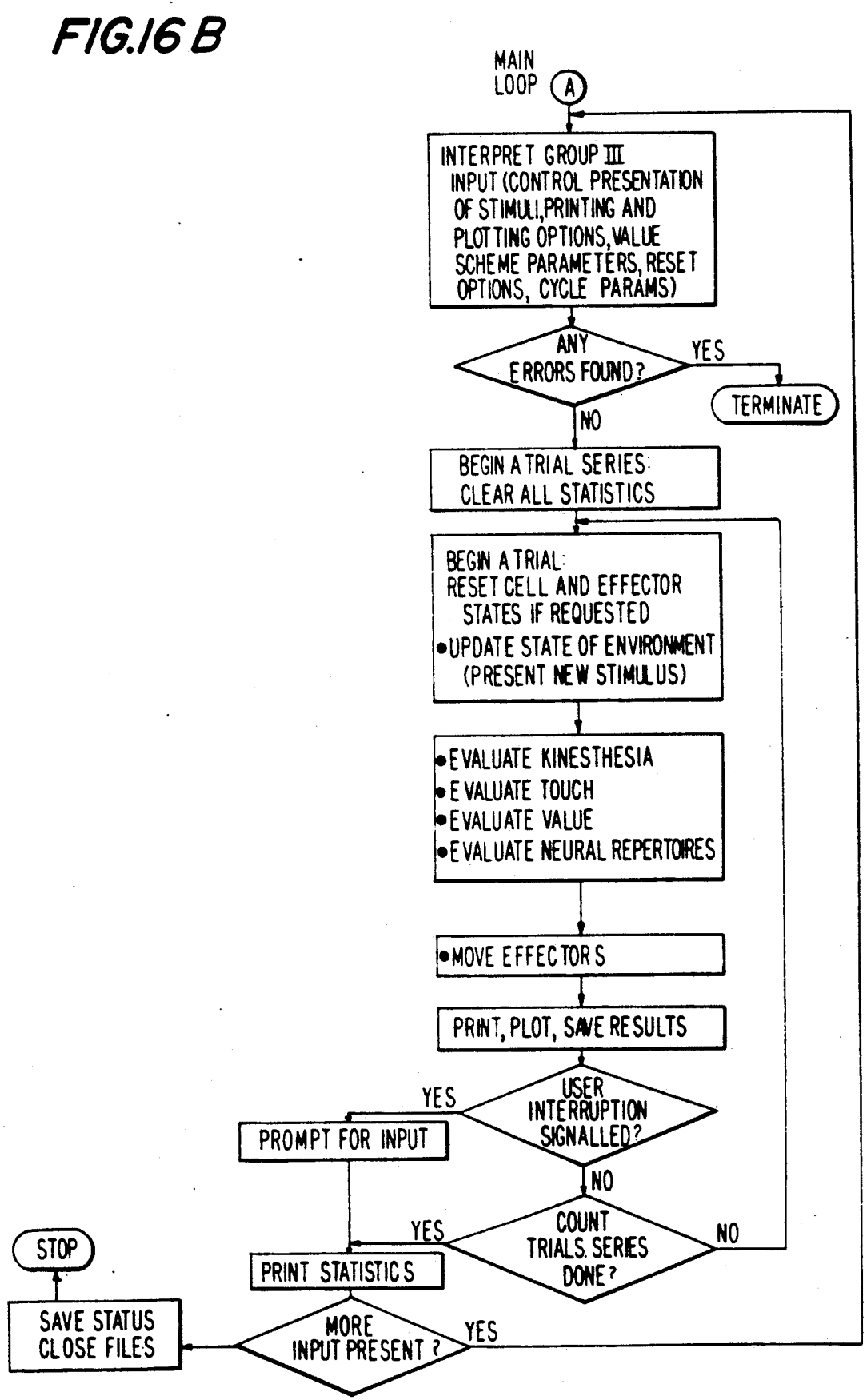
Figure 17A:
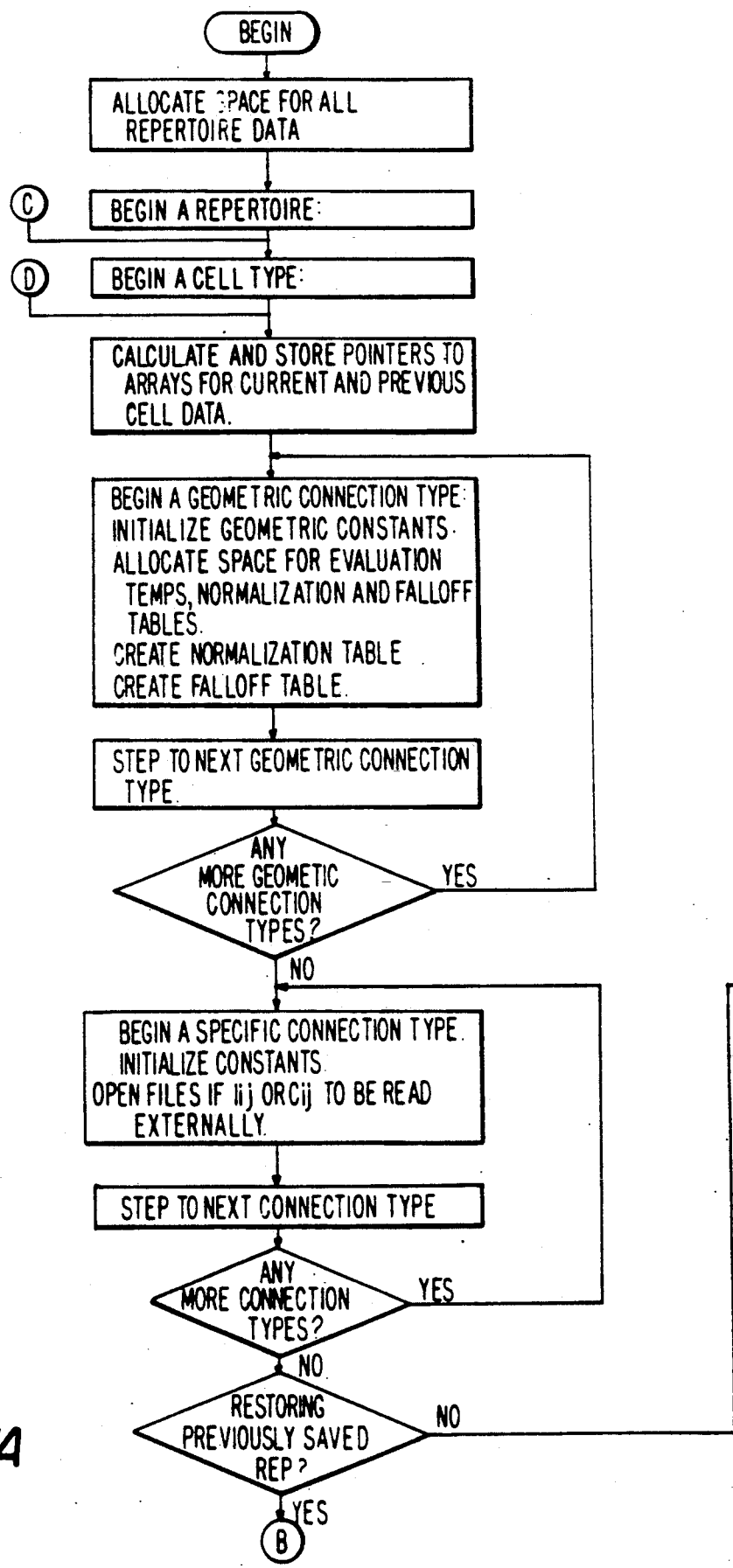
FIG. 17 A-D is a drawing depicting the generation of diversity for the simulation of the automaton of the present invention.
Figure 17B:
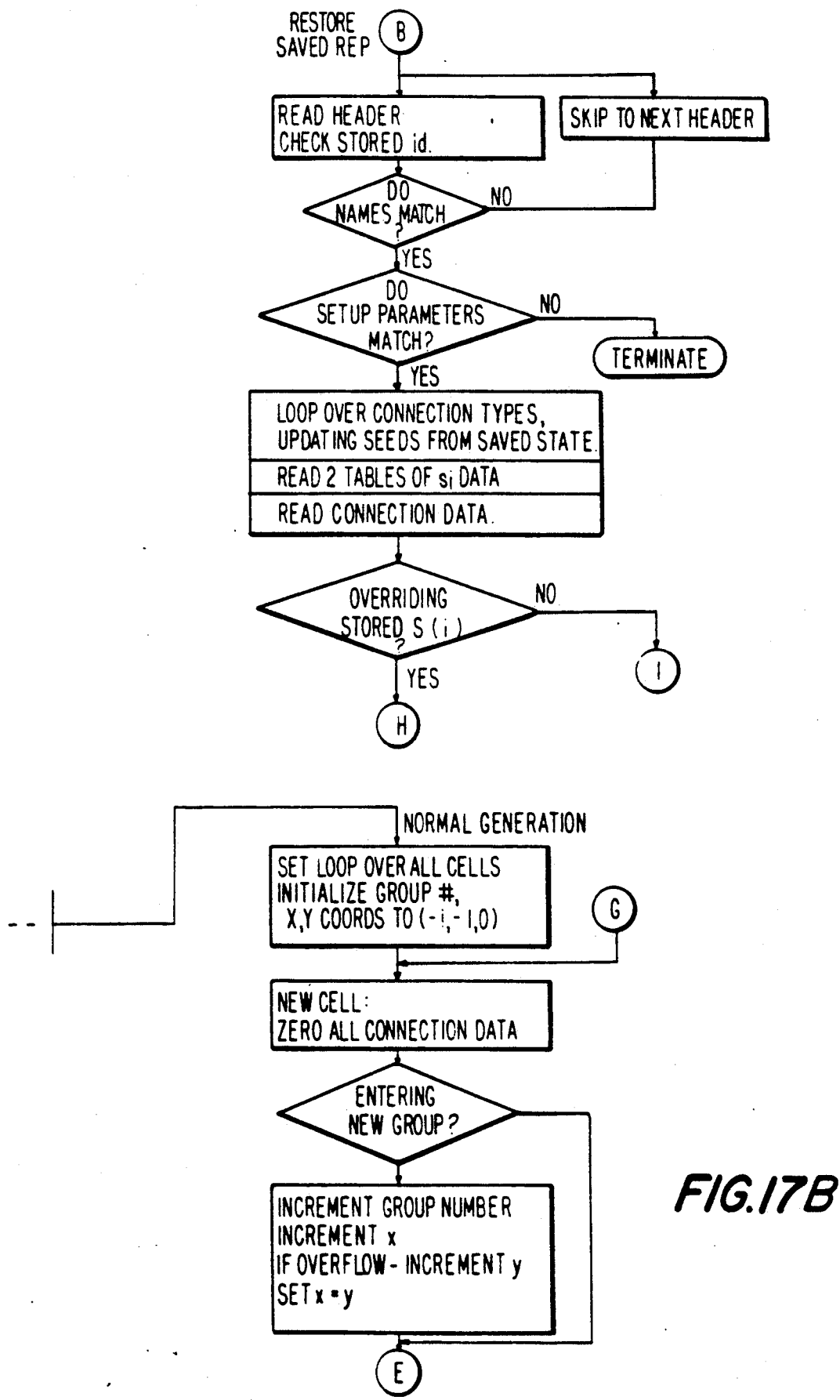
Figure 17C:
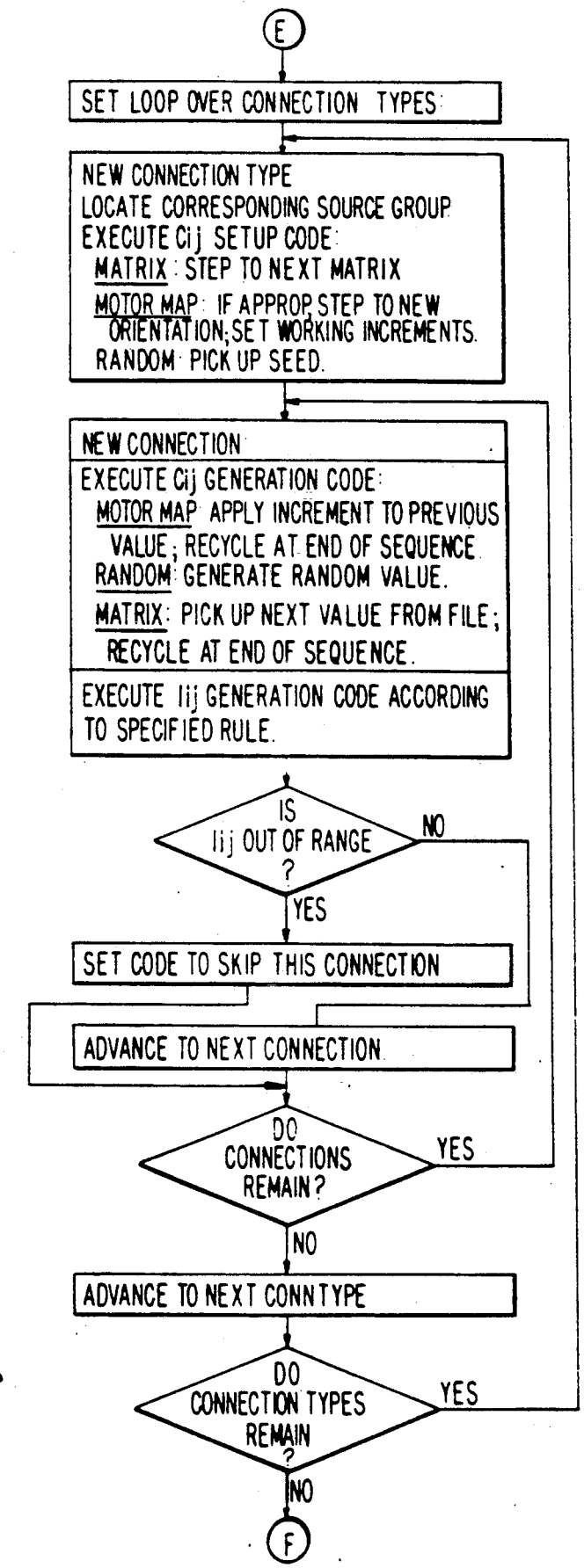
Figure 17D:
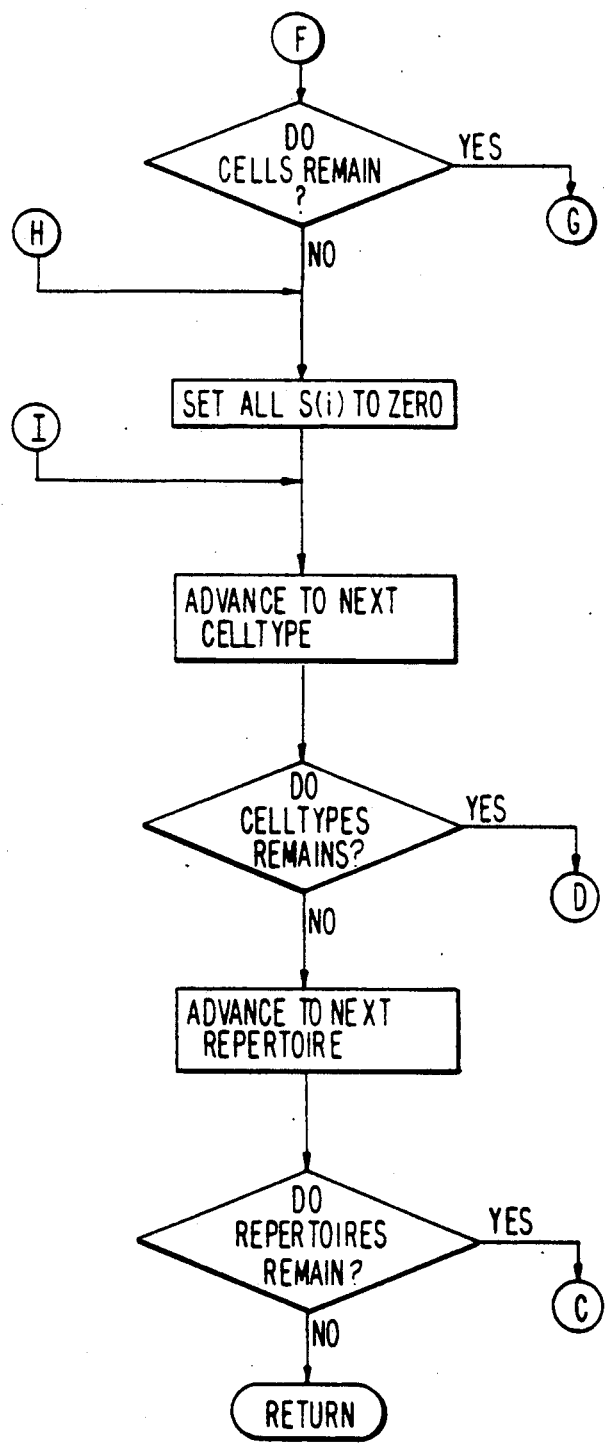
Figure 18A:
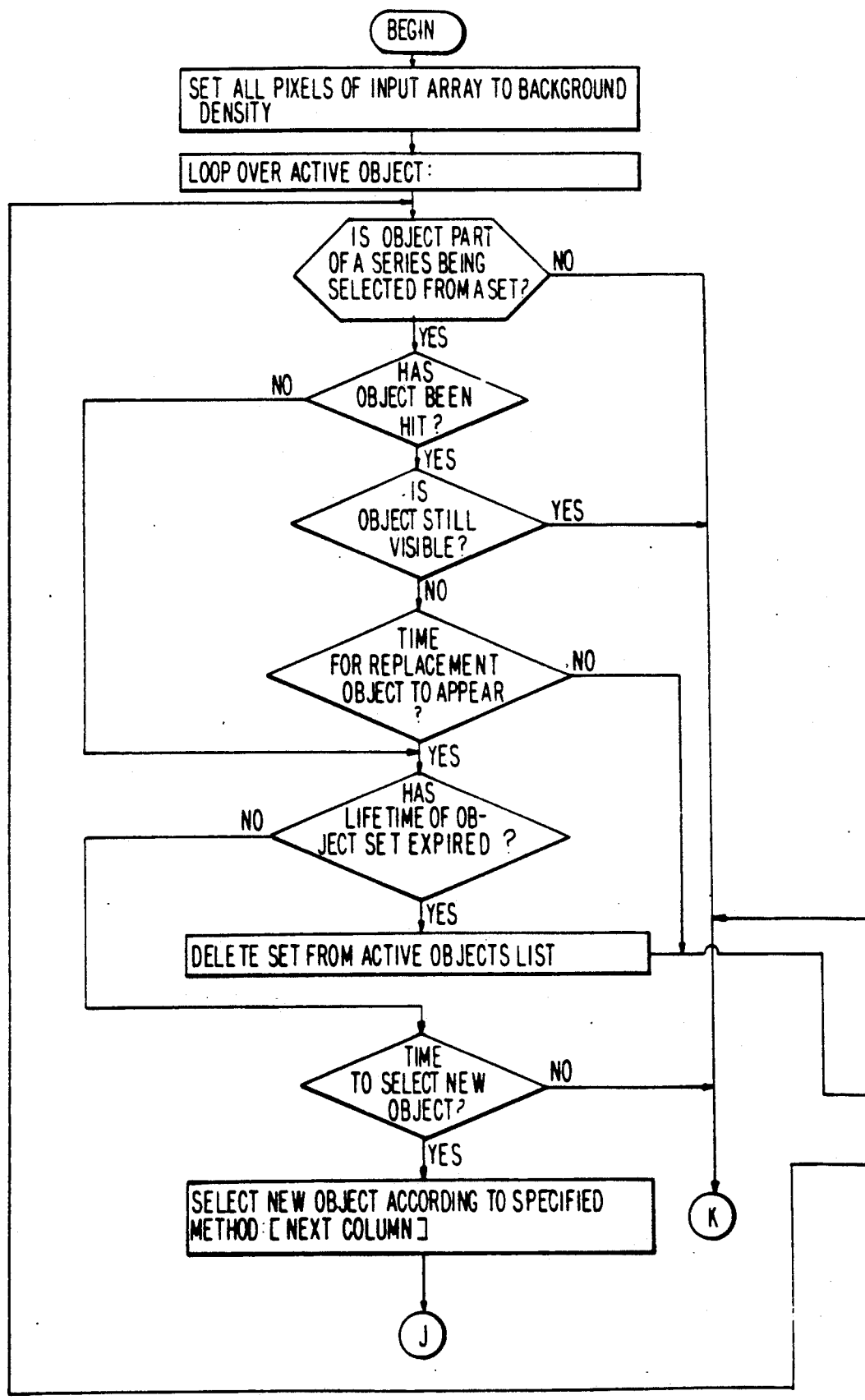
FIG. 18 A-E is a drawing depicting the simulation of the changing environment for the automaton of the present invention.
Figure 18B:
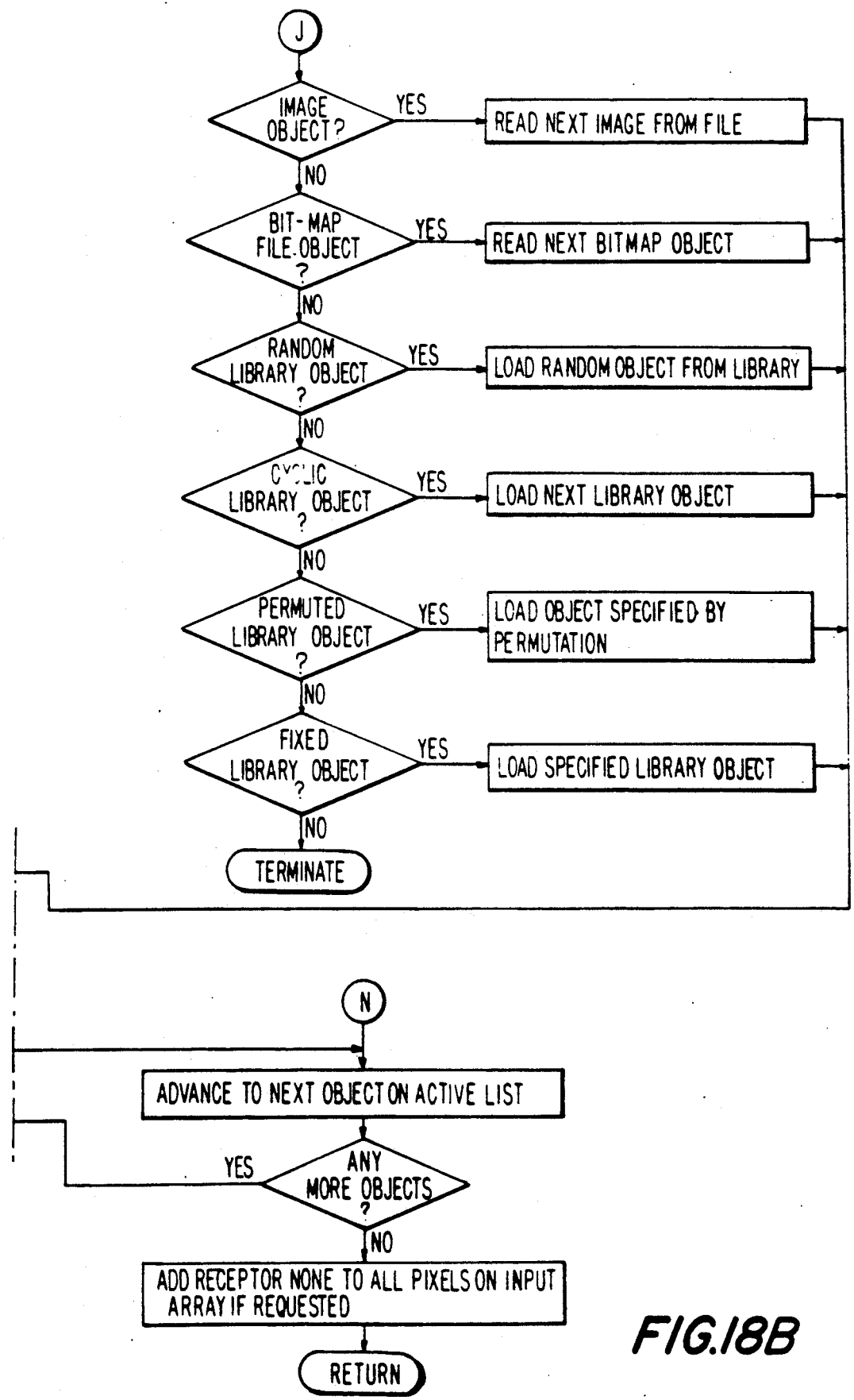
Figure 18C:
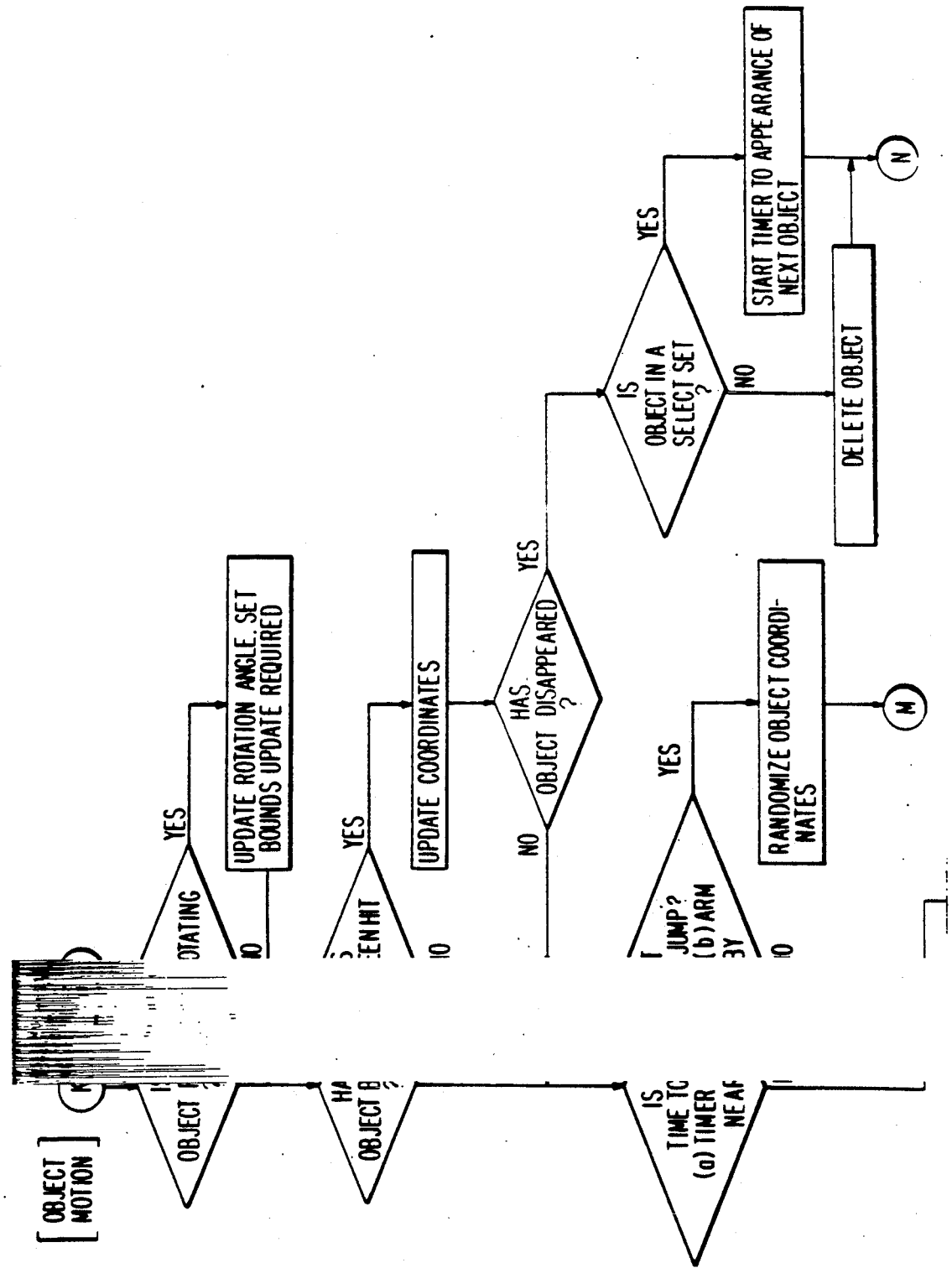
Figure 18D:
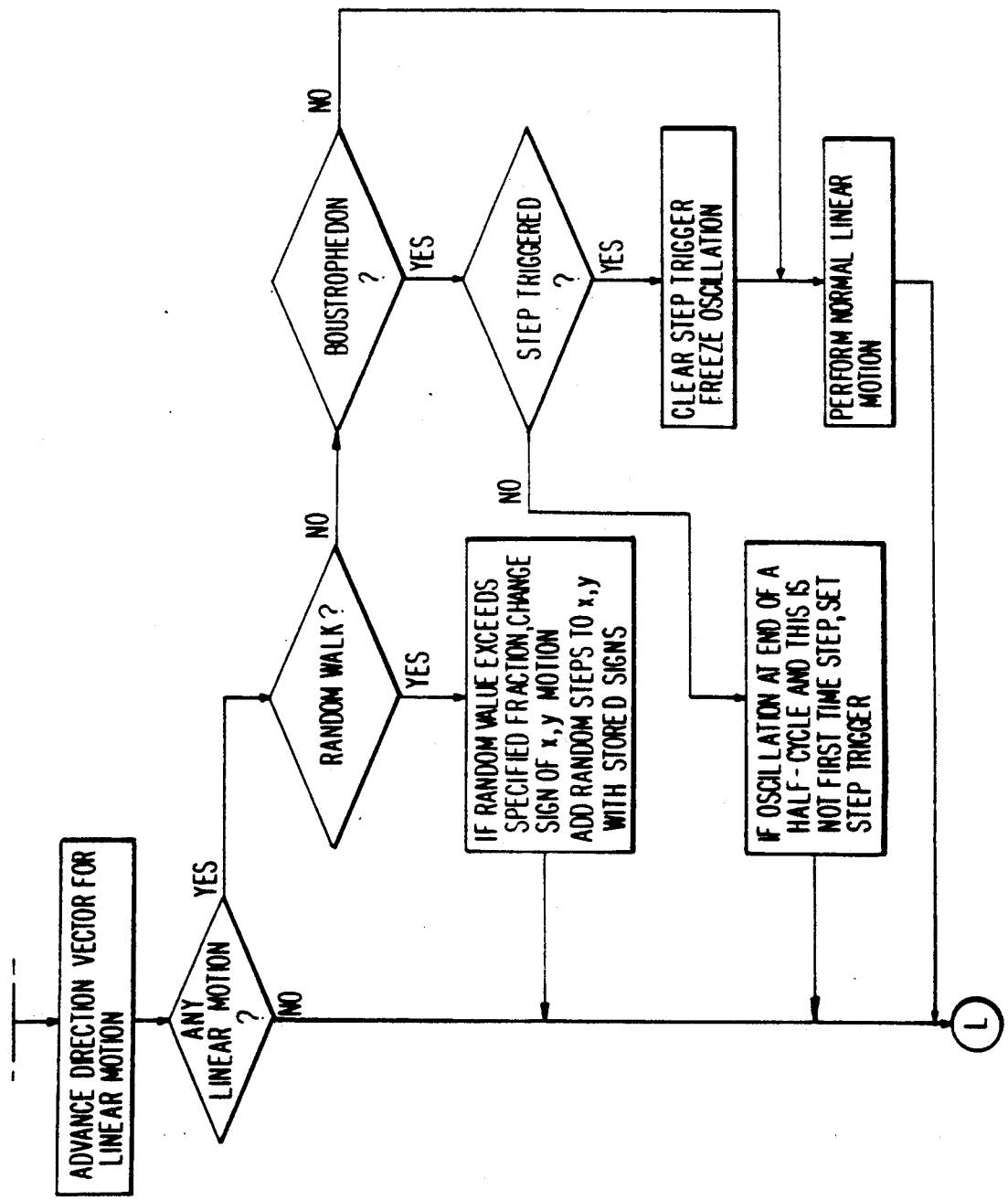
Figure 18E:
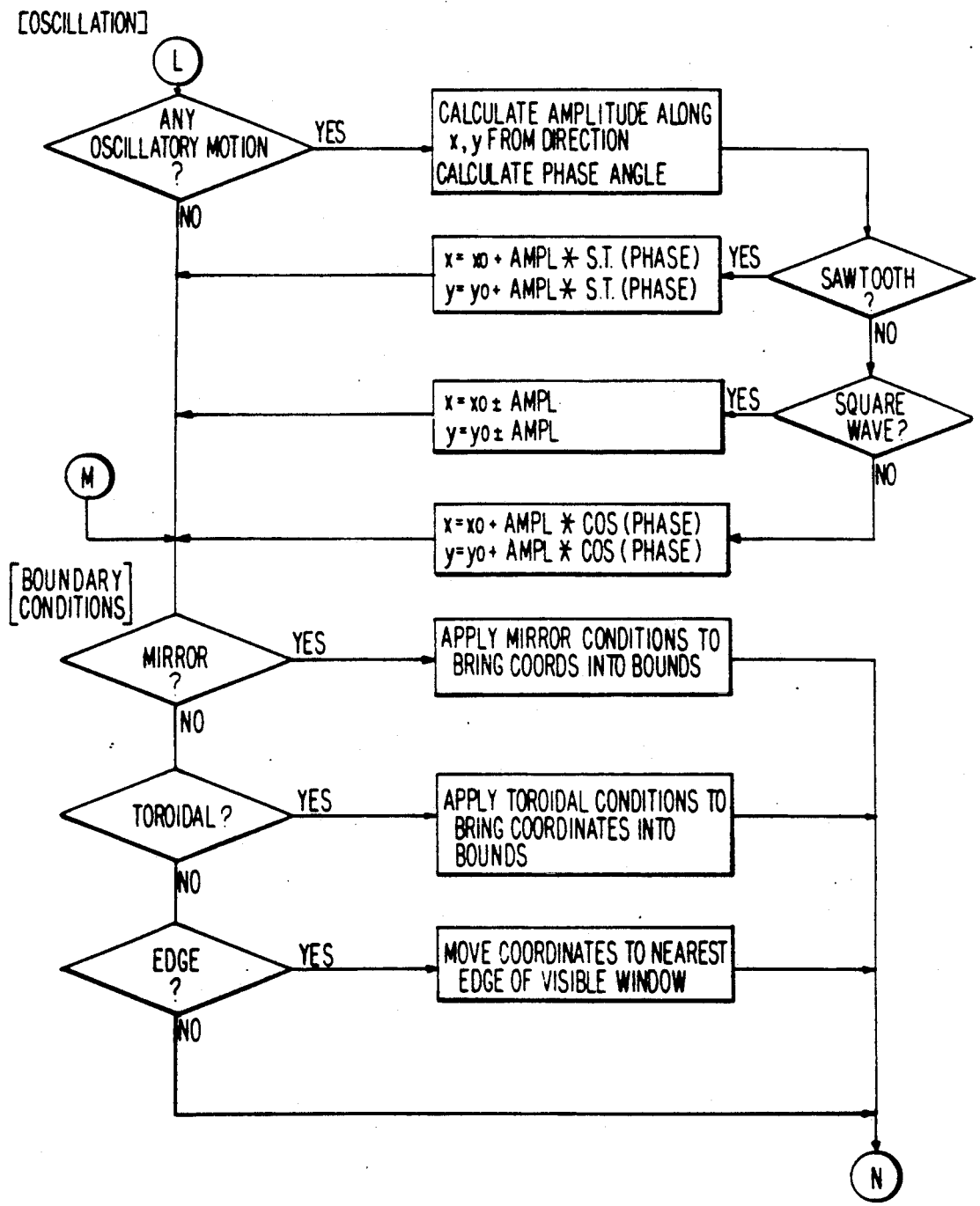

FIG. 16 is a flowchart showing the stages of the simulation of the preferred embodiment of the present invention. The stages comprise the following: a timer is started and default parameters are established that pertain to functions not explicitly set in the control file. Then a control file is interpreted to establish the particular embodiment of the automaton to be simulated. This file includes so-called Group I input, which pertains to sensors and effectors, and Group II input, which pertains to repertoires, cell types, and connections. Parameters from these inputs are stored in so-called "control blocks" for later use. Consistency checks are performed, flags are set requesting allocation of memory for optional variables and statistics, the storage requirements for these items are calculated, then the required storage is actually allocated. The display windows are located. Then the repertoires are generated and the environment in which the automaton will operate is established.

Group III input is interpreted to provide for control of stimulus presentation, printing and plotting options, value scheme parameters, reset options, and cycle parameters. A series of trials is then begun, each of which involves the presentation of one or more stimuli. Group III parameters may be charged at any time during the course of a simulation.

At the beginning of each trial, cells and effectors may be reset to a standard state if desired (for example, so that reaching may always be performed from a standard starting posture). The state of the environment is updated including the presentation of a new stimulus. Then the kinesthesia is evaluated (see details below), value is evaluated (see details below) and the neural repertoires are evaluated (see details below). The effectors are then moved in a manner that will be described in greater detail. According to the input parameters, the results are then printed and plotted. The status of the repertoires after training can be saved for later reuse as a performing automaton. The trial series continue until no more input is present.

FIG. 17 shows the steps in the generation of repertoires. First space is allocated for all repertoire data. A repertoire and a cell type are begun. Pointers to arrays for current and previous cell data are calculated and stored. Geometric connection types are initialized by calculating needed geometric constants and by allocating space for temporary storage and for normalization and falloff tables. Normalization tables contain values needed to adjust the strength of geometric connection types when the geometric area in question lies partly outside the boundary of the input cell layer. In such cases, the input to the geometric connection type may be multiplied by the ratio of the area of the complete geometric region to the area of the region that is inside the input cell layer, thus normalizing the input to that which would have occurred if the entire geometric area had fallen within the boundary of the input cell layer. Falloff tables contain values needed to adjust the strength of geometric connection types according to the distance of the geometric area in question from the center of the input cell layer. Falloff tables may be used when it is desired to favor stimuli that fall near the center of a sensory cell repertoire by reducing the amount of lateral inhibition produced by stimuli that are farther from the center. Both normalization and falloff corrections are calculated at this time and stored in tables for later use. This is repeated for each geometric connection type.

Next, the specific connection types are initialized. As each specific connection type is begun, various constants needed for the later calculations are initialized, and files are opened if connectivity patterns or connection strengths are to be read from external files. If a previously saved run is to be utilized as a starting point, the saved states of the repertoires are retrieved from external storage at this point. File headers are checked to determine if the repertoire names and parameters match the current run. The saved states, consisting of $s_i$ values for the last two time steps, and the saved connection data ($c_{ij}$ and $1_{ij}$) are read in.

If previously stored $s_i$ values are not being used, then all cells in a cell type are initialized one-by-one. For each cell, group number and x, y coordinates are set and all connection data are zeroed. A loop over connection types is then executed. For each connection type, setup code appropriate to the methods of $c_{ij}$ and $1_{ij}$ generation specified by the group I or group II input is executed: in the case that $c_{ij}$ values are set from externally supplied matrices, the appropriate matrix is located; in the event that $c_{ij}$ values are set in a gradient pattern known as a "motor map", the orientation of the motor map is established; in the event that $c_{ij}$ values are chosen randomly, a generating seed is selected.

For each new connection, the $c_{ij}$ generation code is executed. Depending upon the type of generation, a $c_{ij}$ value is chosen: For a motor map an increment is applied to the previous value; for random $c_{ij}$, a random value is generated; for matrix $c_{ij}$ a value is picked up from a file and when all the input values have been used the list of values is recycled from the beginning. The $1_{ij}$ generation code is then executed to define the connectivity matrix.

These steps continue until all cell types and repertoires have been generated. The various options allow generation of diversity in many forms within the repertoire. This diversity is central to the construction and operation of the present invention.

FIG. 18 depicts the stages in the updating of the state of the environment and of the retinal cells of the input array. This is for test purposes only; in an actual device sensors in the real environment are used. The steps are as follows: All pixels of the input array are set to the background density; then a loop is executed over all active (i.e. visible) objects. Each object is moved according to its pre-established pattern of motion, or, alternatively, an object may be removed from the environment and replaced by a newly selected object. Motions that may be generated in this simulation include rotation, random jumping, linear motions and oscillation in various patterns. In addition, an object may be moved because it has been hit by the arm of the automaton. When an object reaches the edge of the input array, it may be caused to undergo various boundary condition operations: it may disappear, it may be reflected back by a mirror reflection, it may reenter at the opposite edge (toroidal boundary condition), or it may remain fixed at the edge. Pixels covered by the object are then set to appropriate brightness values. These values are calculated to match the values that would be measured by a television camera viewing a corresponding real object at the same position.

Figure 19A:
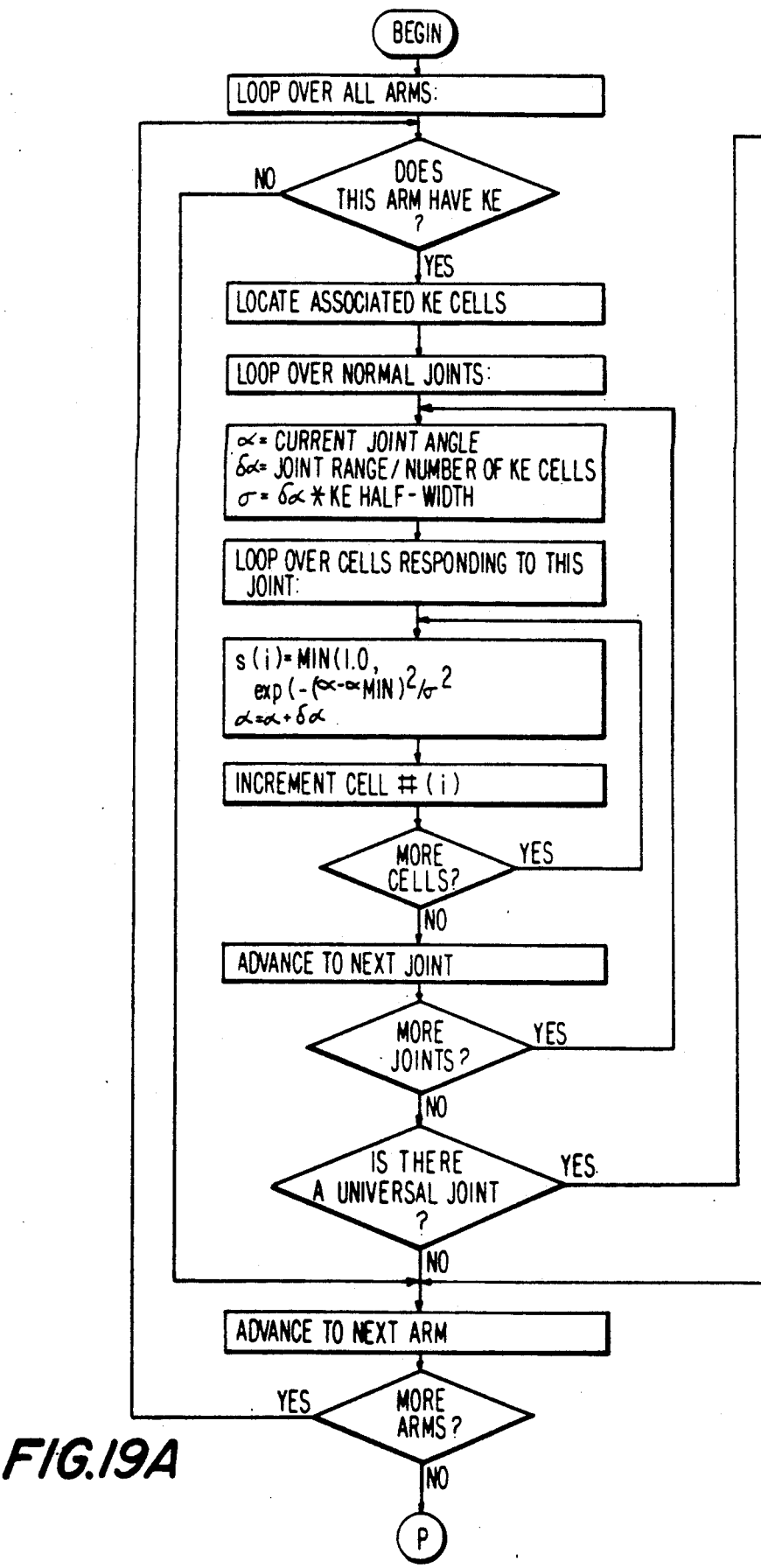
FIG. 19 A-C is a drawing of the evaluation of kinesthesia for the automaton of the present invention.
Figure 19B:
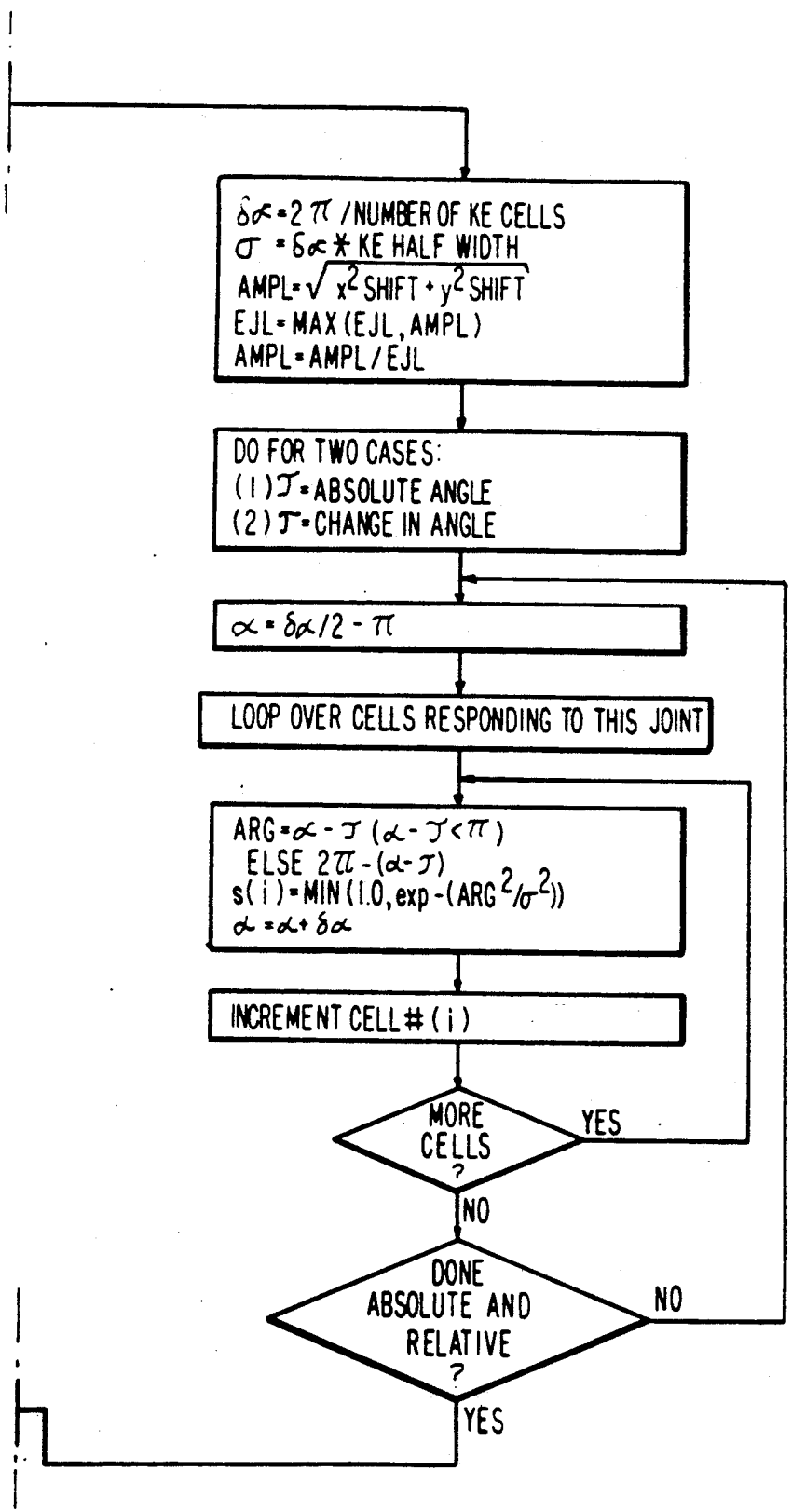
Figure 19C:
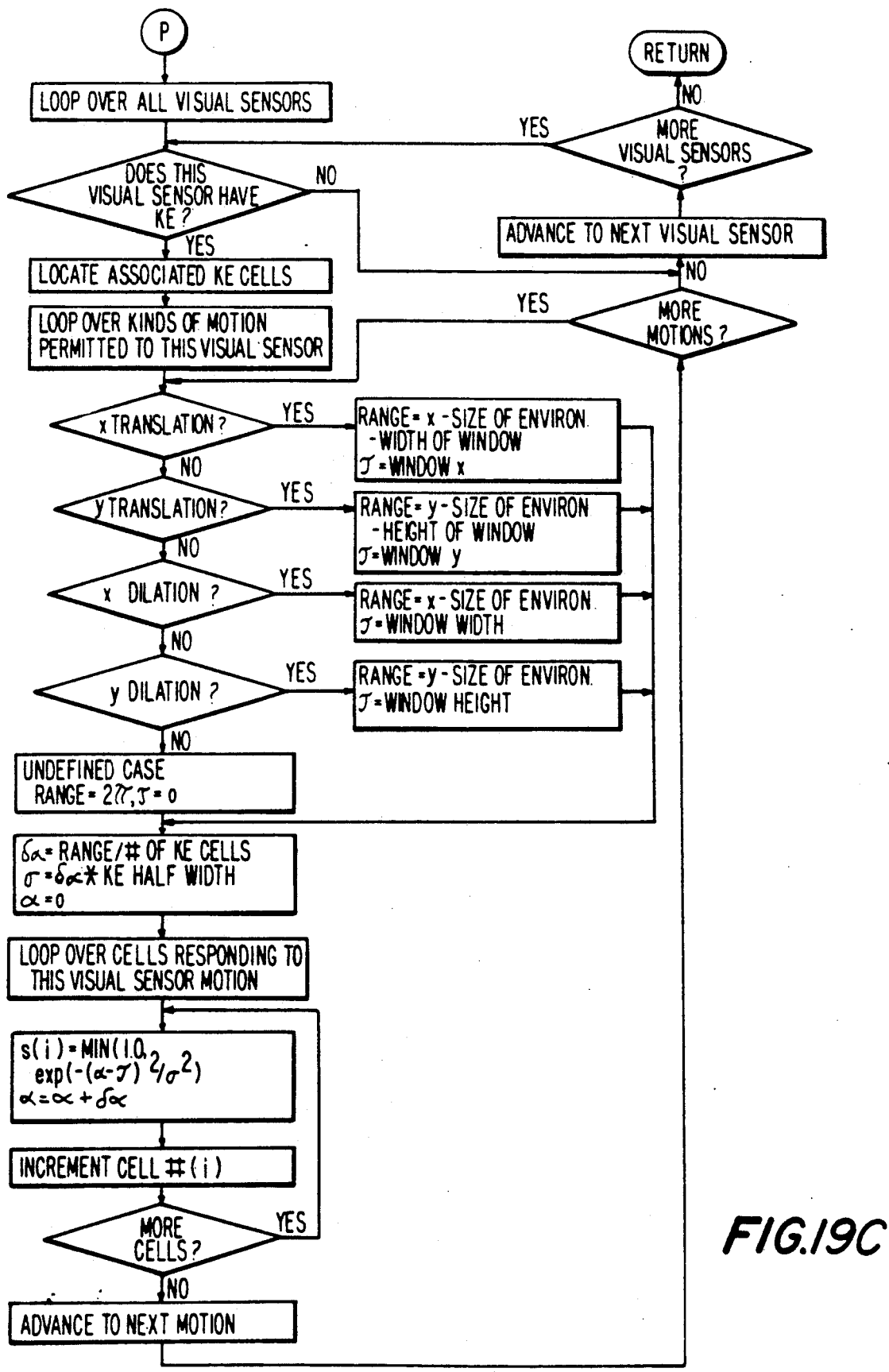

FIG. 19 shows the steps in the evaluation of kinesthesia. This is for test purposes only; in an actual device stretch or velocity sensors in the real effector arms are used. For each arm, the cells responding to kinesthetic sensors in that arm are located, and for each joint the following values are calculated: $\alpha$ = the current joint angle, $\delta$ = the joint range/number of KE cells, and $\sigma = \delta\alpha * KE$ half width. Then for each of the cells responding to each such joint the following values are calculated:

$$s_i = Min(1.0, exp(-(\alpha - \alpha_{min})^2/\sigma^2))$$

$$\alpha = \alpha + \delta\alpha$$

If there is a universal joint (the special type of shoulder joint used in tracing) the following values are calculated instead:

$$\delta\alpha = 2\pi/\text{number of KE cells}$$

$$\sigma = \delta\alpha * KE \text{ half width}$$

$AMPL = \sqrt{(x^2_{shift} + y^2_{shift})}$—(This is the distance the universal joint has moved from its starting position.)

$EJL = Max(EJL, AMPL)$—(This is the maximum distance the universal joint has moved since the start of the current run.)

$AMPL = AMPL/EJL$ (This is the amplitude of universal joint motion as a fraction of the largest motion which has so far occurred.)

These operations may be carried out using for x shift, y shift either the absolute joint angle o the change in the angle since the previous time step, whichever works better for a particular categorization task. Then for each cell responding to the joint the following is calculated:

$$ARG = \alpha - T (\text{if } \alpha - T < \pi) \text{ else } 2\pi - (\alpha - T)$$

$$s_i = Min(1.0, exp-(ARG^2/\sigma^2))$$

$$\alpha = \alpha + \delta\alpha.$$

Then for each of the visual sensors of the automaton having kinesthetic sensors, the following is calculated:
T = current position of eye muscle in question
$\delta\alpha$ = Range of eye motion/number of KE cells
$\sigma = \delta\alpha * KE$ half width
Then for each cell responding to the eye muscle the following is calculated:

$$\alpha = 0$$

$$s_i = Min(1.0, exp(-(\alpha - T)^2/\sigma^2))$$

$$\alpha = \alpha + \delta\alpha.$$

Figure 20A:
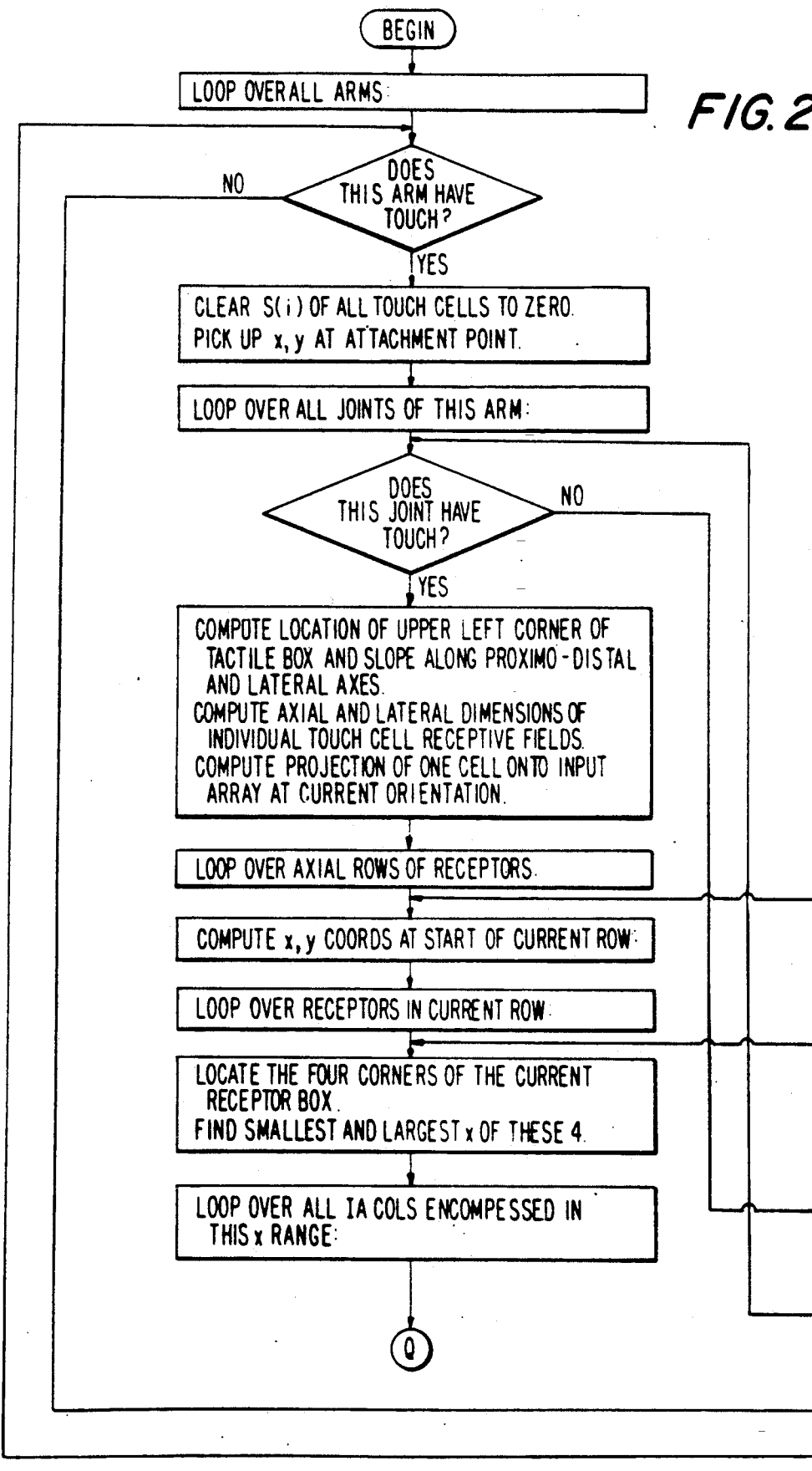
FIG. 20 A-B is a drawing of the evaluation of touch for the automaton of the present invention.
Figure 20B:
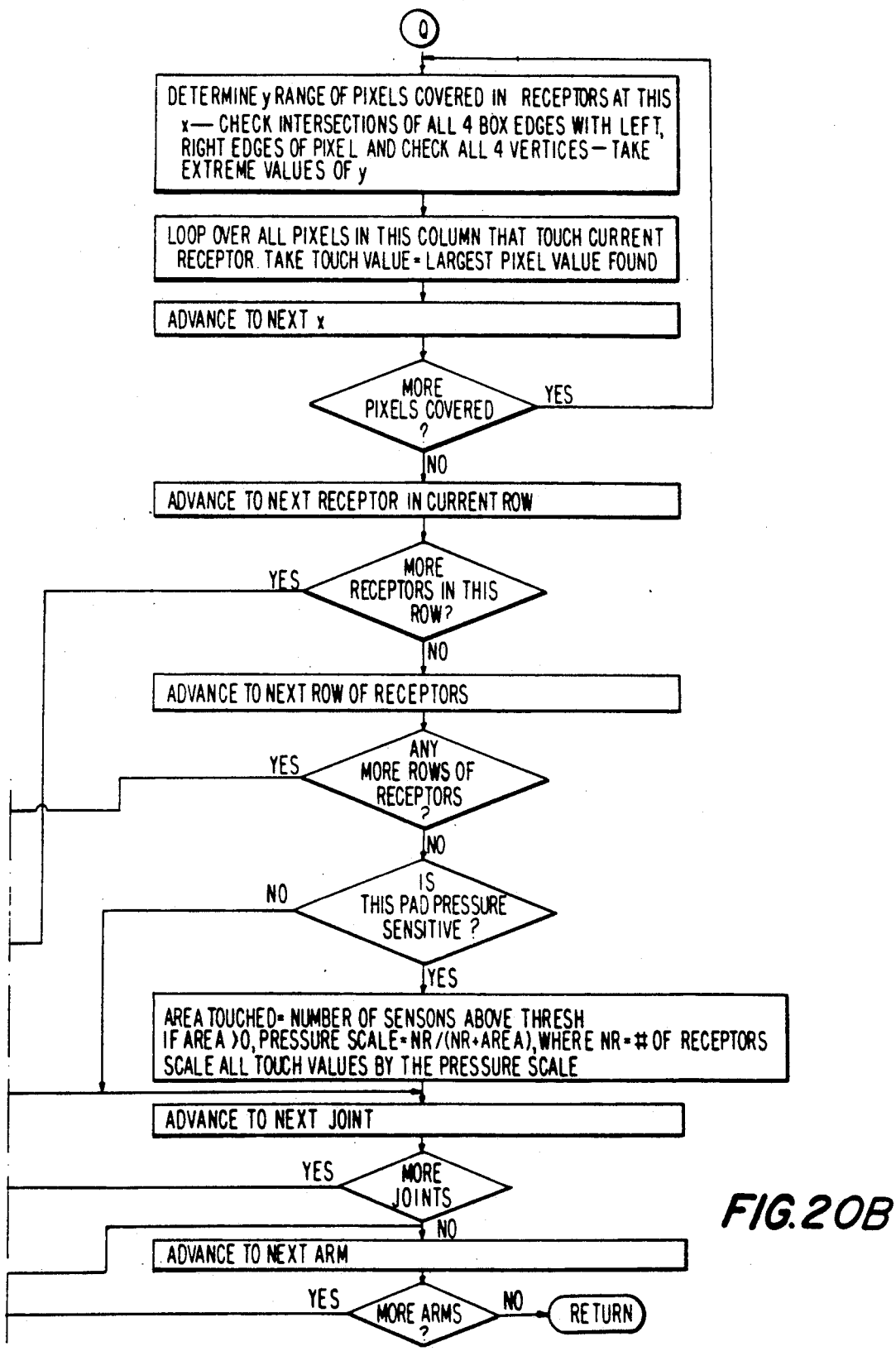

FIG. 20 is a flowchart for the evaluation of touch by the present invention. Touch receptors may be arranged in a rectangular pattern on any of the joints of a given arm, but usually they are placed only on the distal end. As with the case of vision and kinesthesia discussed above, the simulation of touch rectors is for test purposes only; in an actual device, pressure sensors on the real arm are used. For each of the arms with touch the $s_i$ value of all touch cells is first cleared to 0. Then x,y is picked up at the attachment point. For each joint of the arm the position of that joint in the environment is calculated. If the joint has touch receptors, the location of the upper left corner of the tactile box (the collection of touch receptors on that segment) and the orientations of the proximo-distal and lateral axes are calculated. Then the axial and lateral dimensions of the individual touch cell receptive fields are computed. The projection of each such cell onto the input array at the current orientation is then computed. (In order to optimize the speed of this calculation, the four corners of the receptor box are located and the smallest and largest x of these four is found. Only x coordinates in this range are examined. For each such x, the range of pixels covered in the y direction by receptors at this x value is then determined and all pixels in this y range are examined.) For each pixel so examined that contains a non-background value, the corresponding touch receptor is activated.

Figure 21A:
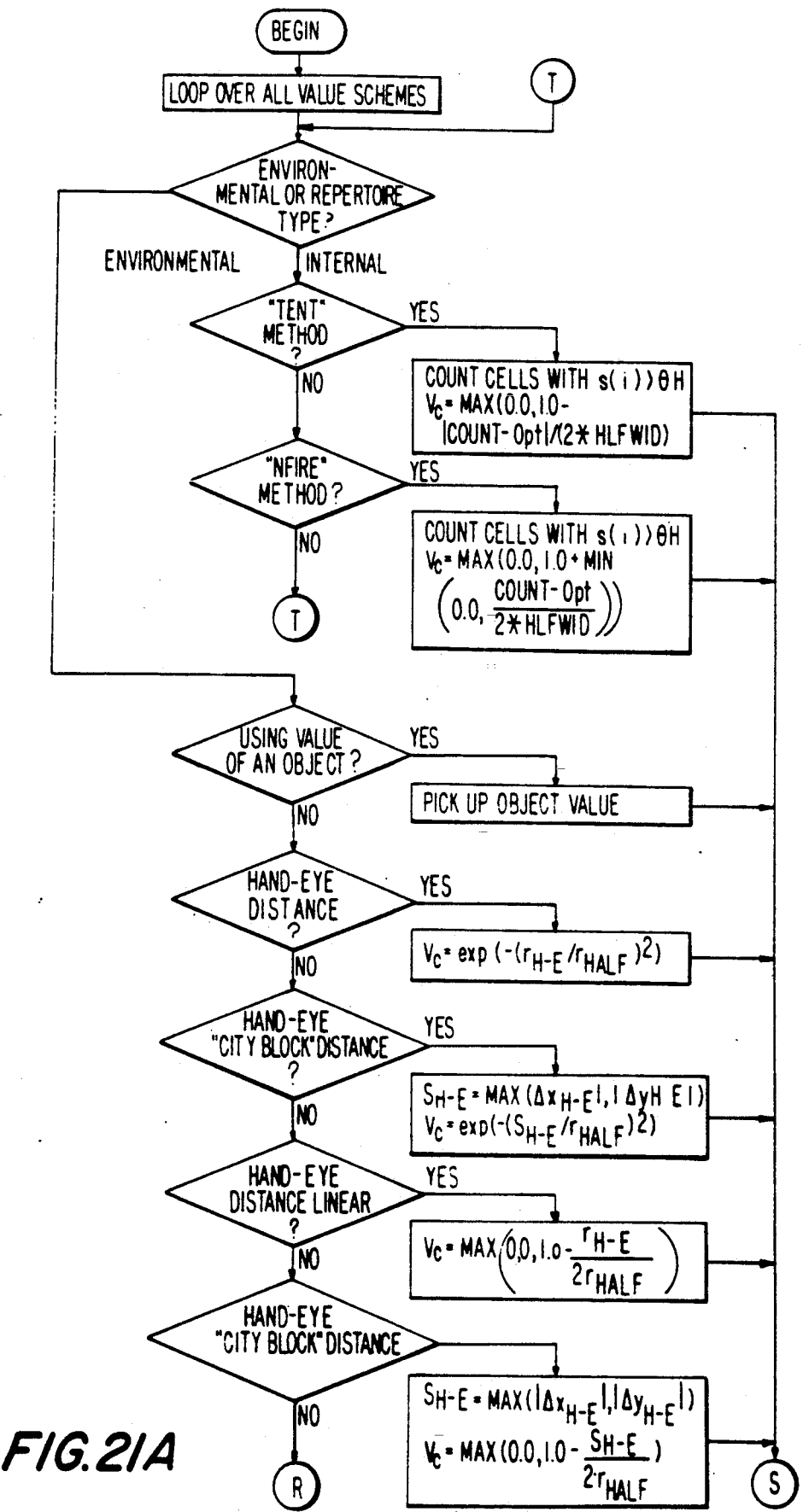
FIG. 21 A-B is a drawing of the evaluation of values for the automaton of the present invention.
Figure 21B:
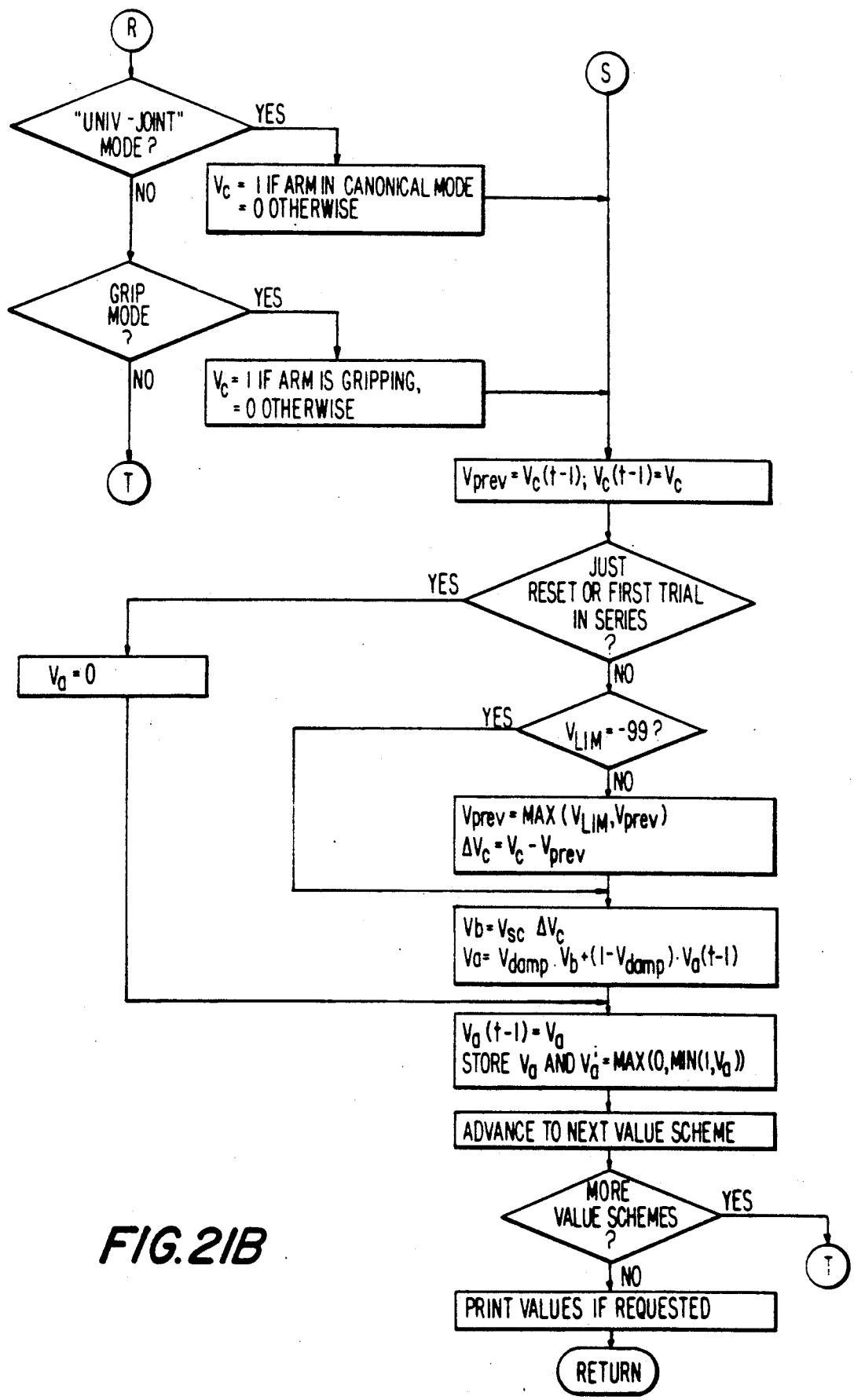
Figure 22A:
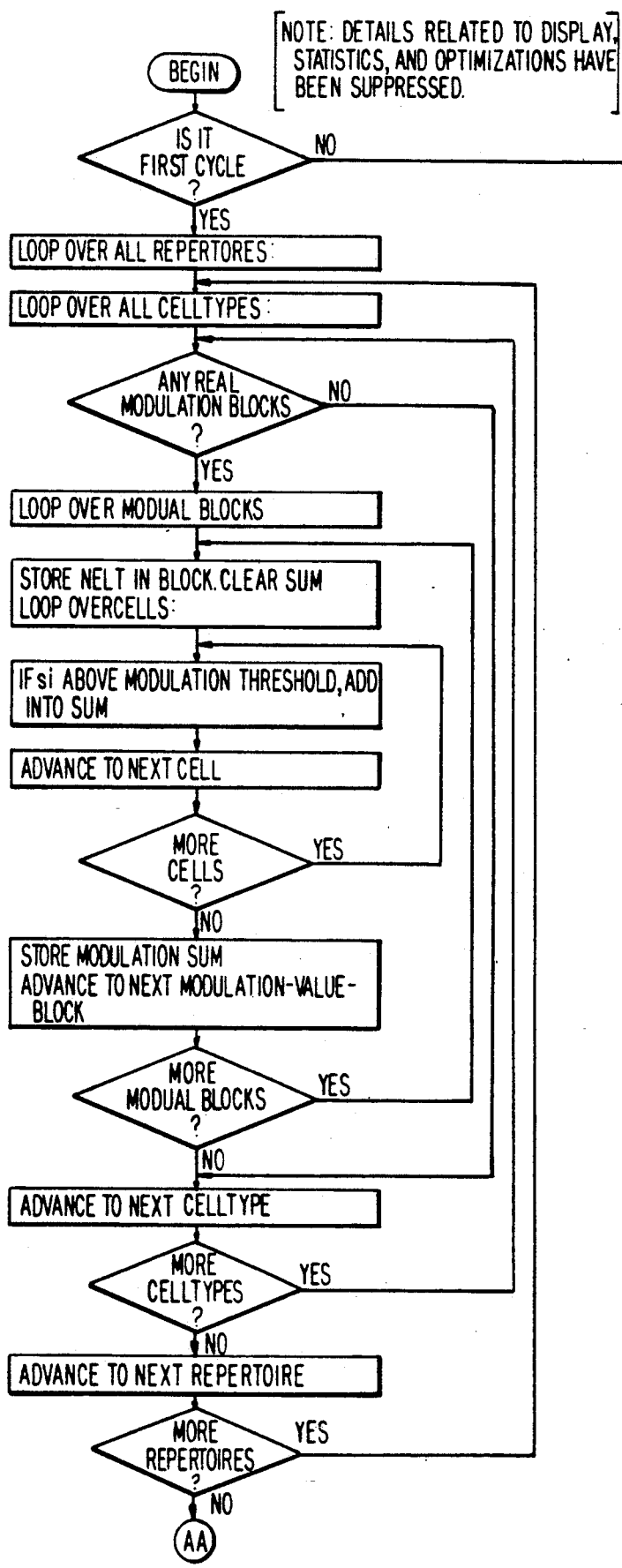
FIG. 22 A-D is a drawing depicting the evaluation of neural repertoires for the automaton of the present invention.
Figure 22B:
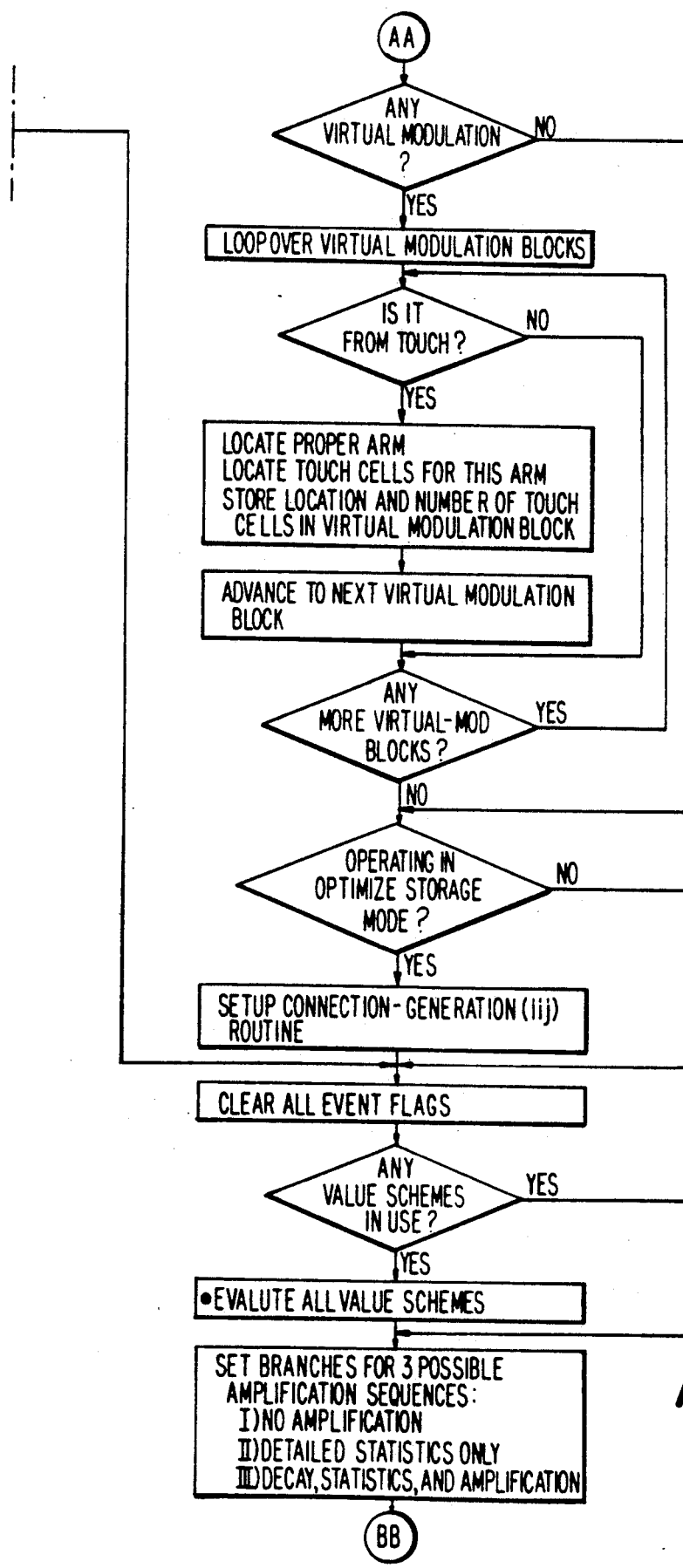
Figure 22C:
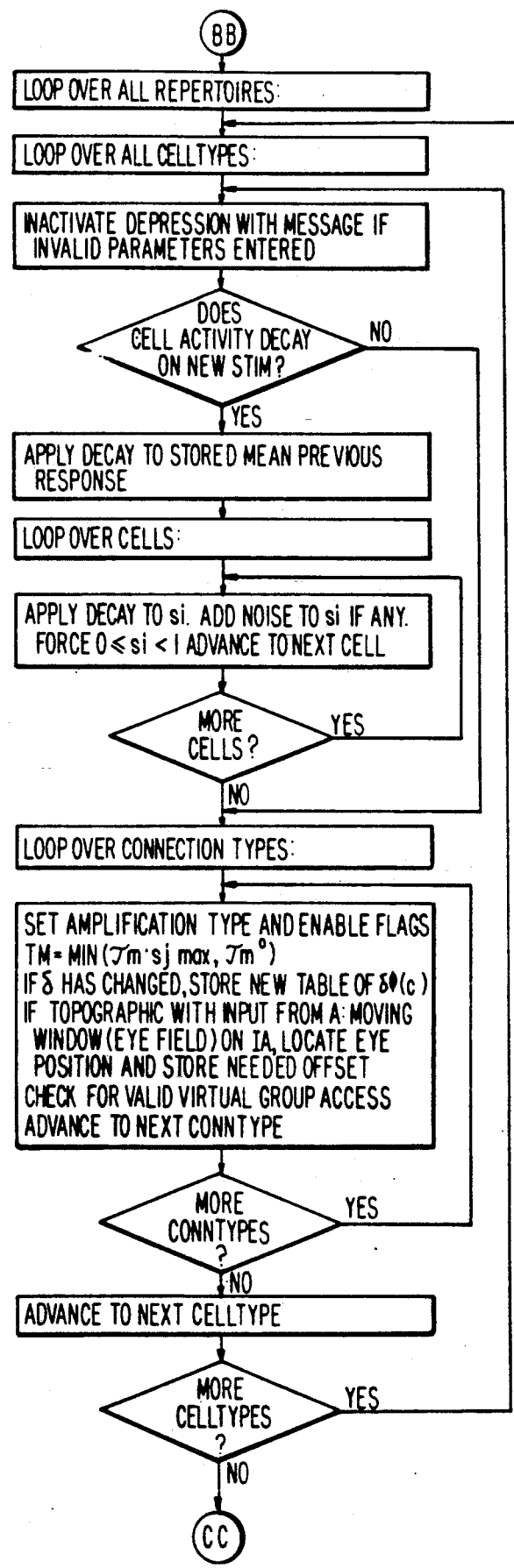
Figure 22D:
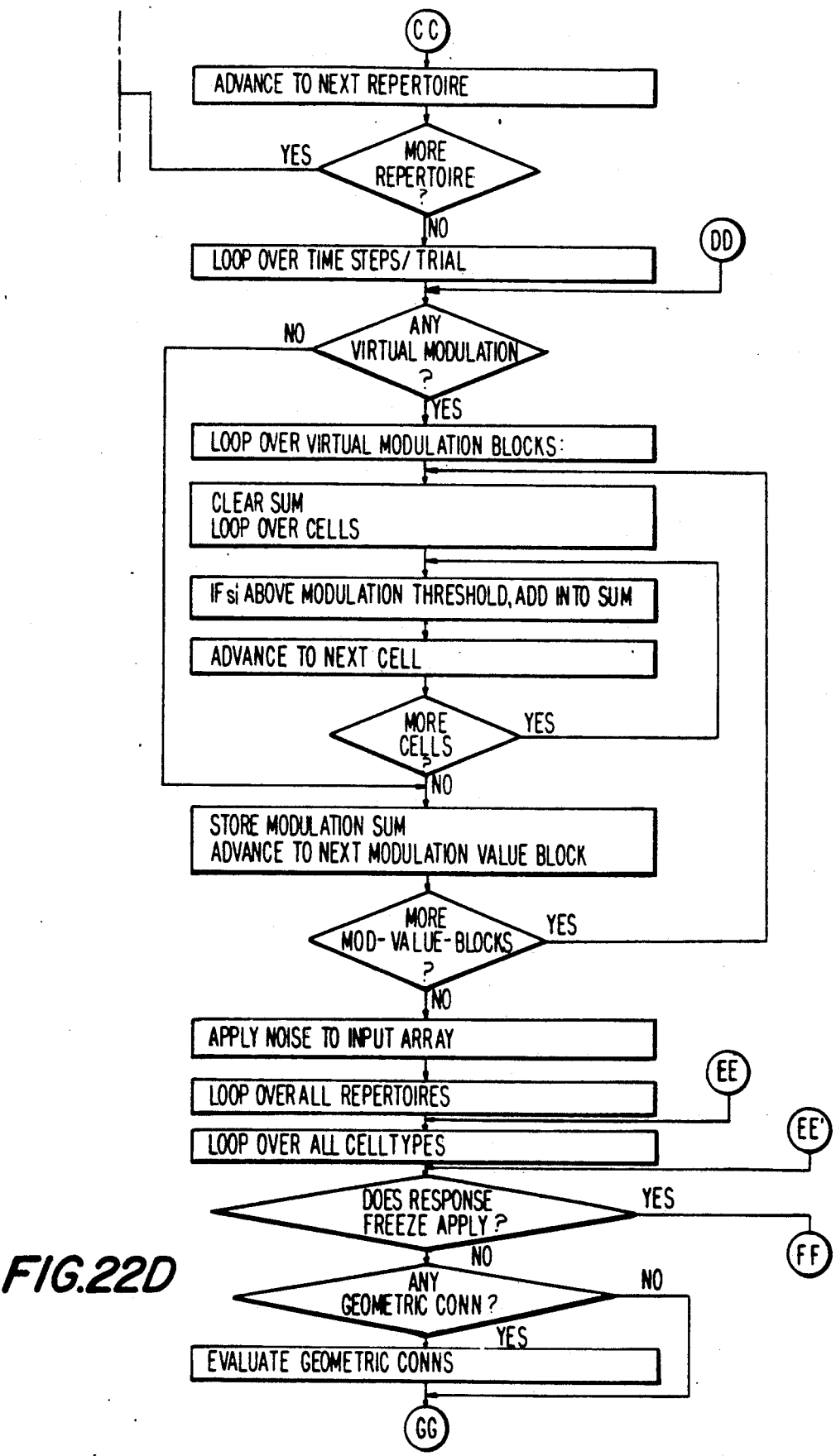
Figure 22E:
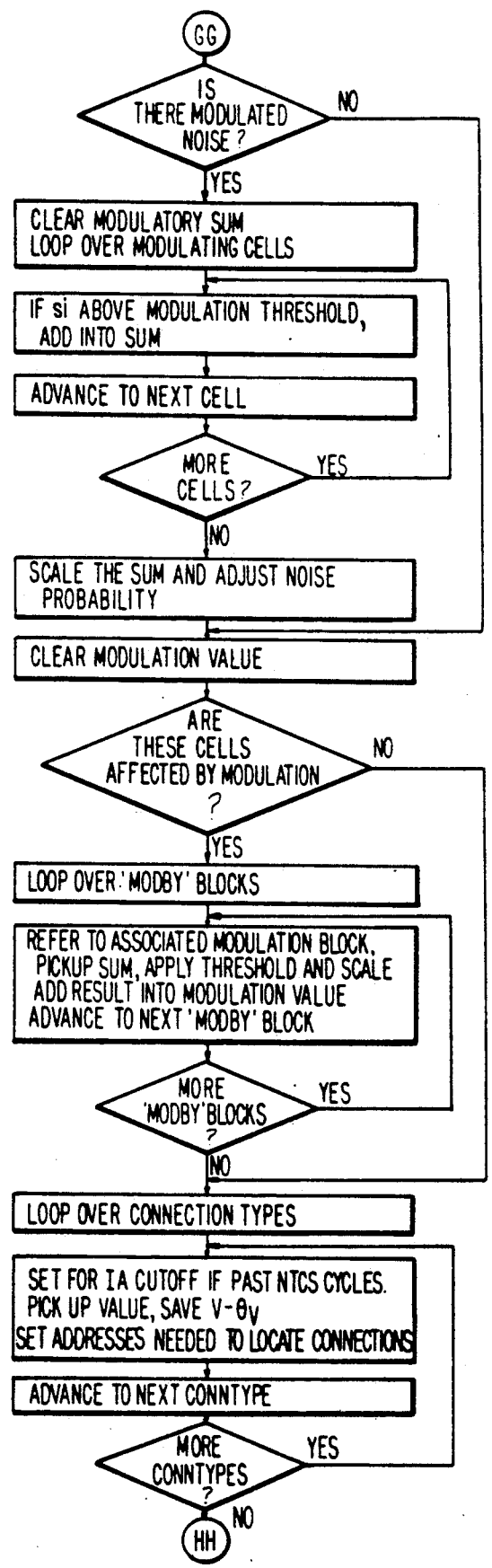
Figure 22F:
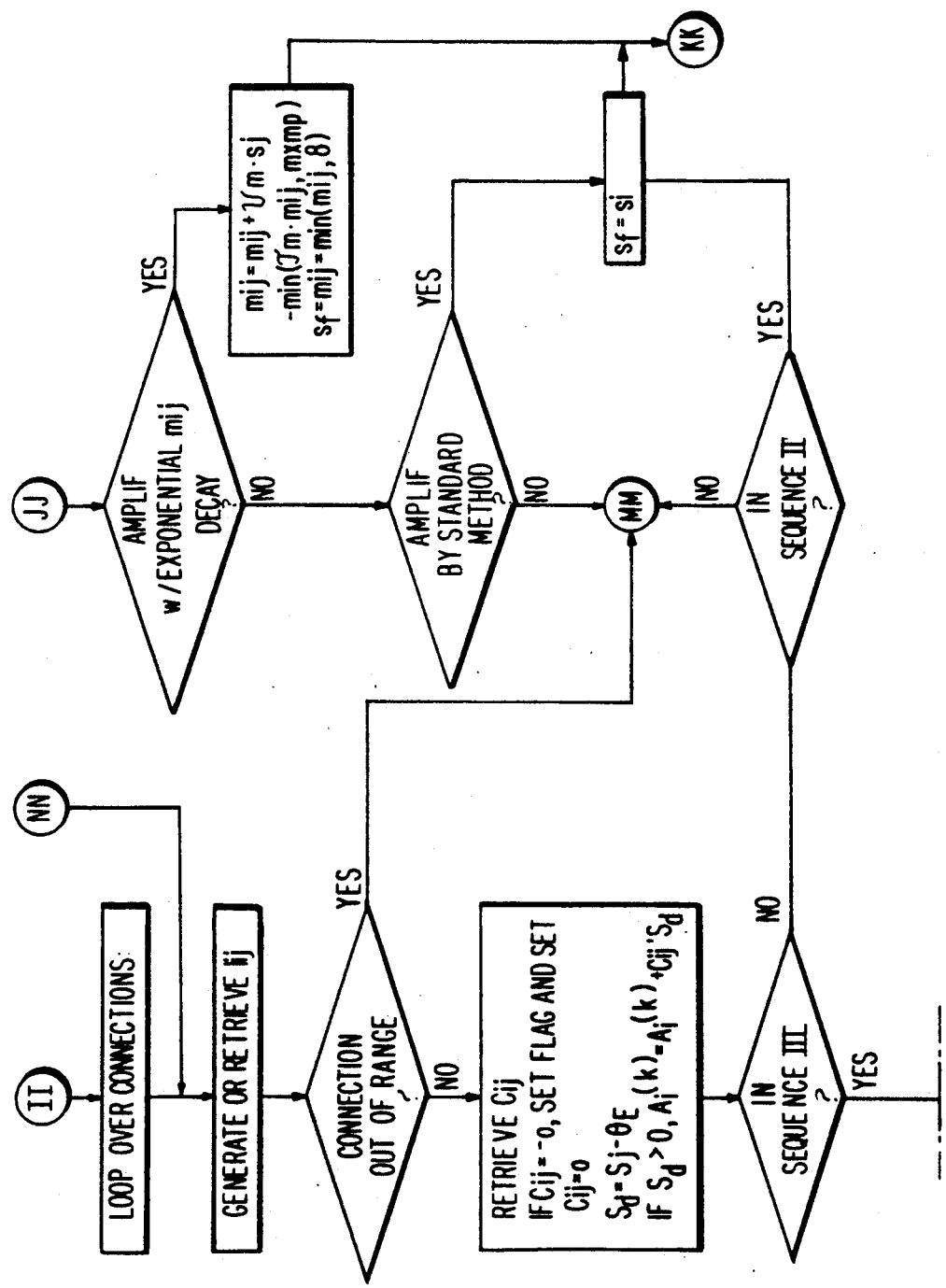
Figure 22G:
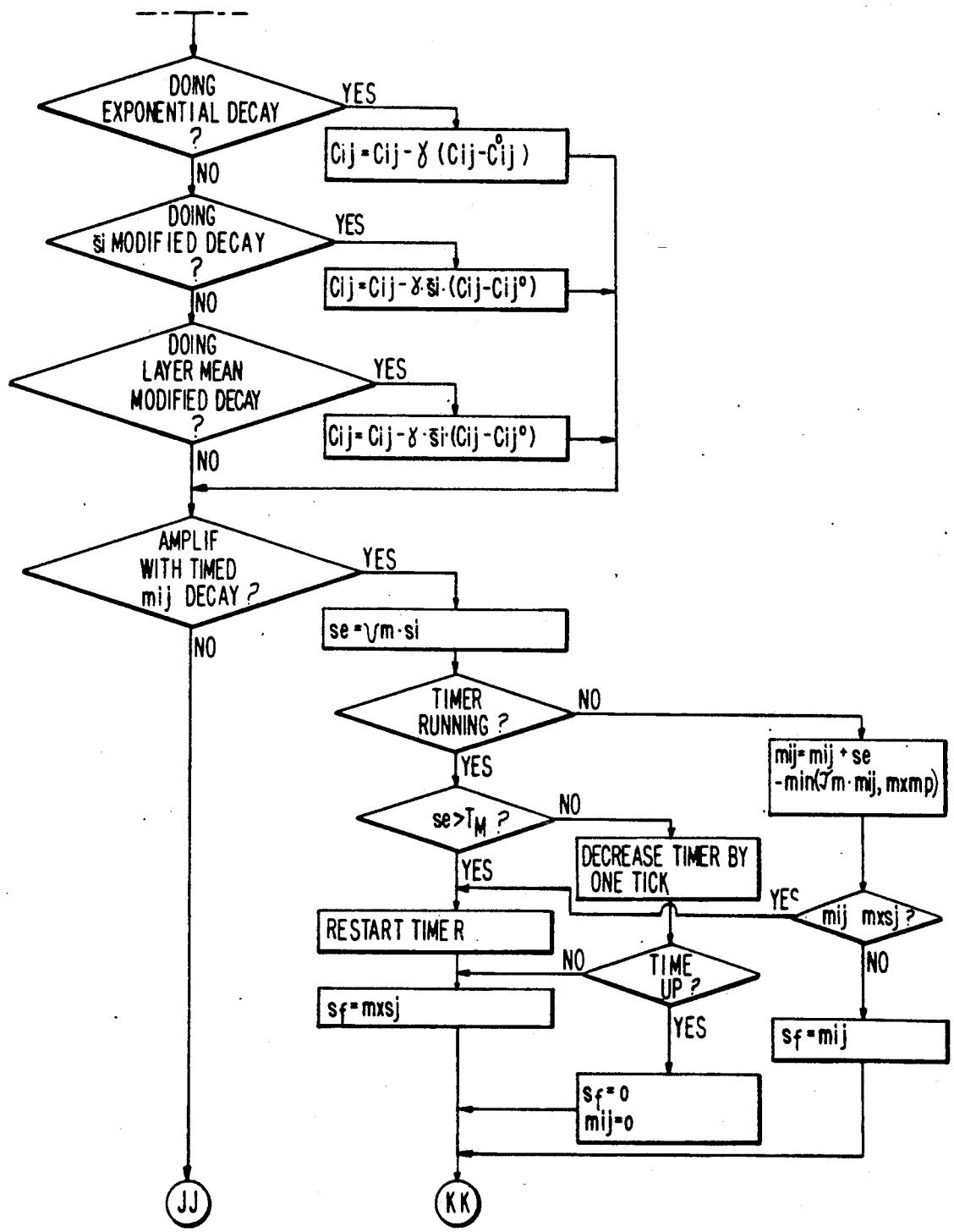
Figure 22H:
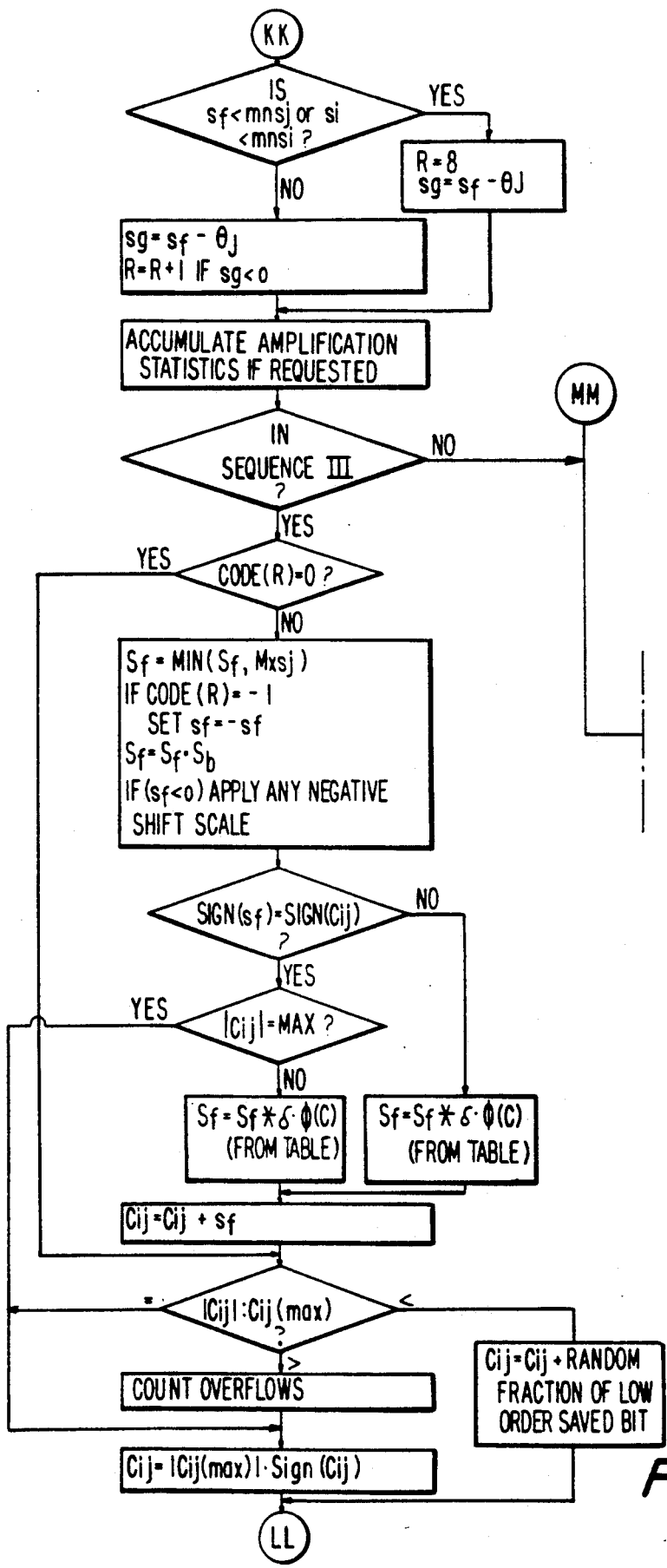
Figure 221:
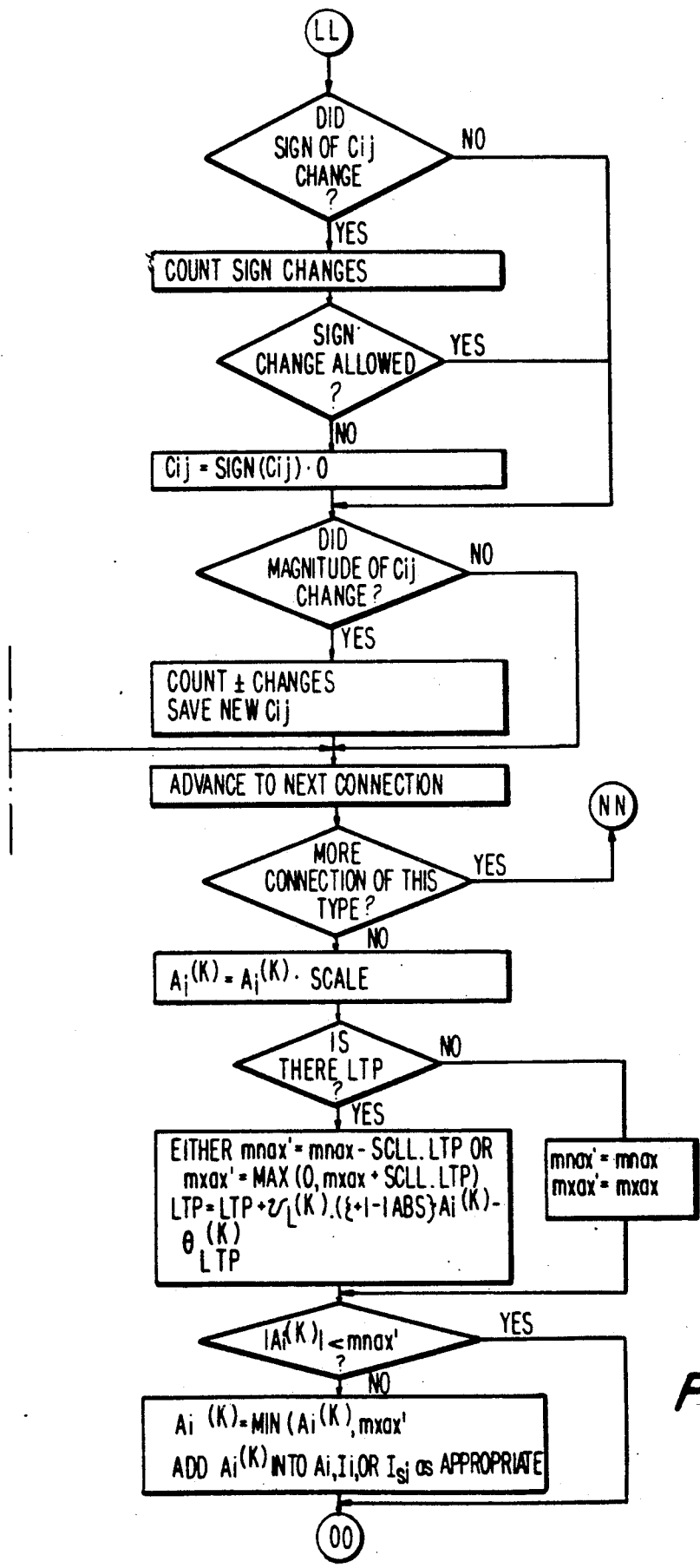
Figure 22J:
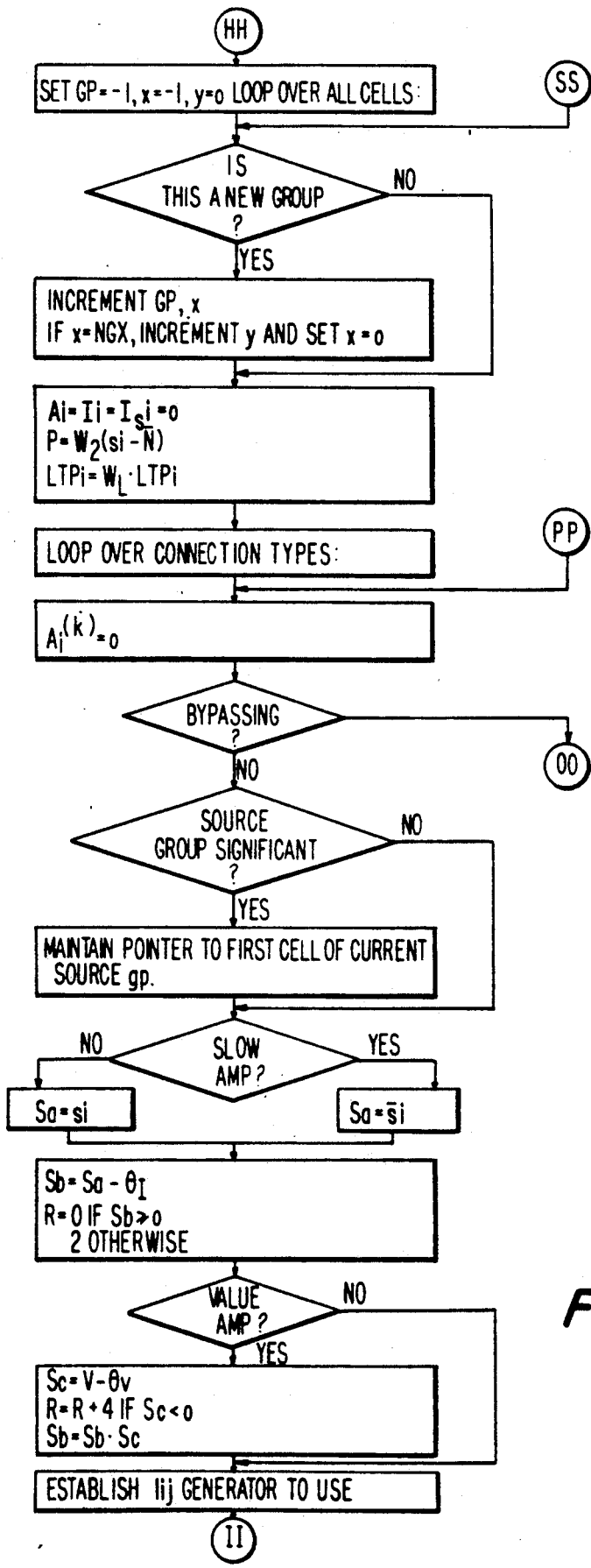
Figure 22K:
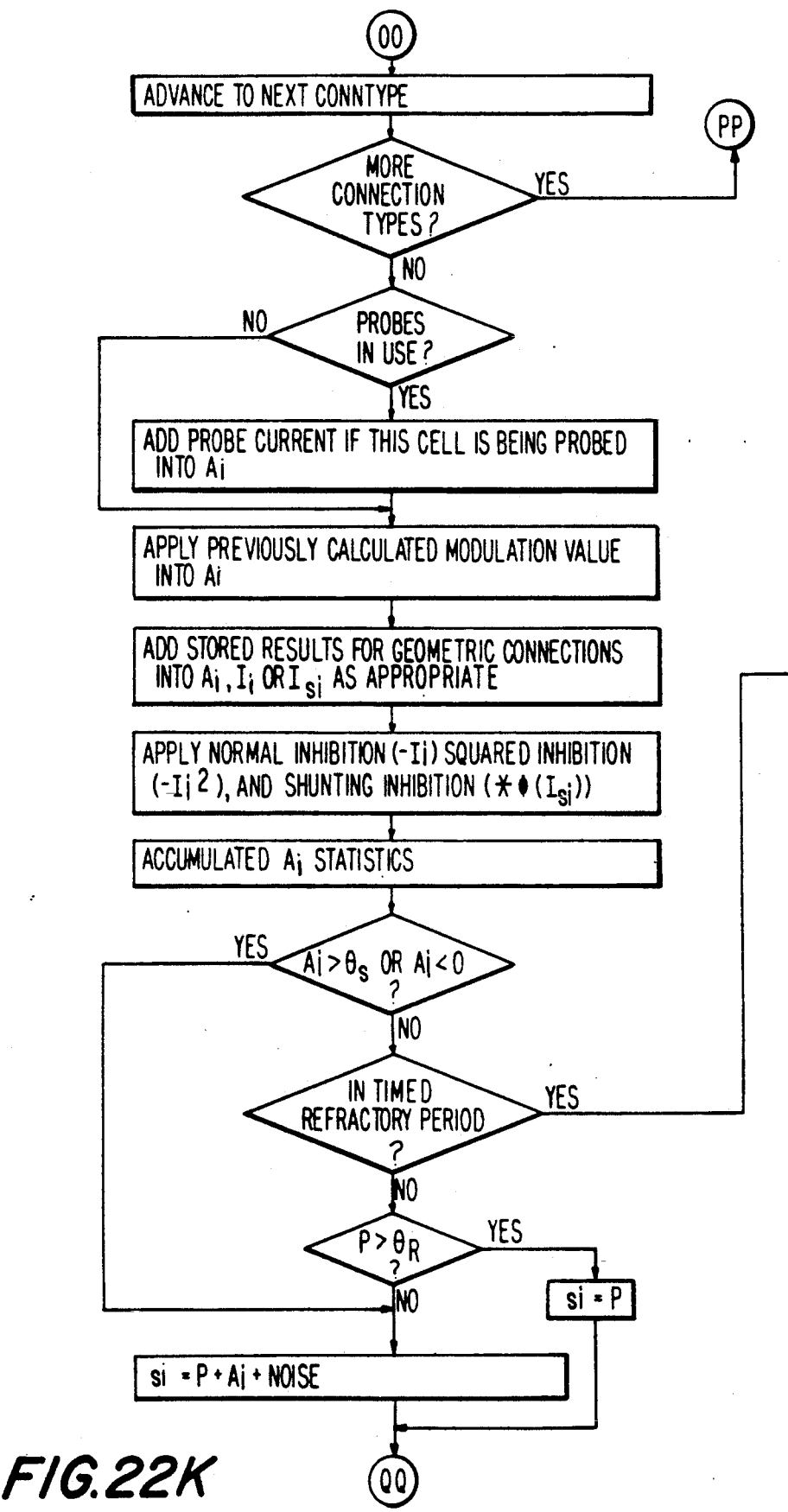
Figure 22L:
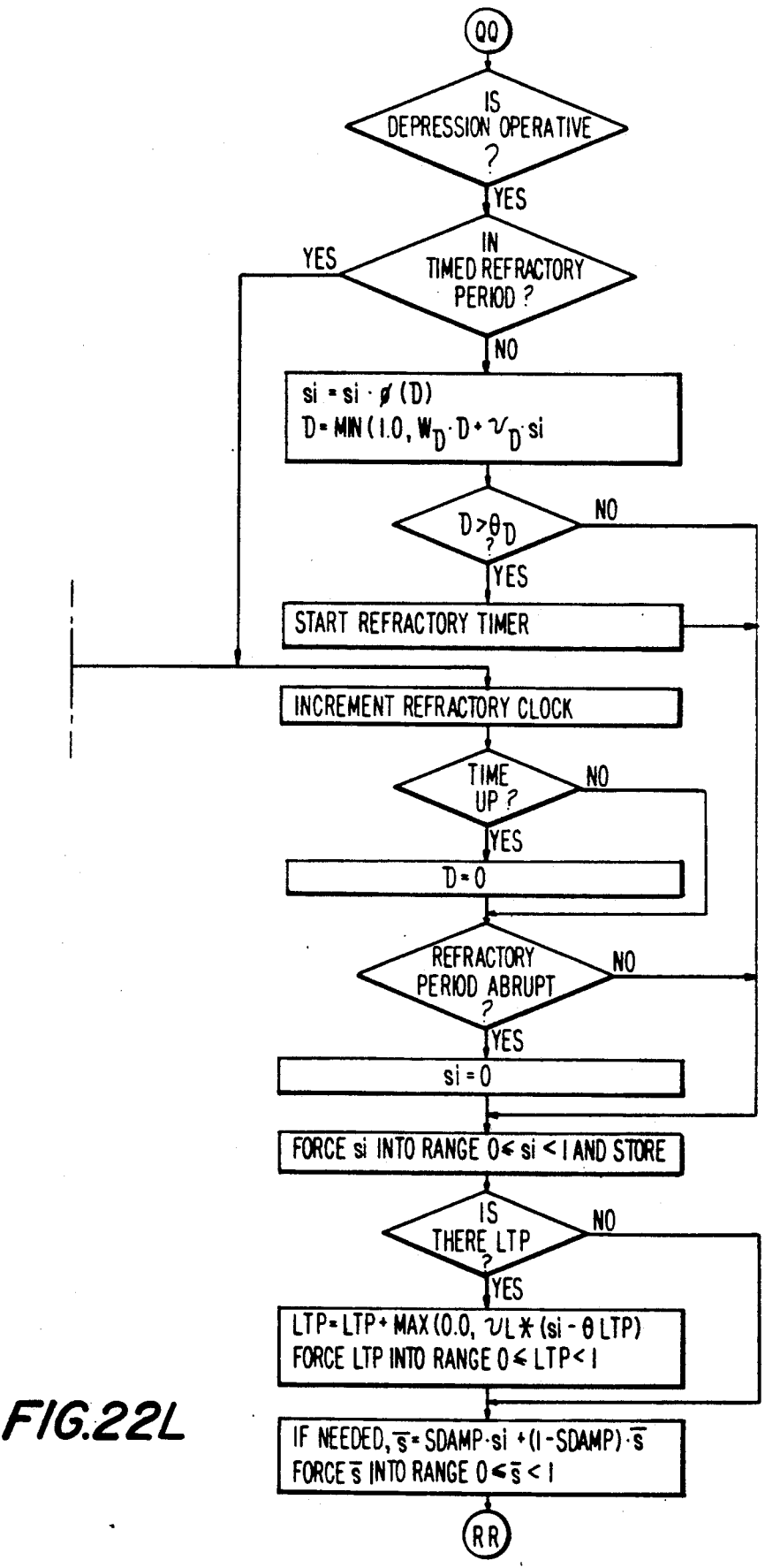
Figure 22M:
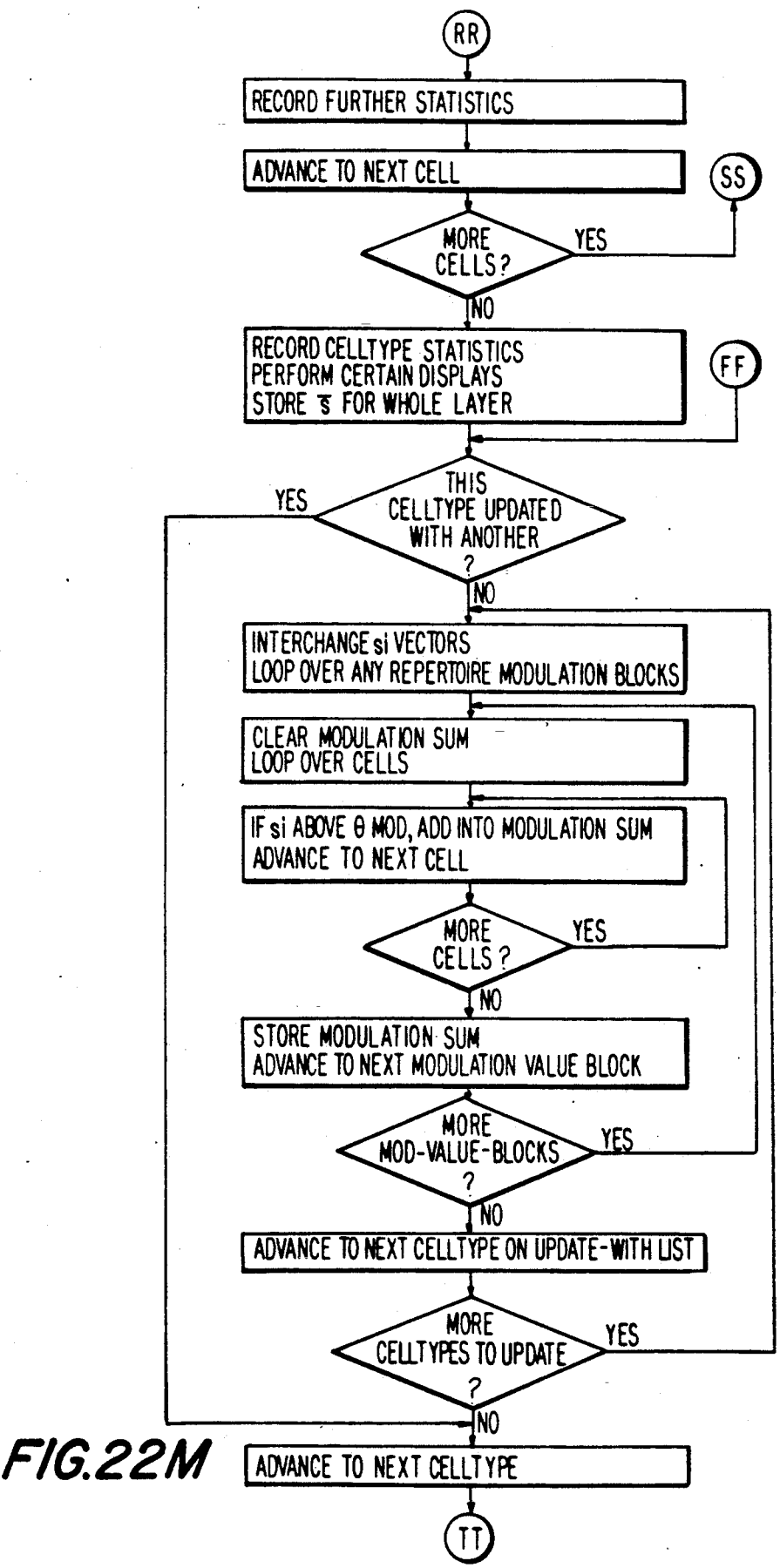
Figure 22N:
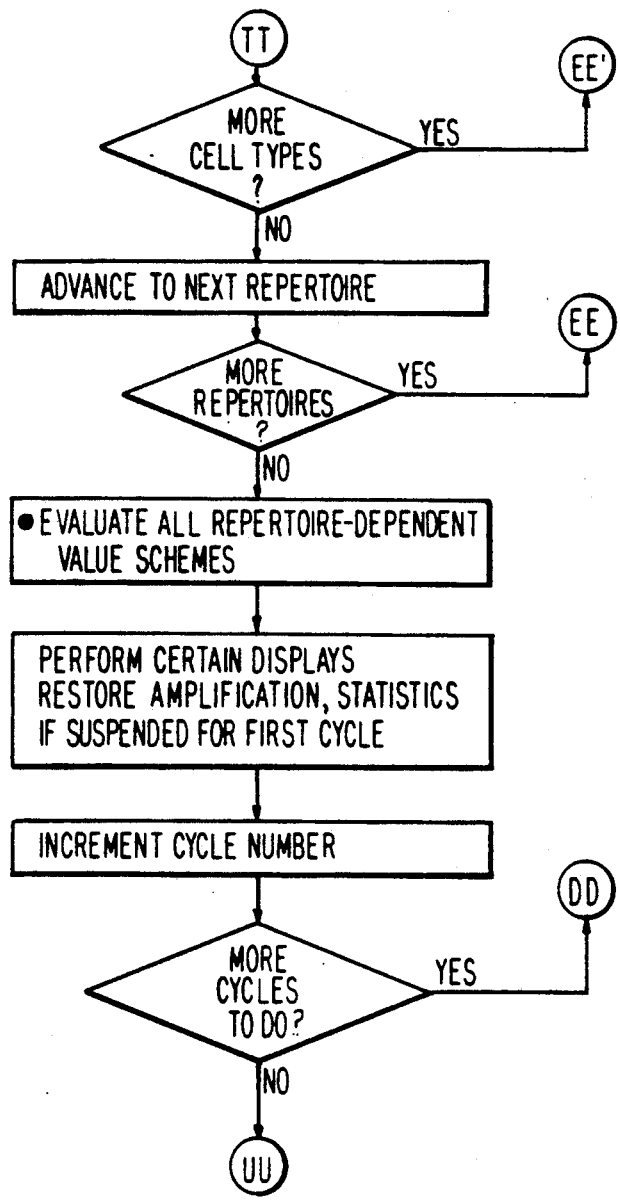
Figure 220:
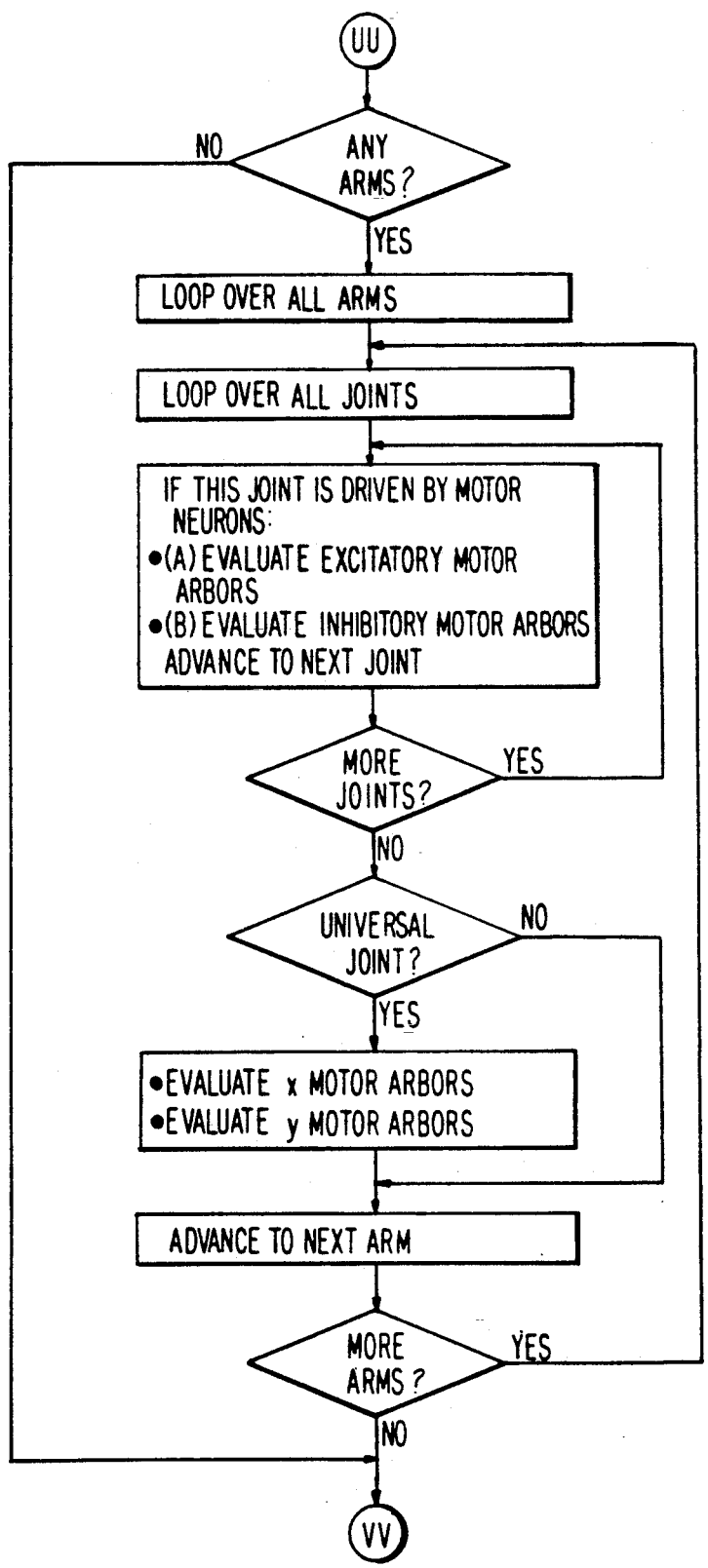
Figure 22P:
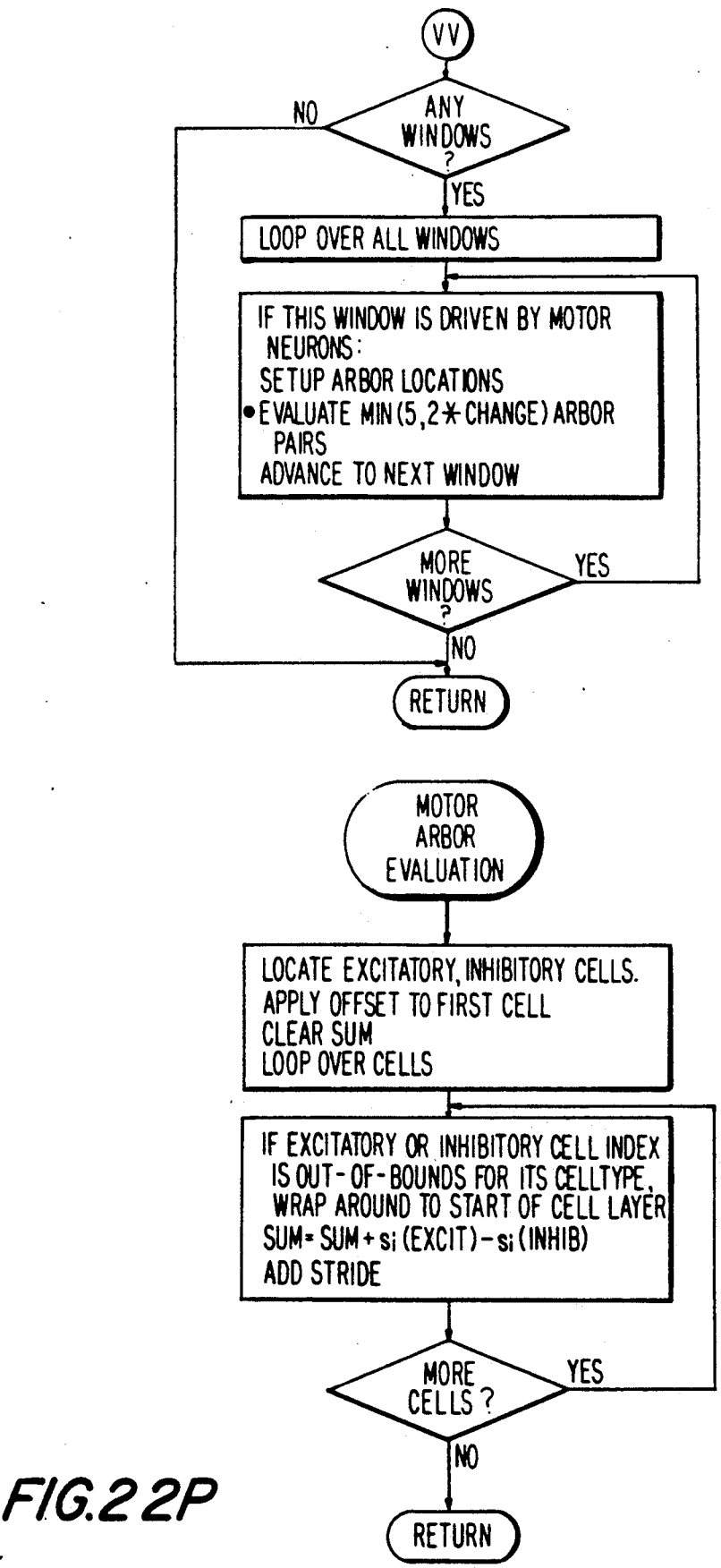

FIG. 21 shows the evaluation of input to a value repertoire. There are two generic types of value scheme, environmental or internal type. Environmental value schemes base their activity on some feature sensed in the environment, usually one that is changed by the activity of the automaton; internal value schemes base their activity on the state of some other repertoire in the automaton and are used for homeostatic purposes. For the internal type, the value may increase in proportion to the number of cells firing, reach a maximum when a particular number of cells in the source repertoire "fires", and then decline as more cells fire (this is known as a "tent" function) having the shape of a rising and falling ramp. Alternatively, the value may remain maximal when more than the optimal number of cells fire (this is known as an "N FIRE" function), having the shape of a rising ramp function that levels off.

For the environmental type a value for $v_c$ is calculated depending on the characteristic of interest, for example, the distance between the hand and an object being grasped. For both types of value scheme, $v_c$ is converted to $v_b$, which is the change in $v_c$ since the previous time step, multiplied by a fixed scaling factor. $v_b$ is then subjected to a "sliding window" averaging process to smooth it, and the resulting value, $v_a$, is assigned to that particular value scheme.

FIG. 22 shows the steps in the method for the evaluation of neural repertoires. This consists of the evaluation in turn of modulatory connection types and then specific connection types. Modulatory connection types are described by "MODVAL" control blocks, which contain parameters for the calculation of modulation values, and by "MODBY" control blocks, which contain parameters for the modulation of particular cell types by such modulation values. Similarly, specific connection types are described by "conntype" control blocks, which contain parameters dictating the calculation of inputs from specific connection types. These parameters are used in conjunction with the $c_{ij}$ and $1_{ij}$ values that were stored during the repertoire generation of diversity stage. These calculations are described in detail following the descriptions of the remaining figures.

FIG. 23 shows the steps in the method for the evaluation of the geometrically defined connections. FIG. 23.1 is a flow chart showing the steps in the method. Each set of geometrically defined connections is described by parameters contained in an "inhibblk" control block. A method has been developed for calculating the contribution of the geometric connections for one inhibblk in time proportional to the number of cells in the source cell type plus the number of groups in the target array multiplied by the number of bands of groups surrounding each target cell from which geometric connections are taken. This method is significantly faster than the obvious method of simply adding up the contributions of the inputs to each cell, which requires time proportional to the number of groups in the target array multiplied by the square of the number of bands of groups surrounding each target cell from which geometric connections are taken. This new method requires the use of intermediate storage known as "boxsum" (B×Sum) arrays, horizontal strip (HSTRIP) arrays, and vertical strip (VSTRIP) arrays. These arrays are used to build up the needed sums of input activities in the form of horizontal and vertical strips of cells which can be combined in various ways to form the square bands that make up each set of geometric connections, as shown in FIG. 23.2. For each inhibblk the boxsum array is cleared and then for each group and for each cell in that group the sum of the activities of the cells in that group, less a threshold amount, is calculated and stored in the boxsum array. Because geometric connections are evaluated on the basis of a series of rings of cells surrounding the target cell, it happens when a tarqet cell is positioned near an edge of the repertoire in which it is contained that portions of these rings ma fall outside the boundaries of the source cell repertoire. Values are assigned to these missing inputs according to a "boundary condition" which may be chosen for each inhibblk according to the function of the particular geometric connections in question. The possible boundary conditions include: (1) noise boundaries (the missing cells are assigned noise values), (2) edge boundaries (the missing cells are assigned the values of the nearest cells inside the edge of the source repertoire, (3) mirror boundaries (the missing cells are assigned values of cells in the interior of the source repertoire at positions corresponding to the positions of the missing cells mirrored across the nearest boundary), (4) toroidal boundaries (the missing cells are assigned values of cells in the interior of the source repertoire as if the left and right edges and the top and bottom edges of the source repertoire were joined to form a hypothetical repertoire with toroidal geometry, and (5) normalized boundaries (the missing cells are not considered; instead, the input value obtained for the source cells that do exist is multiplied by the ratio of the are of the full set of geometric bands to the area of the bands that lies inside the boundaries of the source repertoire; this normalization is carried out with the aid of normalization tables prepared earlier). A pre-computed falloff correction may also be applied at this time.

Once all the boxsums have been evaluated, taking into account the boundary conditions, the ring summations are carried out as outlined in FIG. 23.1. The first ring consists of the single group at the position of the target group. The second ring consists of the eight groups surrounding the target group, and so on. Each ring is calculated as the sum of four strips; two vertical strips forming the left and right edges of the ring; and two horizontal strips forming the top and bottom edges of the ring. For the second ring, the vertical strips consist of single groups and the horizontal strips consist of three groups (see FIG. 23.2); for each successive ring, the vertical and horizontal strips are elongated by adding a group at each end. The calculation is arranged in such a way that the strip sums already calculated are reused, after augmentation, for the next set of rings, but each strip is paired with a different set of more distant strips as the rings expand. This method of combining strips is the critical innovation that makes possible the great speed of the present method of calculating geometrical connections.

The completed ring sums are multiplied by the coefficients $\beta$ (defined below) and stored for later use.

FIG. 23.2 illustrates some of the features of the method of evaluating geometric connections. The boundaries of a source repertoire for a set of geometric connections are indicated by a large square. These boundaries are expanded, using a boundary condition as described above, to fill a larger rectangle. Squares labelled A, B, and C represent the areas covered by single groups. The sum of the activities of all the cells in each such group constitute the first ring of inhibition for the corresponding target cells. Additional rings are defined as the sums of values in horizontal and vertical strips, indicated by numbers 2, 3, 4, ... The series of rings at A illustrates how the boundary area is used to provide values for areas that do not exist in the source repertoire proper (stippling). The series of rings at B and C illustrate how a single horizontal or vertical strip (for example, strip 3, cross-hatched) contributes to rings of inhibition around two groups (B and C) simultaneously.

An alternative embodiment of the visual part for the categorization subsystem is described in the following paragraphs. This embodiment may be used to replace the preferred embodiment when it is desired to respond to visual fields that contain overlapping objects or objects defined by contours, parts of which may be moving. The alternative embodiment uses a more complex set of reentrant connections to achieve a unified response to such input patterns.

FIG. 10 presents a simplified schematic of the overall network connectivity with further details given in Table 2. The connections between $V_{OR}$, $V_{OC}$, and $V_{MO}$ follow a particularly simple reentrant system.

Stimuli of various sizes and shapes excite the elements of the Input Array (64×64 pixels) which corresponds to a visual sensor. There is a single pathway from the Input Array through the "LGN", to "4Cα". "4Cα" projects to "4B" which contains several separate populations of units. "4B-Dir" units are directionally selective, and are reentrantly connected to $V_{MO}$. "4B-Orient." units are orientation selective, and provide input to "4B-Term" units which are specialized for detecting line terminations, and are reentrantly connected to $V_{OC}$. "4B-Orient." units also project to Reentrant Conflict units, which as discussed below, respond to conflicts in the responses to real and illusory contours (these units signal an internal inconsistency in the determined occlusion relationships of several adjacent surfaces).

The "LGN" and "4Cα": The "LGN" contains ON-center, OFF-surround units which receive inputs from 3×3 pixel regions of the Input Array. No OFF-center LGN units are included, and for that reason, light stimuli on dark backgrounds have been used exclusively.

The orientation selectivity of "4Cα" units arises from the spatial pattern of the connections from the "LGN". Each "4Cα" unit receives excitatory inputs from an elongated (3×1 unit) region of the LGN, and inhibitory inputs from two elongated (3×1 unit) region of the LGN, and inhibitory inputs from two elongated (5×2) flanks. The connection strengths of the inputs are adjusted so that units can be partially activated by lines whose orientations are within 45 degrees of the preferred orientation. The square geometry of the underlying pixel matrix necessitates different inhibitory surrounds for obliquely orientated versus horizontal or vertically oriented units.

Directional selectivity in "4Cα" is achieved through a mechanism involving temporarily delayed inhibition. Inhibitory inputs from the "LGN" produce a signal which leads to hyperpolarization of the unit through the opening of simulated ion channels. The temporal delay in the inhibition is controlled by the time constants of the production and decay of this signal. Each "4Cα" unit receives 2 sets of inputs from the "LGN", one excitatory and one inhibitory. Directional selectivity depends upon the fact that the inhibitory units are shifted with respect to the excitatory inputs (the direction of the shift will turn out to be the null direction of the "4Cα" unit). In these simulations, the 2 sets of inputs were always shifted by 1 unit, and the temporal delay was always 1 cycle; however, the same mechanism can be used to generate a range of velocity sensitivities.

The $V_{MO}$ Pathway

"4B-Dir" units: Starting with the "4B-Dir" units, the $V_{MO}$ pathway transforms the selectivity of unit responses from a primary selectivity to orientation (found in "4Cα") to a primary selectivity to direction (found in the Direction repertoires). There are 2 types of "4B-Dir" units. One type receives excitatory inputs from two adjacent "4Cα" units. Using a temporal delay mechanism similar to that in "4Cα", the "4B-Dir" unit is activated only if one of these inputs occurs within a fixed time window before the other input. Each "4B-Dir" unit also receives direct-acting inhibitory inputs from a 5×5 unit region in the "4Cα" repertoire whose directional selectivity is in the null direction; this null inhibition greatly enhances the directional selectivity.

Inputs from 3 of these units with orientation preferences spanning 90 degrees are then subjected to a threshold and summated by a second type of "4B-Dir" unit. Summation over the 3 directions (NE, E, & SE) assures that "4B-Dir" will detect lines moving Eastward even if they are not of the preferred orientation for a given "4Cα" repertoire. Due to the non-linearity of unit properties, this local circuit scheme is not equivalent to a single unit that receives, thresholds, and sums the inputs from "4Cα". For example, in this scheme, excitation of units in different "4Cα" repertoires will not give rise to activation of "4B-Dir".

Comparator Units: The first repertoires in $V_{MO}$ are the comparator repertoires. There are 4 comparator units for each direction (e.g. North); each unit is inhibited by motion in one of the 4 adjacent directions (e.g. NE, NW, E and W). Each comparator unit receives excitation from a 5×5 unit region in the corresponding "4B-Dir" repertoire, and inhibition from a 5×5 unit region in one of the adjacent "4B-Dir" repertoires. Thresholds are adjusted so that each comparator unit is activated only if the responses to motion in its preferred direction exceed those to motion in the adjacent direction.

Direction Units: The final stage in the $V_{MO}$ pathway consists of units that sum inputs from the 4 comparator units selective for motion in a particular direction. Thresholds are arranged so that inputs from at least 3 of the 4 sources are necessary to fire a unit. This represents a majority vote on the differential comparisons carried out by the comparator repertoires, and signals that the response to motion in a given direction is stronger than in the adjacent directions. VMO—$V_{OR}$ Reentry: Outputs from each direction unit are reentered back to "4B-Dir" in $V_{OR}$. Each direction unit inhibits a 3×3 unit region in all "4B-Dir" repertoires except the one with the same directional preference. This arrangement tends to suppress activity in "4B-Dir" repertoires that does not correspond to the active $V_{MO}$ repertoire.

We have found several alternative schemes of reentrant connectivity that help generate directional selectivity. For instance, excitatory reentrant connections to "4B-Dir" units can be coupled with cross-orientation inhibition. Alternatively, reentry can originate from the comparator units instead of the directional units. Several such schemes generate roughly equivalent results.

The $V_{OC}$ Pathway

The $V_{OC}$ pathway detects and generates responses to occlusion boundaries. An occlusion boundary can be defined by the presence of textures or lines of various orientations (either stationary or moving) that terminate along its extent, and by the absence of textures or lines that extend across the boundary. The $V_{OC}$ pathway initially responds to local cues consistent with an occlusion boundary, but continued responses depend upon the global consistency of these local cues (i.e., whether multiple local terminations can be linked up along an extended discontinuity or "fracture" line). The same local cues which indicate the presence of occlusion boundaries are responsible for the generation of illusory contours.

The $V_{OC}$ system also checks (through reentry) that the occlusion boundaries it discriminates obey a number of self-consistency relationships. For example, two occluding boundaries should not cross each other, nor should an occluding boundary cross a real boundary. These physical inconsistencies are reflected by internal conflicts in the system which must be resolved to yield a consistent pattern.

"4B-Term" Units: As local cues to occlusion, the $V_{OC}$ pathway uses both line terminations and the differential motion of textures. "4B-Term" units detect line terminations due to an inhibitory end-region in their receptive fields. End-stopped receptive fields are found in simple cells of layer 4B as well as in complex cells of layers 2 and 3. However, unlike end-stopped cells in the striate cortex, "4B-Term" units have only one end-inhibitory region, and are thus sensitive to the polarity of the termination, (i.e., at which end of the line the termination is found).

Wide Angle Units: Since lines can terminate at an occlusion boundary with a variety of orientations with respect to that boundary, Wide Angle units sum inputs from "4B-Term" units whose preferred orientations span 90 degrees.

Termination Discontinuity Units: Wide Angle units project to Termination Discontinuity (TD) units which detect local cues to occlusion. These local cues consist of any of several terminating lines that approach the presumptive occlusion boundary from either side. In order to be activated, a TD unit must be activated by at least 3 inputs from the Wide Angle repertoires—and at least one of these inputs must correspond to line terminations of an opposite polarity to that of the other inputs. All 3 types of inputs must, in addition, come from units distributed along a line in a Wide Angle repertoire (and this is assured by the geometry of the connections).

A separate population of TD units (referred to as Direction Discontinuity units) carries out a similar operation upon inputs from $V_{MO}$ that signal the presence of a discontinuity in motion. Use of a single population of TD units to receive inputs from both $V_{OR}$ and $V_{MO}$ is not possible because activation of a TD unit requires a combination of inputs, and a single unit (of the simple type used here) cannot distinguish a valid combination which arises from one set of sources from partial combinations which arise from two different sets of sources. Direction Discontinuity units have a slower time decay for voltages allowing them to maintain responses to moving stimuli that have recently passed through the receptive field of the unit.

Occlusion Units: Occlusion units respond to the actual location and course of an occlusion boundary. Each Occlusion unit receives connections, in a bipolar fashion, from two sets of TD units distributed in opposite directions along a common line. To be activated, an Occlusion unit must receive inputs from both bipolar branches (i.e., both sets of TD units). This connection scheme ensures that a string of adjacent Occlusion units will be activated by an occlusion boundary.

The remaining repertoires and connections in the $V^{20C}$ pathway (described below) deal with the elimination of false cues, the resolution of internal conflicts in generated responses, and with the reentrant "recycling" back to $V_{OR}$ or responses to occlusion boundaries determined in $V_{OC}$.

Common Termination Units: Common Termination units respond to configurations in which 2 or more lines terminate at a common locus. These units sum inputs from Wide Angle units with identical receptive field locations and adjacent orientation preferences. Common Termination units directly inhibit TD units.

Reentrant Conflict Units: Reentrant Conflict units respond to locations at which illusory contours cross real contours or other illusory contours. Reentrant Conflict units receive connections from 3 "4B-Orient." repertoires having orientations spanning 90 degrees (in exactly the same manner as Wide Angle units), and in addition receive excitatory reentrant connections from Occlusion units. To be activated, each Reentrant Conflict unit requires at least one input from an Occlusion unit (illusory line) and one input from a "4B-Orient." unit (real line) with an overlapping receptive field. Reentrant Conflict units are also strongly inhibited by corresponding units in the Wide Angle repertoires: since illusory contours always join real contours at their terminations, conflicts at a termination are not to be counted.

Occlusion Conflict Units: Occlusion Conflict units receive connections from Reentrant Conflict units in exactly the same manner that Occlusion units receive connections from the TD repertoires, and they generate responses to (illusory) contours between the points of conflict. The Occlusion Conflict units directly inhibit Occlusion units, thereby canceling (through reentry) responses to any segment of a generated illusory contour which was in conflict.

Recursive Synthesis by Reentry: A final $V_{OC}$ reentrant pathway allows signals generated by illusory contours and structure-from-motion to be reentered back to $V_{OR}$, and treated as if they were signals from real contours in the periphery entering via "4Cα". This recursion is a key property of reentry. A separate population of "4B-Term" units is used to receive inputs from Occlusion units. These "4B-Term" units then project to the Wide Angle units, thereby merging with the signal stream of the normal ascending $V_{OC}$ pathway. This reentrant pathway allows contours generated through structure-from-motion from $V_{MO}$ inputs to be used as termination cues for the generation of additional illusory contours. This is the basis of the mechanism underlying the recursive synthesis simulation experiments to be discussed below.

Figure 24A:
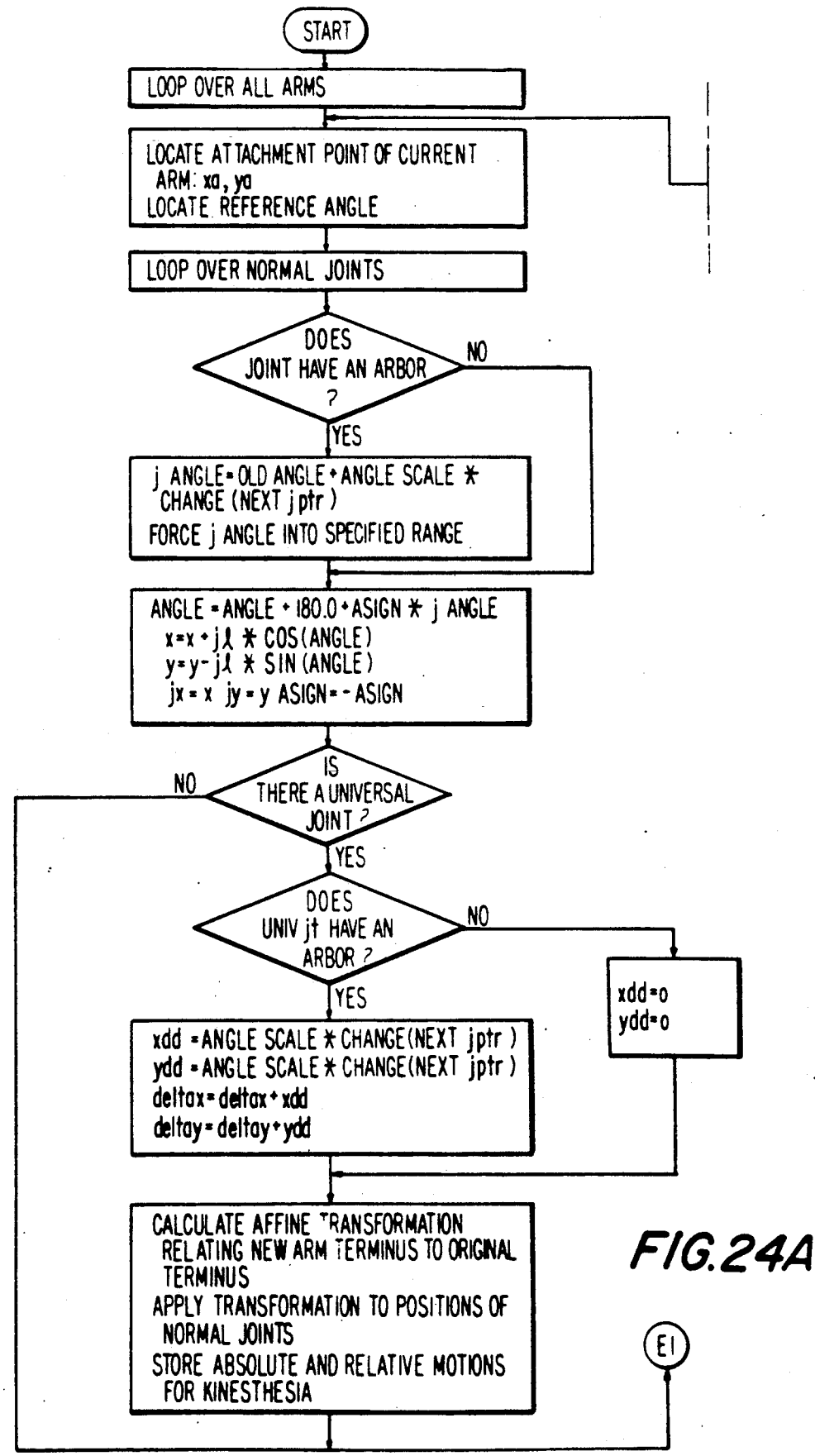
FIG. 24 A-B is a drawing of move effectors of the automaton of the present invention
Figure 24B:
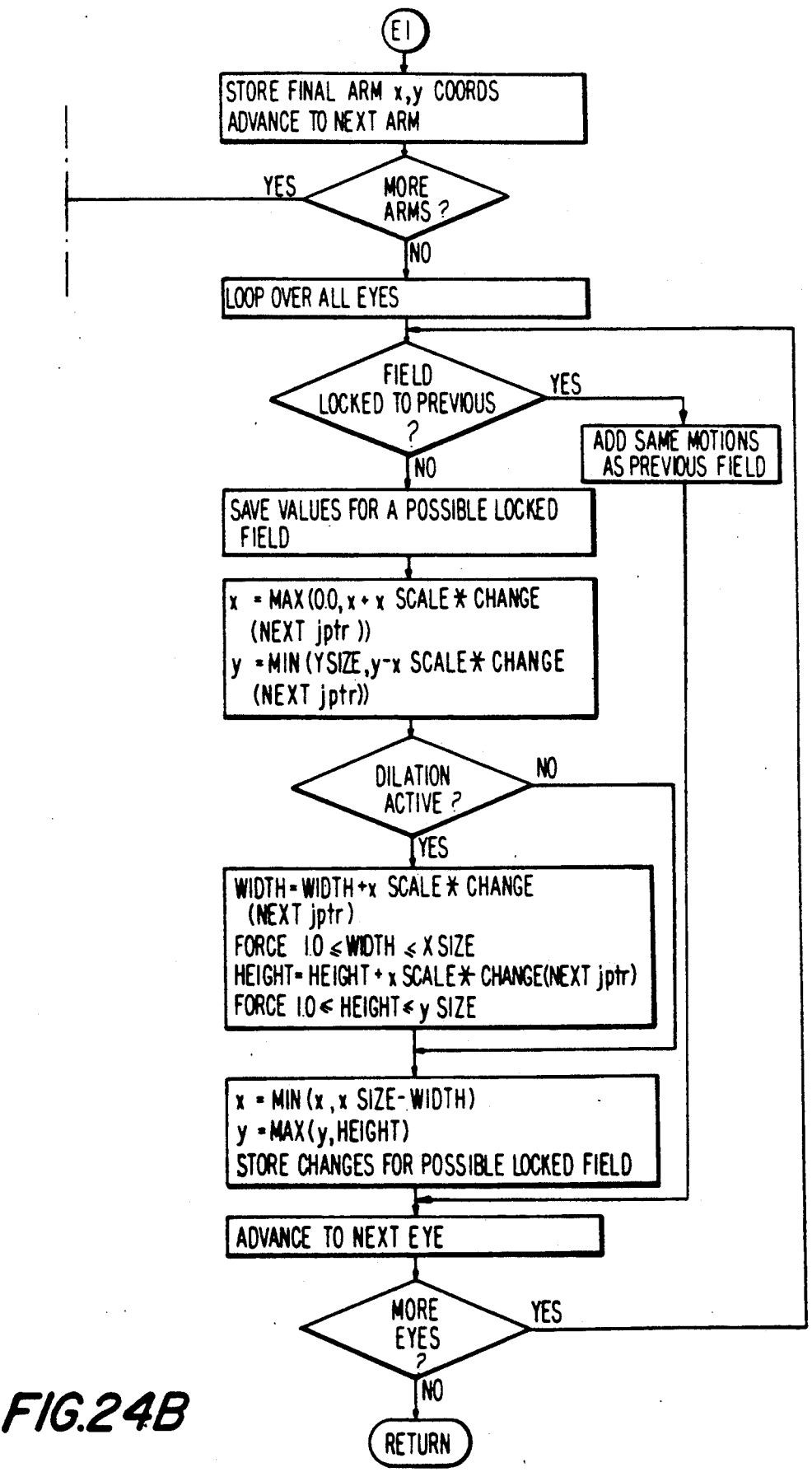

Motion Effectors: FIG. 24 shows the steps taken in implementing motion effectors. For each arm each joint angle (jangle) is adjusted according to the formula (modulated by forcing jangle into a specified range accounting for physical motion limitations on a real arm):

$$\text{jangle} = \text{old angle} + \text{angle scale} * \text{change}$$

The "change" is calculated as the sum of activity in the motor neurons controlling the joint in question (changes are indexed by a pointer "jptr"); the angle scale is a fixed parameter.

If the arm is in its special extended posture for object tracing, termed a "canonical tracing position", then it is driven by angular changes at a "universal joint", which permits motion in both a horizontal and a vertical plane, in the manner of a shoulder joint. In this case, the vertical and horizontal rotations are driven by separate neuronal repertoires, as indicated in FIG. 24, and the remaining joints are typically held fixed. The kinesthetic calculation for a universal joint differs from that for a normal joint, as shown in FIG. 19.

The calculations outlined in FIGS. 22-23 are repeated a fixed number of times. These repetitions constitute "inner cycles". The larger set of calculations outlined in FIGS. 18-24, including these "inner cycles", are repeated once for each time the environment is updated, a total of NTR trials constituting one trial series.

Definitions And Verbal Description Of The Automaton

As shown in FIG. 2, a neuronal group is a collection of units, variously termed cells or neurons, that are strongly connected to one another. Strongly connected refers to having a greater number or strength of intra-group connections relative to intergroup connections.

(As a typical working definition, cells in a group receive more than half of their input from other cells in the same group.)

Neuronal groups form in any embodiment of the invention 19 as a result of correlated stimulation of sets of cells which have appropriate preformed interconnections, inasmuch as such correlated stimulation leads to strengthening of intercellular connections ("synapses") under operation of the rule for synaptic modification to be described. These groups continuously reform at a rate which is relatively slow compared to the time scale of physical operations of the automaton.

Because of the strong interconnection of cells in groups, the overall operation of the automaton may be described in terms of the average responses of its neuronal groups, as if they, and not the individual cells, were the fundamental units of the cortical network. In this way the cortical network is made less sensitive to the life history and proper functioning of any individual unit. In order to simplify the calculations required to maintain the automaton, neuronal groups may often be replaced by simplified entities that do not contain individual neurons.

In operation, the neuronal groups become associated with one another into a plurality of neuronal maps. A neuronal map is a functionally defined structure of interconnected neuronal groups, usually topographically arranged that strongly respond to related inputs. The signals that pass between one neuronal map and another may be termed reentrant signals.

The preferred embodiment of the present invention is implemented by assigning appropriate parameters to control the operation of a general-purpose cortical network simulator (CNS) program. The resulting embodiment is a large-scale network consisting of multiple types of units with detailed specification of the connectivity between and among them, as well as of the specific properties of the interunit connections, which parallel certain electrical and chemical properties of biological synapses. The embodiment also allows stimulus objects of various sizes and shapes, which may be detected by a TV camera moving across the environment and feeding images to the input array.

The preferred embodiment that is described has bee implemented on a digital supercomputer architecture in a combination of FORTRAN and Assembler language. The program provides a user interface that permits a large degree of control over the structure and size of the simulated networks at the level of "repertoires", cells, and connections. Control statements are used to define named entities of each of these types. The ordering of the control statements establishes a three-layered tree structure in which the nodes at the top level are repertoires, those at the intermediate level are cell types, and those at the bottom are connection classes. The nodes at each level are allocated dynamically and linked by pointers. Each node (also known as a "control block") contains parameters that define the properties of the corresponding objects, as well as pointers to the arrays containing the objects themselves. In addition, connection nodes contain pointers to the cell-type nodes defining the cells where the connections originate. There are three kinds of these connection nodes, for specific ("conntype" blocks), geometrically defined (usually inhibitory) connections ("inhibblk" blocks), and modulatory connections ("MODVAL" and "MODBY" blocks). The statements defining the connection nodes contain codes to select any of several methods of connection generation—uniform connectivity, topographic map, or a list read from an external file. Other codes are provided to control the generation of the connection strengths and the particular response function and method of amplification to be used.

The actual data objects (cells and connections) are allocated after all the nodes have been defined and the total memory requirements calculated. These requirements can amount to as little as one byte per connection plus two bytes per cell. To minimize virtual memory page faults, the output state variables of the cells, which must be accessed randomly for input to other cells, are allocated in one block. All the other variables, which occupy significantly more space but are accessed only sequentially, are allocated in another block. Because various types of cells require different variables at the cell and connection levels, the offset of each variable from the beginning of its cell or connections record is also variable. These offsets are calculated and stored in a table associated with each cell-type node. For maximum speed in the inner-loop Assembler code, the necessary offsets are moved into the displacement fields of the relevant instructions during the initialization for each cell type. Looping then requires only the updating of a record pointer for each new cell or connection to be processed. In the less critical FORTRAN code, the variable offsets from the tables are used along with the record pointers to generate array subscripts.

The simulation program makes use of dynamically allocated storage and record data structures with FORTRAN programming, neither of which is a feature of the FORTRAN language. The scheme depends on the absence of execution-time subscript range checking in the object code produced by the FORTRAN compiler. The record structures are defined as lists of variables in common blocks, which both enforces the desired storage ordering and makes the shared base addresses available in all the subroutines that refer to them. Each variable is declared as an array of dimension one, and the offset to the actual dynamic storage is provided by a call to an Assembler routine that obtains the desired storage from the operating system. Individual array elements are accessed by subscripts which are sums of these dynamic array offsets with the customary indexes.

To loop over an array of such dynamic records, the subscript variable is simply increased by the record length after each iteration. Processing of an entire network involves execution of an outer set of loops that traverse all the nodes of the tree structure (incidentally providing base address for access to the parameters stored in the nodes), together with inner loops that process the cells and connections belonging to each node.

In a further preferred embodiment the model is structured for parallel execution. For purposes of carrying out parallel execution in a machine with local memory, $s_i(t)$ and $s_i(t+1)$ arrays containing the activities of the cells at times t and t+1, respectively, are kept separately for each cell type, permitting synchronous updating of all the activities at the end of each cycle by communication of the $s_i(t+1)$ arrays from each node to all other nodes, where they replace the current $s_i(t)$ arrays. This arrangement permits $s_i(t)$ to be read in a consistent way by all processors while $s_i(t+1)$ is being calculated and stored. Synchronization of the processors is required only at the completion of an entire cell layer, when $s_i(t+1)$ is substituted for $s_i(t)$. With the modestly sized s arrays of this embodiment, it is possible to broadcast copies to all the processors to avoid communications bottlenecks for random access from other cells during the evaluation of $s_i(t+1)$.

In operation, during each unit time interval, new states are calculated for all cells in all repertoires in turn. Connection strengths are modified in accordance with an amplification rule immediately after each connection has been used for the calculation of the new activity value for its cell. A number of such cycles is typically carried out before a new stimulus is presented.

The system is operated both for the purpose of "training", during which a selection of groups and pathways takes place so that the neural map structure is established, and thereafter for performance (wherein further training may continue indefinitely). A few cycles are usually sufficient for the system output to reach convergence for a new stimulus after the selection stage has been completed. (When an object is being traced for tactile identification, the time for tracing controls the overall response time.)

To simplify the description of the preferred embodiment, it will be divided into three sections. The first section describes in general terms the cell types, connection types, and certain other parameters that are used in all repertoires. The second section defines the various repertoires that are used in the automaton, both in terms of the cell types and connections that are utilized and in terms of the functions that they perform. The third section describes the manner in which the activity value of a cell is calculated and the additional parameters that are involved in selection.

A. Cell Types, Connection Types and Other Parameters

The anatomical specifications of the preferred embodiment comprise repertoires, cell types, and connection types. There are three broad classes of connection types: specific, geometric, and modulatory. Specific connections are described by listing individually the cells which are interconnected (by use of a matrix $[1_{ij}]$), permitting any desired array of connections to be specified. Geometric connections are arranged in a series of concentric rings around a given target cell; all the cells in each ring may have a common scale factor, but the scale factor may be different for each ring. Modulatory connections derive their input from the total level of activity of all the cells in a given source repertoire, each cell being included with equal weight.

The various cell types are defined in terms of several numerical parameters that distinguish their properties. Each cell type may be specified to have connections of any or all of the three broad classes just described. For each cell type, a positive threshold value above which the sum of all inputs is effective for excitation is specified. A negative threshold is similarly set for inhibitory inputs. A hit threshold is set, such that a cell's output is considered active only when its output exceeds this value.

A cell may be subject to depression, whereby its response is reduced as a function of its past activity. Furthermore, a depression threshold may be set, such that if the amount of depression exceeds a specified value, the cell enters a refractory period, during which input to the cell has no effect. A refractory period parameter is set to define the length of this time. In addition, a refractory decay limit may be set which defines an alternative kind of refractory period in which a cell becomes refractory when it fires above the hit threshold and remains refractory until its output decays below the said refractory decay limit. A sustaining threshold may also be set, such that the total inputs above the said sustaining threshold excite the cell even when it is in a refractory period.

A long term potentiation ("LTP") threshold may be set. LTP refers to a long-lasting enhancement of the effects of a given class of synapses which occurs in the preferred embodiment by lowering their effective thresholds. In a biological context it has been defined as a phenomenon in which a brief series of biochemical events gives rise to an enhancement of synaptic efficacy that is extraordinarily long-lasting. The LTP threshold allows contributions from an individual connection type to the build-up of LTP only if the threshold is exceeded by the input to that connection type at that instant of time.

Several parameters may be specified for each connection type that inputs to a particular cell type. These identify the source of the connections (e.g. another repertoire of cells, the input array, or "virtual cells" that signal sensory inputs, namely sight, touch, kinesthesia, or, finally, a particular value scheme). Further parameters specify the number of connections of each type and the rule for initializing the strengths of these connections during repertoire generation. Available rules either generate a gradient (also known as a motor map), obtain values from a stored matrix, or use random values.

Each specific connection type also requires specification of the manner of generation of the identities of the cells from which the connections originate within the specified source cell type. Separate rules may be given for selection of the first connection of each type and for the selection of subsequent connections. Rules available in the CNS simulator for selection of first connections are "external" (wherein the identities are read from a connection list); "float" (wherein a selection is made uniformly from all cells in a specified box on the input source); "group" (wherein the selection is made uniformly from the same group of which the target cell is a member; "joint" (selection is made uniformly from successive subdivisions of a repertoire arranged to subserve the needs of the successive joints of a limb in turn); "normal" (selection is made from cells distributed normally around the location of the target cell); "other" (selection is made from groups other than the group the target cell is in); "topographic" (connections are mapped from a rectangular box on the input source assuming stationary visual sensors); "scanned topographic" (same as topographic except map moves with a specified "window" embodying the field of view of a specified eye); "uniform" (connections are selected uniformly from all cells in the source repertoire); "systematic" (successive cells are displaced by a constant distance).

The connection type also specifies the relationship of subsequent connections to the first connection selected. The values for this relationship are "adjacent" (each connection is spaced by a fixed stride from the previous connection); "boxed" and "diagonal" (connections are arranged in a determinate matrix); "crow's foot" (subsequent connections are uniformly but randomly distributed in a rectangular box centered about the first position chosen); "independent" (all connections are chosen independently); and "partitioned" (duplicate connections are avoided by partitioning the source cells into subsets and choosing one from each subset).

Two parameters specify the dynamical behavior of each connection type, a threshold value below which each input is ineffective, and a scale factor which determines the relative contribution of the particular connection type relative to other connection types incident upon the same cells.

With respect to the modification of connection strengths according to the selective learning rule given below, certain parameters may be specified for each connection type. These include an amplification factor, which adjusts the overall rate of synaptic change, an amplification threshold relating to post synaptic activity an amplification threshold relating to presynaptic activity, an amplification threshold relating to heterosynaptic activity, and a rule selector. Selective modification of connection strengths also involves the formation of a "modifying substance" at each synapse, with respect to which a production rate, a decay constant, and a maximum decay rate described below may be specified for each connection type.

There are many other numerical parameters and control parameters relating to the screen display which could be chosen by a person of skill in this art.

B. The Repertoires

The preferred embodiment described here is an automaton specialized to the tasks of detecting objects by a visual sense, reaching toward said objects with an arm, examining said objects by vision and by touch using said arm, categorizing said objects based on said examination, and either accepting or rejecting said objects based on their category, using the arm as a means of rejecting. The repertoires to be described are each associated with one or more of these functions, and accordingly the descriptions are divided into the following five subsystems: The oculomotor (saccade) subsystem, the reaching subsystem, the tracing subsystem, the categorizing subsystem, and the rejection subsystem. The principles of the present invention may be used to construct other automata for different purposes and such automata would consist of similar repertoires interconnected in ways appropriate to a particular task that would be evident to a person skilled in this art. As an example of such an application, a second embodiment of the visual system is described, which is able to respond to so-called "illusory" contours, thereby detecting and categorizing objects, the visual image of which is occluded by other objects.

The repertoires of the preferred embodiment are described in detail in Table I, and those of an alternative embodiment of the visual part of the categorizing subsystem in Table II.

TABLE I

PROPERTIES OF REPERTOIRES

OCULOMOTOR SYSTEM

| REPER-TOIRE | CELL TYPES; $\theta$ | AFFERENTS[1] | METH-GEN[2]; NUM-CNNS $\theta(k); \Omega(k)$ | EFFERENTS[3] | DETAILS OF UNIT DYNAMICS AND CONNECTIVITY |
|---|---|---|---|---|---|
| VR | RV | 0.2 | Input Array | RS 1 0.1 1.0 | SC | Layers RV and RI: 841 excitatory and 841 inhibitory units (29 × 29 grid). Every excitatory unit receives |
|  | RI | 0.0 | VR RI | RG 1 0.1 0.35 | VR RV - | one topographical connection from the portion of the environment currently viewed through the visual sensor. Local excitatory and lateral inhibitory connectivity provides sharpening of responses and attentional bias. Excitatory units have depression, with 4 refractory cycles after 8 consecutive cycles of maximal firing. |
| SC | M2 | 0.0 | VR RV | RTI 4 0.5 1.5 | OM SC M2 - | Layers M2 and IN: 256 excitatory and 256 inhibitory units (16 × 16 grid). Every excitatory unit receives |
|  | IN | 0.0 | SC M2 | RG 1 0.1 0.35 |  | four topographical connections. Local connectivity as in VR. |
| FO | FO | 0.2 | Input Array | RSI 3 0.1 0.5 | V1 | 121 excitatory units (11 × 11 grid). Receive one excitatory topographically mapped connection from the entire visual field, as well as additional connections from the central 15% and 3% of the visual field, respectively. Global average of activity in the repertoire is used for heterosynaptic value input into connections from SC to OM. |
| OM | OM | 0.1 | SC (V1) | RXA 256 0.25 0.2 | move visual sensor | 36 motor units (4 groups of 9 units). Each unit receives 256 excitatory connections from the entire array of SC units. Two inhibitory connections from opposing units provide lateral inhibition (sharpening response). |

REACHING SYSTEM

| REPER-TOIRE | CELL TYPES; $\theta$ | AFFERENTS | METH-GEN; NUM-CONNS | EFFERENTS | DETAILS OF UNIT DYNAMICS AND CONNECTIVITY |
|---|---|---|---|---|---|
| HV | HD | 0.1 | Input Array | RT 1 0.0 0.4 | VALUE | 256 units for hand vision (16 × 16 grid). One excitatory connection from the visual field. |
| WD | WD | 0.2 | Input Array | RS 1 0.1 0.35 | VALUE | 841 units (29 × 29 grid) 1 excitatory topographic connector from input array. Cell type WI provides |
|  | WI | 0.0 | WD WD | RG 1 0.1 0.35 | WD WD - | latral inhibition to sharpen responses. |
| VALUE | H2 | 0.91 | HD | RGC 30 0.1 0.5 | Value Scheme #2 | 256 units (16 × 16 grid), 30 excitatory topographical connections from an 11 × 11 region in HV, 40 excitatory topographical connections from a 17 × 17 region in WD. Both inputs are required to elicit a response. Global average of activity in the repertoire is used for heterosynaptic value input into connections from WD and KE to MC. |
|  |  |  | WD | RTC 40 0.1 0.5 |  |  |
| KE | KE | 0.0 | VJ | RX 1 | MC, GR | 12 units per arm joint (12 × 4 grid). Units are tuned |

TABLE I-continued

PROPERTIES OF REPERTOIRES

| REPER-TOIRE | CELL TYPES; θ | | AFFERENTS | METH-GEN; NUM-CNNS | EFFERENTS | DETAILS OF UNIT DYNAMICS AND CONNECTIVITY |
|---|---|---|---|---|---|---|
| | | | | 0.0 0.35 | | using a Gaussian function to respond preferably to a particular joint position (angle). |
| MC | ME, MF | 0.3 | WD (V2) | RUC 16 0.1 0.25 RJP 16 0.1 0.7 | IO, IN | Layer ME: 192 units (1 × 4 grid), predominantly moving extensor muscles with 16 connections (e/i ratio 2.33) from 13 × 13 regions of WD, 16 connections (e/i ratio 1.5) from the entire array WD |
| | | | KE (V2) | RJI 8 0.1 0.15 RUI 8 0.1 0.15 | | (these connections only to the first joint), 16 connections, mapped and un-mapped, (e/i ratio 1.0) from all joint levels in KE, 6 excitatory connections from MC joint level n-1 to n, and 18 inhibitory connections from MC joint level n to n-1. If value is positive connections from WD and KE to MC are strengthened if pre- and postsynaptic unit are coactive; if value is negative these connections are weakened. In addition, 24 inhibitory connections from MF cells, and 16 inhibitory connections from TH cells. Layer 2: 192 flexor units (1 × 4 grid). Same connectivity as layer 1. |
| IO | IE, IF | 0.5 | MC | RTI 5 0.1 0.15 | PK | Layer 1: 96 flexor units (1 × 4 grid), 5 connections (e/i ratio 4.0) from MC. Unit activity is modulated by value #2—cells fire only if positive value is present. Layer 2: 96 extensor units (1 × 4 grid). Connectivity as in layer 1. |
| GR | G1 | 0.6 | WD KE | RUC 9 0.25 0.9 RTI 6 0.25 0.25 | PK | 288 units (12 × 24 grid), 6 connections (e/i ratio 1.22) from KE, and 9 connections (e/i ratio 4.0) from 8 × 8 regions in WD. Both inputs required to fire unit. |
| PK | PE, PF | 0.3 | GR IO | RTI 72 0.1 1.2 RUI 144 0.1 0.6 RTI 4 0.1 0.25 | IN - | Layer PE: 96 flexor units (1 × 4 grid), 4 strong excitatory topographical connections from IO flexor units, 216 initially weak connections (e/i ratio 1.5) from GR units. These connections are strengthened if pre- and postsynaptic units are coactive, and weakened if presynaptic unit is active but postsynaptic is not. PK units remain active for several cycles after excitation, before entering a refractory period of several cycles. Layer PF: 96 extensor units (1 × 4 grid). Connectivity as in layer 1. |
| IN | RE, RF | 0.3 | MC PK | RXC 3 0.25 0.5 RTC 3 0.25 0.25 RTI 24 0.1 0.7 | SG | Layer RE: 192 flexor units (1 × 4 grid), 6 excitatory connections from MC flexors, from topographically corresponding and neighboring joint levels, 24 inhibitory connections from the corresponding joint level in PK, both extensors and flexors. These connections become less inhibitory if pre- and postsynaptic units are coactive, and become more inhibitory if pre-synaptic unit is active but postsynaptic is not. Layer RF: 192 extensor units. Connectivity as in layer 1. |
| SG | AE, AF | 0.1 | IN TH | RJI 16 0.1 0.85 RUP 32 0.2 0.1 | move arm joints | Layer AE: 128 flexor units (1 × 4 grid), 16 connections from IN flexors or extensors (e/i ratio 1.86), all-or-none inhibitory connections from TH to joints 1 and 2. These connections inhibit gross arm movement when touch is established. Layer AF: 128 extensor units (1 × 4 grid). Connectivity as in layer 1. |

TACTILE SYSTEM

| REPER-TOIRE | CELL TYPES; θ | AFFERENTS | METH-GEN; NUM-CNNS | EFFERENTS | DETAILS OF UNIT DYNAMICS AND CONNECTIVITY |
|---|---|---|---|---|---|
| TH | TH .01 | VT RX 1 0.0 0.5 | TC, E1, E2, E3 E4 | from touch receptors | TC, E1, E2, E3, E4 64 units (8 × 8 grid), 1 excitatory connection from grid of touch receptors on last arm joint. |
| TC | TC 0.1 | TH | MTB 9 0.0 2.0 | TM | 36 units (6 × 6 grid), 9 connections arranged in an on-center off-surround matrix. |
| E1,E2, E3,E4 | E1, ... 0.1 | TH | MTB 9 0.1 1.33 | TM | 36 units each (6 × 6 grid), 9 connections arranged in a matrix allowing edge detection. |
| TM | UD, LR 0.1 | TC E1, E2, E3, E4 | LXB 36 0.1 0.18 RJA 1 0.1 0.22 | move shoulder joint | 16 units, 4 each for up, down, left, and right motion. 36 excitatory connections from all positions in TC. Connections to each of the four motor neuron groups have one-dimensional gradients in their connection strength. Additional connections from E1, E2, E3, and E4 terminate on their respective groups of motor neurons to further bias joint motion. |

CATEGORIZATION SYSTEM

| REPER-TOIRE | CELL TYPES; θ | AFFERENTS | METH-GEN; NUM-CNNS | EFFERENTS | DETAILS OF UNIT DYNAMICS AND CONNECTIVITY |
|---|---|---|---|---|---|

TABLE I-continued

| | | | | | | |
|---|---|---|---|---|---|---|
| PROPERTIES OF REPERTOIRES | | | | | | |
| LGN | LN, LF | 0.1 | Input Array | MSB 16<br>0.12 2.5 | R | Layers LN,LF: 324 ON-center units and 324 OFF-center units (18 × 18 grid), receiving 16 inputs each in a topographic map from the input array. |
| R | FD | 0.35 | LGN | MTB 25<br>0.1 0.45 | $R_2$ | 784 units each of 4 types (14 × 14 grid), receiving 9 topographically mapped connections arranged in a matrix to produce orientation selective units. Each position in R contains 4 units responding optimally to horizontal, vertical and diagonal lines. |
| $R_2$ | E2 | 0.4 | R | RUI 32<br>0.1 0.7<br>MXB 25<br>0.3 1.2 | $R_M$, RF | Layer E2: 484 units (11 × 11 grid), 57 excitatory connections spread out over the entire R array.<br>Layer AX: 484 units. 1 topographically mapped connection from layer E2. Units will not fire if only these connections are active. They also receive connections from the trigger unit TR and 48 reentrant connections from $R_M$. Activity in these connections can lower the excitation threshold ("LTP") of the unit. |
| | RX | 0.91 | E | RX 1<br>0.15 0.35 | | |
| | | | RM | RMP 48<br>0.3 0.5 | | |
| | | | RC | RXA 1<br>0.2 1.0 | | |
| MT | M1 | 0.1 | MT M2 | RG 1<br>0.01 0.5 | $R_M$ | Layer M1: 12 units (12 × 1 grid), receiving a temporally delayed connection from layer 2. |
| | M2 | 0.1 | KE | RJ 1<br>0.08 1.5 | | Layer M2: 12 units (12 × 1 grid), receiving one excitatory connection from group of units in KE. Responsible for detecting motion of the shoulder joint in tracing. |
| | MS | 0.91 | MT M1 | RG 1<br>0.3 0.4<br>ROI 9<br>0.3 0.24 | | Layer MS: 48 units (12 × 1 grid), 1 topographically mapped excitatory connection each from M1 and M2, 9 inhibitory connections from non-corresponding position in M1 and M2. 1 inhibitory connection from trigger repertoire. Units detect correlation of motion in one direction ("smooth edges"). |
| | | | MT M2 | RG 1<br>0.3 0.4<br>ROI 9<br>0.3 0.4 | | |
| | | | RC CR | RX 1<br>0.2 5.0 | | Layer MB: 48 units (12 × 1 grid), 1 excitatory topographical connection from M2, 1 inhibitory topographical connection from M1, 9 excitatory non-mapped connections from M1, 9 inhibitory non-mapped connections from M2. 1 inhibitory connection from trigger repertoire. Units detect absence of correlation in motion ("bumpy edges"). |
| | MB | 0.91 | MT M1 | RG 1<br>0.3 0.24 | | |
| | | | MT M1 | ROI 9<br>0.3 0.24 | | |
| | | | MT M2 | RG 1<br>0.3 0.24 | | |
| | | | MT M2 | ROI 9<br>0.3 0.24 | | |
| | | | RC CR | RK 1<br>0.2 0.5 | | |
| $R_M$ | RM | 0.1 | MT MB | RTI 2<br>0.2 0.5 | $R_2$, RF | Layer RM: 192 units (12 × 1 grid), 2 excitatory topographical connections from MT, layer MB. Units also receive input from RC to reexcite units that have been recently active. |
| | | | RC CR | RX 1<br>0.2 1.0 | | |
| | RX | 0.91 | RM RM | RX 1<br>0.1 0.35 | | Layer RX: 192 units (12 × 1 grid), 1 excitatory mapped input from layer 1. This input alone will not fire the unit, which also receive 24 reentrant connections from $R_2$. An additional input from RC can influence firing threshold of unit by "LTP". |
| | | | R2 E2 | RUP 24<br>0.3 2.5 | | |
| | | | RC CR | RX 1<br>0.2 1.0 | | |
| RC | TS | 0.1 | MT MS | RX 1<br>0.2 0.5 | $R_2$, $R_M$ | Layer TS: 48 units (12 × 1 grid), 1 topographical excitatory connection from MT, layer MS. Units are active for several cycles after activation and then enter a refractory period. They detect novel smooth contours—the absence of firing in this layer indicates the absence of such features. Inhibited by RC CR. |
| | TB | 0.1 | MT MB | RX 1<br>0.2 0.5 | | |
| | CE | 0.1 | RC TS | RXA 48<br>0.2 1.0 | | Layer TB: 48 units (12 × 1 grid), 1 topographical excitatory connection from MT, layer MB. Responses like layer TS, but for "bumpy" contours.<br>Layer CE: 1 unit, 48 excitatory connections each from layer TS and TB. Novelty detector.<br>Layer CR: 1 unit, 48 inhibitory connections each from layer TS and TB, 1 excitatory connection from layer CE. Fires if no novel stimuli features are detected. |
| | | | RC TB | RXA 48<br>0.2 1.0 | | |
| | CR | 0.3 | RC TS | RX 48<br>0.1 1.0 | | |
| | | | RC TB | RXA 48<br>0.1 1.0 | | |
| | | | RC CE | RX 1<br>0.1 1.0 | | |
| ET | ET | 0.91 | RM RX | RXA 32<br>0.2 1.5 | OP | 16 units (1 × 1 grid), 32 connections each from widespread regions in $R_2$ and $R_M$. Inputs from both $R_2$ and $R_M$ are required to fire a unit. |
| | | | R2 RX | RXA 32<br>0.2 1.5 | | |
| OP | OP | 0.91 | ET ET | RUP 8<br>0.2 1.5 | RX | 16 units (1 × 1 grid), 32 excitatory connections from ET, 8 excitatory connections from $R_M$, layer RX. Two inputs are required to fire a unit. |
| | | | RM RX | RUP 32<br>0.2 1.5 | | |
| RG | X2 | 0.5 | RG X1 | RXA 4<br>0.1 1.0 | SG | 12 units arranged in 3 layers. Form oscillatory circuit. |
| | X1 | 0.5 | OP OP | RUP 4<br>0.1 0.7 | | |
| | | | RG X3 | RXA 4<br>0.1 1.0 | | |

TABLE I-continued
PROPERTIES OF REPERTOIRES

| | | | | | |
|---|---|---|---|---|---|
| X3 | 0.5 | RG X2 | RXA 4 | | |
| | | | 0.1 1.0 | | |

Note
The connection strengths of afferents in underlined type are modifiable, under the heterosynaptic influence of a value scheme if one is listed. The e/i ratios for certain connection types give the ratio of the number of excitatory to the number of inhibitory connections. An excitatory connection cannot become inhibitory by amplification, or vice-versa.
[1]The following abbreviations are used in the listing of the afferent connections:
VJ Kinesthetic sensors from arm joints
VW Kinesthetic sensors of visual sensor motions
VT Touch
Vn Value scheme n
All other names or repertoires, or, where a repertoire has more than one cell type, and the connections distinguish between these cell types, the name of the repertoire is followed by the name of the cell type.
Geometrical and modulatory connections are described in the comments in the right-hand column or in the main text.
[2]Method of generation and number of connections. The following abbreviations are used to describe the method of generation of $c_{ij}$ for each connection type:
L gradients of "motor maps" are generated
M specified matrices are used
R random numbers are used
The following abbreviations are used to describe the method of generating the first $l_{ij}$ of each connection type to each cell (the meanings of these terms have been given above):
E external
F float
G group
J joint
N normal
O other
T topographic
S scanned topographic
U uniform
X systematic
The following abbreviations are used to describe the method of generating $l_{ij}$ after the first one for each connect type (These abbreviations are omitted where there is only one connect of the given type):
A adjacent
B boxed
C crow's foot
D diagonal
I independent
P partitioned
$\theta(k)$, om(k) [paren same as subscript] represent the threshold and scale factor described in the text.
[3]— indicates inhibitory connections; ± indicates mixed excitatory and inhibitory.

TABLE II
PROPERTIES OF RCI MODEL REPERTOIRES

| REPERTOIRE | MAJOR PROPERTY | AFFERENTS | EFFERENTS | CONNECTIVITY DETAILS |
|---|---|---|---|---|
| "LGN" | ON-Center Off-Surround | Input Array | "4Cα" | 1 pixel excitatory center, 3 × 3 inhibitory surround. |
| "4Cα" | Orientation Selectivity | "LGN" | "4B-Dir" "4B-Orient" | 5 × 5 connection matrix for Horiz. & Vertical orientations; 7 × 7 matrix for obliques. Temporally delayed inhibition in null direction. |
| "4B-Dir" | Directional Selectivity | "4Cα" Direction | Comparator | Two types: first type gets excitatory inputs from 2 adjacent "4Cα" units, one input is temporally delayed and displaced in preferred direction. Also receives inhibition from 5 × 5 units in the "4Cα" repertoire selective for null direction. Second type sums inputs from 3 such units whose orientation preference span 90° and reentrant connections from Direction repertoires. |
| "4B-Orient" | Orientation Selectivity | "4Cα" | "4B-Term" Reentr. Confl. Occlusion | Excitatory inputs from 4 adjacent colinear units in "4Cα" and inhibition from surround. All 4 excitatory inputs are required to fire unit. |
| "4B-Term" | Orientation and polarity of line terminations | "4B-Orient" | Wide Angle | Local circuit excited by "4B-Orient" unit and inhibited by adjacent "4B-Orient" unit. |
| "4B-Term" (reentrant) | Same as "4B-Term" | Occlusion | Wide Angle | Similar to 4B-Term but on connections from Occlusion repertoires instead of "4B-Orient". |
| Reentrant Conflict | Responds to crossings of real and illusory contours | Occlusion "4B-Orient" Wide Angle | Occlusion Conflict | Excitatory connections from Occlusion and from the "4B-Orient" repertoires in the three most nearly orthogonal directions. Inhibitory inputs from orthogonally oriented "4B-Orient" repertoires and from Wide Angle repertoire. |
| Wide Angle | Broadens orientation selectivity | "4B-Term" | Term. Disc. Common Term. | 1 excitatory input from 3 "4B-Term" repertoires with adjacent directional preferences (e.g. N, NE, & NW) and by "4B-Term" (reentrant). |
| Common Term. Detector | Detects whether lines with orientations within 90° | Wide Angle | Term. Disc. | Connections from 2 Wide Angle repertoires with adjacent orientation preferences. Both inputs required to fire unit. |

TABLE II-continued
PROPERTIES OF RCI MODEL REPERTOIRES

| REPERTOIRE | MAJOR PROPERTY | AFFERENTS | EFFERENTS | CONNECTIVITY DETAILS |
|---|---|---|---|---|
| | terminate at a common locus. | | | |
| Termination Discontinuity | Responds to line terminations consistent with an occlusion boundary | Wide Angle Common Term. | Occlusion | Connections from linear strips (2 × 87) of units in each of 2 wide angle repertoires with opposite polarities, and from a single unit at corresponding position in one of the two Wide Angle repertoires. 1 inhibitory connection from Common Termination. |
| Direction Discontinuity | Responds to differential motion consistent with an occlusion boundary | Direction | Occlusion (motion) | Similar scheme to Termination Discontinuity repertoires but with inputs from Direction repertoires. Time constant of voltage decay is longer to allow short-term persistence of responses to moving objects. |
| Occlusion | Responds to real contours, occlusion borders, and illusory contours | Term. Disc. Occl. Confl. "4B-Orient" | Reentr. Confl. | 60 bipolar excitatory connections from units distributed along a line in TD repertoire. Single inhibitory connection from Occlusion Conflict repertoire. Excitatory connections from "4B-Orient". |
| Occlusion (motion) | Responds to occlusion borders based on structure-from-motion | Dir. Disc. | "4B-Term" (reentrant) | Similar connectivity to Occlusion repertoires on inputs from Direction Discontinuity repertoires. |
| Occlusion Conflict | Generates illusory contours between conflicting points found by Reentrant Conflict repertoire | Reentrant Conflict | Occlusion | Similar connectivity to Occlusion repertoire but on inputs from Reentrant Conflict repertoires. |
| Comparator | Compares motion in adjacent directions | "4B-Dir" | Direction | 5 × 5 unit excitation and 5 × 5 unit inhibition from "4B-Dir" repertoires with adjacent preferred directions. For each direction, there are 4 comparator units (e.g. N vs NE, N vs NW, N vs E, and N vs W). |
| Direction | Directional Selectivity | Comparator | "4B-Dir" Dir. Disc. | Sums inputs from 4 comparator repertoires with same preferred direction; 3 inputs needed to fire unit. |

Oculomotor Subsystem

The vision repertoire used for oculomotor control is known by the abbreviation VR. It comprises cell types RV and RI. RV cells have connections from the input array IA and geometrical connections from both RV and RI cells.

The following abbreviations are used to describe the origins of the various connections:

IA—Input array
VJ—Kinesthetic sensors from arm joints
VW—Kinesthetic sensors of visual sensor motions
VT—Touch
$V_n$—Value scheme n All others are names of repertoires and cell types also described in this section.

The RI cell type receives connections only from RV cells. The VR secondary repertoire therefore contains both excitatory and inhibitory layers of neurons. The inhibitory cells act to stabilize the overall level of activity independent of the size or brightness of the stimuli falling on the input array.

A colliculus-like repertoire SC is also defined to act as an intermediary between the visual repertoire VR and the oculomotor repertoire OM. It comprises cell types M2 and IN. M2 cells receive excitatory connections from RV cells and inhibitory geometrical connections from both M2 and IN cells. The IN cell type receives connections from M2 cells only. The inhibitory IN cells act to permit M2 cells to respond to only a single stimulus at any one time in a "winner-take-all" fashion. This inhibition is modulated by a falloff function which tends to favor stimulus objects whose image falls towards the center of the retina over objects located farther off-center. The SC repertoire has excitatory cells connected to ocular motor neurons OM adapted to cause motion of the optical sensor that visually senses objects and generates input data in response thereto. Modifications of these connections during training is heterosynaptically influenced by a value repertoire FO, which is arranged to respond more strongly a the amount of stimulation of the central area of the visual field of the visual sensor increases.

Reaching Subsystem

We now describe the repertoires concerned with reaching movements of arms. The motor cortex MC repertoire imitates motions of the single arm in the preferred embodiment. It comprises cell types MF (motor flexor cells) and ME (motor extensor cells). Both cell types receive excitatory connections from WD (object vision) and KE (joint kinesthesia). The two cell types are mutually inhibitory, and, in addition, they are inhibited by primary touch cells, reducing arm movement when an object is touched. The MC repertoires drive opposing "muscle systems" and are adapted to cause gestural motions by the arm initiated by noise or by input from vision and arm kinesthesia. By selecting gestural motions from an a priori repertoire, these robotic control systems avoid the necessity to make a detailed mathematical analysis of the kinematics and dynamics of robot joint motion and to program each and every motion of each joint.

A mechanism based on the structure of the cerebellum of the brain is used to "filter out" inappropriate motions in such a system, leading to selection of the most useful motions. Such systems will automatically optimize their motions for the particular mix of motions which they are most commonly asked to perform. By using value schemes that include a term that reduces value in proportion to the energy consumed in driving a limb, the system can find optimal motion strategies that minimize energy consumption.

Output from the MC repertoires is passed to a similarly opposing pair of cell types, RF and RE, in a repertoire IN, which represents an intermediate nucleus which corresponds in function to basal ganglia in the brain. The RF and RE cell types form a mutually inhibitory pair. This IN "intermediate" repertoire is adapted to receive excitatory signals from the motor cortex MC and inhibitory signals from the PF and PE cells of the model cerebellum, which are responsible for the inhibition of ineffective gestures that are initiated from time to time by the MC.

The model cerebellum consists of repertoires GR, IO, and PK. The "granule cell" repertoire GR comprises cell type G1 (granule cells). This repertoire is adapted to correlate the configuration of the arm in space (sensed by connections from KE) with the position of a target object (sensed by connections from HD).

The "inferior olive" repertoire IO comprises cell types IE and IF, which receive inputs from the motor cortex, modulated by the value repertoire to be described. IO cells are adapted to provide drive to PK cells at an early state of training, before appropriate specific connections; from GR cells to PK cells have been selected. The IO inputs to PK cells do not in themselves carry information concerning the conditions of a particular reaching event, but rather they provide undirected initial activity which provides a basis for operation of the selective learning mechanism of this invention.

The "Purkinje cell" repertoire PK comprises cell types PF (associated with arm flexors) and PE (associated with arm extensors). Both cell types receive mixed excitatory and inhibitory connections from G1 cells, excitatory connections from IO cells, and PF and PE are themselves mutually inhibitory. This repertoire implements a portion of the cerebellum and acts to inhibit inappropriate signals passing through the IN repertoire.

Finally, signals controlling the reaching motions of the arm pass from the IN repertoire to the SG repertoire, representing spinal ganglia. This repertoire also comprises two cell types, SF and SE, which are mutually inhibitory. The SG repertoire provides a point where motion-control signals relating to tracing motions and swatting motions of the arm may be combined with signals relating to reaching. As in MC and IN, the cell types relating to flexor and extensor motor means are mutually inhibitory, in order that contradictory motions of flexor/extensor muscle pairs may be suppressed and not transmitted to the arm muscles.

A value scheme for the training of reaching motions is provided by repertoires HV, WD, and VALUE. HV is adapted to respond to visual images of the automaton's hand, WD is adapted to respond to visual images of objects in the environment, and VALUE combines inputs from these tow visual areas by means of overlapping mappings and the use of a high firing threshold in such a way that output is maximized when the arm is near the object. VALUE output provides heterosynaptic bias for the selection of connections between WD and MC, between KE and MC, and between PK and IN and also provides modulatory input to IO, as shown in FIG. 14 and in table I.

Tracing Subsystem

Touch sensors are used to guide exploration of objects in the environment by the arm, providing kinesthetic signals which are the second input (along with vision) to the classification couple to be described below. Under the control of this subsystem, the arm traces the edges of arbitrarily shaped objects.

The arm assumes a straightened "canonical" exploratory position (see FIG. 13) when touch sensors signal that it has contacted an object. In this position, all joints except the shoulder are immobilized, and the shoulder acts as a universal joint, permitting motions in vertical and horizontal directions.

Exploratory motions are generated initially in random directions by spontaneous neural activity in motor repertoire $T_M$ (FIG. 13). These random motions are biased by touch signals in two ways to produce coordinated tracing: (1) Touch receptors are responsive to varying pressure across the receptive sheet at the end of the arm. A pressure gradient sensed in a particular direction by one of the repertoires E1-E4, receiving connections from TH, acts to enhance motor activity in perpendicular directions, thus biasing the arm motions to trace along the edges of objects. (2) When pressure decreases, repertoire TC acts along direct connections to $T_M$ to inhibit the current direction of motion and enhance its opposite, ending to bring the arm back into contact with the object when it wanders away.

Categorization Subsystem

We now proceed to a description of the repertoires involved in the categorization of stimulus objects by the reentrant combination of visual and kinesthetic cells.

The LGN (lateral geniculate nucleus) repertoire has ON and OFF type neurons, such that the LGN ON neurons are adapted to respond only to regions of the visual field where a central spot of light (light ON) is surrounded by a dark area; conversely, LGN OFF neurons respond to a central point with light OFF surrounded by a lighted area.

The R repertoire comprises cell type FD (feature detectors), which receives input from LGN ON and OFF cells. The R repertoire is adapted to respond to vertical, horizontal, or oblique line segments.

The $R_2$ repertoire comprises cell types E2 and RX. The E2 cell type receives connections from R FD cells and has excitatory reentrant connections from itself. The RX cell type receives connections from E2; from RM RM (the key reentry for categorization); and from RC CR trigger cells. The $R_2$ repertoire is connected to overlapping regions in the R repertoire so that E2 cells respond to combinations of features in different positions of the input array.

The MT ("motion trace") repertoire comprises cell types M1, M2, Modifying substance, and MB. M1 and M2 cells provide, respectively, delayed and prompt responses to kinesthetic signals from the universal joint, relayed via primary kinesthetic repertoire KE. Modifying substance cells have excitatory connections from a common direction of motion signalled by both M1 and M2 cells and are inhibited by other directions of motion; they accordingly respond to smooth contours of an object being traced. MB cells have similar connections, but with the excitatory and inhibitory contributions from the delayed kinesthetic M1 cells reversed, so that MB cells respond most strongly to "bumpy" contours of an object being traced. Both Modifying substance and MB cells are inhibited by the trigger repertoire so that motion trace output is not generated during the stage of active response to an object after it has been traced.

The $R_M$ repertoire comprises cell types RM and RX (reentry cells). $R_M$ cells are adapted to respond to various combinations of rough and smooth contours signalled by their inputs form MT cells. This activity builds up LTP in these cells so they can be fired more easily by later input from the RC triggering repertoire. RX cells receive input form $R_M$ cells, as well as reentrant input form $R_2 E2$ cells. It is the combined action of these tow inputs in RX (as well as the symmetrical combination of $R_M RX$ and $R_2 E2$ inputs in the RX cells of the E2 repertoire) that generates neural firings that signal the category of an object to the output response system to be described next. This output is permitted only when input form the RC trigger repertoire is also present at RX cells.

Rejection Subsystem

A triggering network is provided to end tracing by detecting novelty in the $R_M$ responses and integrating the appearance of novelty over time to recognize the completion of a trace. The triggering network repertoire RC comprises cell types TS, TB, CR, and CE. The TS and TB layers are stimulated respectively by smooth or rough $R_M$ units but have long refractory periods that prevent them from resuming activity until some time after stimulation. In such an embodiment, the tracing apparatus depicted in FIG. 13 is omitted, and the MT repertoire is equipped with inputs from an alternative visual repertoire, designed similarly to the R repertoire already described, but containing feature-detecting cells with larger visual fields that are capable of responding to contours rather than short segments of contours, and other cells capable of responding to contours that are joined or otherwise correlated in various ways. This alternative visual system provides inputs to the classification couple that is of a similar nature to that provided in the preferred embodiment by the kinesthetic trace system. These arrangements lead to firing in the CR layer only when there is no activity in the CE layer, a situation which occurs when no novel tactile features have been detected by MT cells for some time. The output of the triggering network is coupled to $R_2$ and $R_M$, where it re-excites units previously stimulated during examination of the stimulus. As a result, activation of $R_2$ and $R_M$ by neural events occurring independently in the two repertoires—a so-called reentry—brings about categorization. As a result, in the preferred embodiment rough-striped physical objects are sorted.

Repertoires ET, OP and RG complete the rejection subsystem. Cells in ET receive input from RX cells in both $R_2$ and $R_M$ repertoires. These inputs are active only when triggering has occurred, as just described. Various ET cells respond to various combinations of $R_2$ and $R_M$ activity, and thus enable the automaton to respond to a variety of categories. OP cells receive inputs from ET, and thus can be tuned to respond to one category or another by selection based on a value scheme. The RG repertoire, when triggered by inputs form OP, produces an oscillatory motion of the arm which may be directed to reject objects of a particular class which the user of this invention might wish to have rejected, for example, an object that is visually striped and bumpy.

The simulation of the present invention incorporates reentrant signaling. Reentry refers to parallel and recursive ongoing signaling between two or more mapped regions along ordered connections. Reentry is a mode of interconnection and signalling along such connections that permits mappings between sensory signals and neuronal responses to objects and events in the environment to organize spontaneously. Reentry further provides a means for the correlation of representations in diverse sensory modalities, permitting consistent responses to be established and maintained without specific programming. Classification n-tuples are collections of n neuronal repertoires joined by reentry to give classification of stimuli based on correlations of signals in all of the component repertoires. Such classifications are more powerful than can be accomplished by any one repertoire alone because they take into account combinations of features represented in the various elements of the n-tuple. Classification n-tuples could be based on data from diverse sensors that are normally difficult to combine, e.g. optical, sonar, radar sources.

The automaton is designed so that sensory signals triggered by the stimulus remain distributed among multiple, functionally segregated areas. Integration of these signals is achieved by reentry. This controlled form of interaction through reentry, as opposed to direct connection of signals from different sensory modalities to a common sensory repertoire, permits each modality to retain the distinctive features of its responses despite the possible presence of confounding juxtapositions of features in other modalities. Each modality thus retains the ability to distinguish stimuli to which it has a distinctive response.

C. Calculating Cell Activity Values

A relatively small number of parameters controls the properties of the simulation in the preferred embodiment. Each unit is a simplified model neuron or cell which nonlinearly sums inputs from other units. The output of a unit, which generally corresponds to the average firing rate of a single neuron, is given by:

$$s_i(t) = \{(A+G+M)\phi(I_s)\}\phi(D)+N+W$$

where (Greek letters are used for adjustable parameters; Roman letters for dynamic variables):

$s_i(t)$ = state of cell i at time t

A = total input from specific connections = $\Sigma_k \Sigma_j c_{ij}(s_{1ij}-\Theta_E)$, $c_{ij}$ = strength of connection from input j to cell i ($c_{ij}>0$, excitatory; $c_{ij}<0$, inhibitory), $1_{ij}$ = index number of cell connected to input j of cell i, $\Theta_E$ = excitation threshold ($s_{1ij}<\Theta_E$ ignored), k = index over connection types, j = index over individual connections, G = total geometrically defined input = $\Sigma_k \beta_k \Sigma_j (s_{gij}-\Theta_G)$, $\beta_k$ = strength of connections from ring k around cell i, $g_{ij}$ = index number of cell connected to geometrically defined input j of cell i, $\Theta_G$ = activity threshold for geometric inputs ($s_{gij}<\Theta_I$ ignored), M = total modulatory input, defined similarly to G except all cells in the source layer are included with equal weights, $I_S$ = total shunting inhibition, sum of all specific and geometric inputs designated as shunting inputs (shunting inhibition multiplies the excitatory terms (A+G+M) and is thus able to overcome any amount of excitatory input to a group. Accordingly it is of critical importance in assuring the stability of repertoires), D = depression = $\mu_D s_i(t-1) + \Omega_D D(t-1)$, $\mu_D$ = growth coefficient for depression, $\Omega_D$ = decay coefficient for depression. When $D > \Theta_{Dm}$, where $\Theta_D$ is a refractory threshold, then $\phi(D)$ is set to 0 for a specified number of cycles, after which D is set to 0 and $\phi(D)$ returns to 1.0, N = noise, which may be shot noise or Gaussian noise, W = decay term = $\Omega s_i(t-1)$, and $\phi(x)$ = sigmoidal function, approximated as $\phi(x) = 1 - 2x^2 + x^4$ The entire collection of terms $\{(A+G+M)\cdot\phi(I_s)\}\phi(D)$, as well as the input from each individual connection type (which may be thought of as the input to a local region of a dendritic tree), must exceed a given firing threshold or it is ignored. These connection type thresholds, $\Theta_K$, are modulated by long-term-potentiation (LTP) according to:

$$\Theta_K' = \Theta_K - \sigma_L L$$

$$L = \Omega_L L(t-1) + \mu_L(s_i(t-1) - \Theta_L) + \Sigma_k \mu_{Lk} \cdot (\pm A_k - \Theta_{Lk})$$

where:

$\Theta_K'$ = modified value of connection type threshold $\Theta_K$, $\sigma_L$ = LTP scaling factor, L = LTP value, $\Omega_L$ = decay coefficient for LTP, $\mu_L$, $\mu_{Lk}$ = homo- and heterosynaptic growth factors for LTP, $\Theta_L$, $\Theta_{Lk}$ = homo- —and homo- and heterosynaptic LTP action thresholds, $A_k$ = total input from connection type k. $\sigma_L$ may be negative to implement long-term depression; unlike the D (normal depression) term, the LTP term may have different effects on different afferent connection types.

This method of calculating cell responses incorporates several advances over the prior art. First, the MAX and MIN connection-type specific constraints make it possible to design cell types with multiple input classes while preventing any one of the inputs from dominating the responses of the cell type as a whole. Suitable adjustment of these parameters makes it possible to design cell types which have properties which are a generalization of the well-known electronic devices known as "AND" and "OR" gates, in which, respectively, more than one input or any one input must be active for the unit as a whole to be activated. The generalization referred to here is that each single input to an "AND" or "OR" gate is here replaced by the combined input of an entire class of connections, each weighted and thresholded as given in the equation just presented. Second, the provision of "shunting"-type inhibition makes it easier to design networks which are intrinsically stable. Third, the depression-like term makes it possible to design automata which have a selective form of attention in which response automatically shifts from one stimulus to another as the depression term takes effect to reduce any response which is maintained for a certain length of time. Fourth, the division of inputs into specific, geometric, and modulatory classes reduces the burden of computation significantly for those inputs which meet the more restrictive geometric conditions of the non-specific classes. (Mathematically, all three types could be expressed by the equation for the most general type, namely, the "specific" connection type.)

In a preferred embodiment, the strength of a synapse or connection from cell j to cell i (denoted $c_{ij}$) is modified during the course of training of the apparatus of this invention in accord with the following equation:

$$c_{ij}(t+1) = c_{ij}(t) + \delta \cdot \phi(c_{ij}) \cdot (<s_i> - \Theta_j) \cdot (m_{ij} - \Theta_j) \cdot (v - \Theta_V) \cdot R$$

where:

$\delta$ = amplification factor, a parameter which adjusts the overall rate of synaptic change, $<s_i>$ = time-averaged activity of cell i, calculated according to $$<s_i(t)> = d \cdot s_i(t) + (d-1)<s_i(t-1)>$$

where d = damping constant for averaged activity, $\Theta$ = amplification threshold relating to postsynaptic activity, $m_{ij}$ = average concentration of postsynaptic "modifying substance" produced at a connection made on cell i by cell j according to $$m_{ij}(t) = m_{ij}(t-1) + u_M \cdot s_j - \text{Min}(T_M \cdot m_{ij}(t-1), T_M^o),$$

where $u_M$ = production rate for $m_{ij}$, $T_M$ = decay constant for $m_{ij}$, $T_M^o$ = maximum decay rate for $m_{ij}$ ($m_{ij}$ may be replaced simply by $s_j$ if no time lapse occurs between activity and selection), $\Theta_j(k)$ = amplification threshold relating to presynaptic activity, v(k) = magnitude of heterosynaptic input from relevant value scheme neurons, $\Theta_V$ = amplification threshold relating to value, and R = rule selector. R may be set to +1, 0, or −1 independently for each of the eight combinations of the signs of the three thresholded terms in the amplification function, giving a total of $3^8 = 6561$ possible amplification rules. Positive values of R lead to enhancement of connections with correlated pre- and post-synaptic activity (selection); negative values of R lead to suppression of such connections (homeostasis). By choosing a particular rule, it is possible to simulate any of a wide variety of different kinds of synapses, with properties corresponding, for example, to those that might be seen with different neurotransmitters. Typically, we choose a rule in which R is +1 when $(v - \Theta_v) > 0$ and either of $(s_i - \Theta_j)$ or $(m_{ij} - \Theta_j) > 0$, i.e. when a value signal is present, a synapse is strengthened when both presynaptic and postsynaptic cells are active, but weakened when one is active and the other is not.

The synaptic modification rules used in the present invention, and represented by the above equation, deviate from the prior art and particularly from the well-known Hebb rule, in several significant ways: First, the heterosynaptic factor $(v - \Theta_v)$, which is tied to a value scheme, is introduced. This term allows the synaptic change in one part of a network to be influenced by events elsewhere. It allows a selective neural network to learn, as opposed to merely to train. A system having this property can improve a performance that occurs spontaneously, or, given an appropriate conditioning paradigm, it can learn to keep what is presently rejected and vice versa. Second, the use of the time averaged post synaptic activity $<s_j>$ in place of the current activity $s_j(t)$, and the use of the "modifying substance", $m_{ij}$, in place of the current synaptic weight, $c_{ij}$, makes it possible for the system to learn in the normal situation in which the completion of an action, and its evaluation by a value scheme, occur after the cessation of the neural activity which caused that action. The $<si>$ and $m_{ij}$ variables provide a localized "memory" of neural firing conditions so that synaptic modification may be applied to connections that played a causative role (excitatory or inhibitory) in a particular behavior after that behavior has been evaluated. These delayed evaluations are important to selective learning of behaviors that involve sequences of actions, for example, reaching followed by grasping. Third, the uses of the rule selector 'R' work with the newly introduced value factor $(v-\Theta_v)$, providing either enhancement or repression of responses associated with various combinations of presynaptic activity, postsynaptic activity, and value.

Operation of the Repertoires Comprising the Automaton

Further details of the operation of the individual repertoires implemented in the preferred embodiment are as follows:

The preferred embodiment in operation depends on motions of the visual sensor means for target location and selection. As show in FIG. 11, these motions are controlled by an "oculomotor" subsystem. VR, a retinal-like visual repertoire, contains two layers of cells, excitatory and inhibitory. It is mapped to the SC repertoire, which controls visual sensory movements. SC has its excitatory cells connected directly to four collections of ocular motor neurons, OM, with random strengths, and with inhibitory connections between opposing motions. The value scheme for visual sensor motion responds weakly to light in the periphery and more strongly to light in the central region, thereby implementing in a simple fashion the behavioral criterion "bring the sensor towards bright spots and fixate upon them". This value scheme provides a heterosynaptic input that modulates the modification of connections from SC to OM. Activity in these connections simulates the formation of a slowly decaying modifying substance. Connections, $m_{ij}$, that have been active during any kind of motion are labelled by this modifying substance until it decays as specified by the parameters $T_M$ and $T_M^o$. Connections so labelled are amenable to undergo long-lasting changes. As a result of activity occurring shortly before centering on an object and consequent activation of the value repertoire, these connections are selected and strengthened. In this way, selection acts on neuronal populations after their activity has produced an effect.

The MC repertoire generates primary gestural motion spontaneously or in response to sensory input from vision and arm kinesthesia. Its output is transmitted to IN (intermediate nucleus). IN sends connections via SG to four sets of motor neurons, one for each joint in the arm, organized in extensor/flexor pairs.

Target vision and kinesthetic inputs give rise to diffuse and fast-changing firing patterns in GR units. Each GR pattern correlates an actual configuration of the arm in space with a target position.

GR units connect densely to PK units. Connection from GR to PK associate positions of the arm and target with patterns corresponding to primary gestures that arise from MC and reach PK via repertoire IO, which is patterned after the inferior olive. Activity in PK inhibits activity in IN and filters out inappropriate gestures from patterns transmitted to IN from MC. Thus, the combined MC, GR, IO, PK, and IN networks embed a reentrant signalling loop.

The reaching subsystem has a value system so that the neurons respond more actively as the moving hand approaches the vicinity of the foveated target object. These neurons receive input from two areas responsive to objects in the environment and to the hand of the automaton. These inputs arborize in overlapping fashion over the surface of the value network. Therefore correlated activity, indicating nearness of the hand to the object, is required for a vigorous response. The response of the value network increases a the hand approaches the target and the degree of overlap in the mapped inputs increases.

The value repertoire activity is carried to the IO network. Bursts in the value repertoire associated with gestural motions bringing the hand near the target activate IO units that have already received subthreshold excitation from MC. Thus activity in IO depends on recent activity in MC. IO activity is carried to the PK cells.

The invention in this particular embodiment allows connections from "parallel fibers" converging on PK units to be amplified when PK cells are excited from the IO due to a gesture that is in the process of being selected. After repeated amplification, the "parallel fibers" are capable of exciting PK units on their own, and thus acquire the ability to "preset" the pattern of PK cell activity even before a gesture is initiated in MC. The output of these PK cells is available for "filtering" gestures in IN just before they happen.

Activity in the value repertoire is also carried to MC. Active connections relating the position of the visual target to particular gestures are amplified according to value. Synaptic populations whose activity is associated with motions closer to the object are selectively favored in these modifications.

Once the arm has reached a particular object, tracing motion begins with the objective of providing supplementary information which is combined with visual signals in a "classification couple" for the purpose of categorizing the object.

The arm assumes a canonical exploratory position when it touches an object, in which all joints except the shoulder are immobilized. This is done in the simulations to reduce the burden of training the motor system to generate tracing motions using all the degrees of freedom available to the model arm: in a real robot, there is no canonical exploratory position and the arm is trained to perform tracing in the same way that it is trained to perform reaching. The arm traces the edges of arbitrarily shaped objects, making fine, non-ballistic motions. The edges are sensed by the kinesthetic receptors. Exploratory motions are generated in random directions, biased by touch signals to produce coordinated tracing. That is to say they are biased to move in directions parallel to edges sensed by touch to trace along such edges; and they are biased to change direction when the pressure drops. Tracing proceeds along the edges until interrupted by a burst of activity in the reentrant categorization system.

As an alternative embodiment vision may be used alone without the arm. In such an embodiment, the tracing apparatus depicted in FIG. 13 is omitted, and the MT repertoire is equipped with inputs from an alternative visual repertoire, designed similarly to the R repertoire already described, but containing feature-detecting cells with larger visual fields that are capable of responding to contours rather than short segments of contours, and other cells capable of responding to contours that are joined or otherwise correlated in various ways. This alternative visual system provides inputs to the classification couple that is of a similar nature to that provided in the preferred embodiment by the kinesthetic trace system.

The repertoires involved in categorization comprise the following:

An LGN (lateral geniculate nucleus) repertoire has ON and OFF cells. LGN ON cells have excitatory center-inhibitory surround receptive field structures. They are connected topographically to an R network, which responds to vertical, horizontal, or oblique line segments, and thereby forms an image that emphasizes edges of objects. The R network signals to $R_2$ which receives connections from large overlapping regions in R, therefore losing details of the appearance of the object, but $R_2$ is responsive to combinations of features that may be used to characterize an object.

$R_M$ is a repertoire dealing with motor patterns. In the version described, it responds to two shapes, smooth and rough. Inputs come from kinesthetic receptors in the touch-exploration motor system. Smooth-sensitive cells respond strongly when tracing continues in a single direction and are inhibited when the direction of trace changes. Rough-sensitive cells respond strongly when tracing continually changes direction and are inhibited when the direction remains constant. Cells of both types are provided with maximal responses for each of eight principal directions of tracing.

A triggering network, which ends tracing, detects novelty in the $R_M$ responses and integrates the appearance of novelty over time to recognize the completion of a trace. Four layers are implemented. The first two are stimulated by rough or smooth $R_M$ units but have long refractory periods that prevent resuming activity until some time after stimulation. These units are combined in the third layer, and the third layer inhibits the fourth, which has a high level of spontaneous activity (noise). Cells in the fourth layer thus become active, and trigger the overall response of the whole system, when novel activity ceases to be detected in the first layers.

The trigger response is coupled back to $R_2$ and $R_M$. It acts there to re-excite units previously stimulated during examination of the stimulus. Activation of $R_2$ and $R_M$ by neural events occurring independently in the two repertoires constitutes reentry and is the decisive step in categorization. Only upon coactivation of appropriate visual groups in $R_2$ and correlated kinesthetic groups in $R_M$ after a trace of the object has been completed is a categorical response elicited. A rough-striped object generates a reflex oscillation that swats the object away. The system could be trained at will to recognize other categories of objects for rejection.

It should be understood that although the invention has been presented in detail for a particular embodiment it is not so limited and the full scope of protection afforded by this patent is determined by the following claims.

We claim:

1. An apparatus for categorizing objects in an environment according to sensory input data relating to those objects and for sorting the objects in accord with such categories comprising one or more sensory means for sensing input signals, each of said sensory means identified with a specific sense function, processing means for receiving said input signals, for categorizing objects according to said input signals and for generating output signals in response to said input signals, output effector means for receiving said output signals and for sorting said objects in response to said output signals, each of said output effector means identified with a specific motor output function, said processing means comprising a plurality of cells, each of said cells characterized by a state of activation determined by a response function, a plurality of synapses, each of said synapses comprising a unidirectional connection between one of said cells and one of said sensory means, output effector means or another of said cells and each of said synapses having a strength capable of differential modification determined by a selective learning rule, a plurality of groups of cells, each of said groups comprising a collection of cells connected more strongly among themselves than they are connected to cells in other groups, a plurality of sensory repertoires each corresponding to one of said sense functions and each comprising collections of said groups, interconnected by mappings comprising synaptic connections, a plurality of motor repertoires each corresponding to one of said motor output functions and each comprising collections of said neuronal groups interconnected by mappings composed of synaptic connections, a plurality of value repertoires, each connected to one or more of said sensory repertoires or to other cells and capable of responding differentially to changes in the environment signaled by said input signals caused by the actions of the said output motor function, and each comprising collections of aid neuronal groups interconnected by mappings composed of synaptic connections, wherein said groups of cells comprise one or more primary repertoires of variant, overlapping response selectivities prior to selection by heterosynaptic input from said value repertoires, and comprise after selection secondary repertoires of such selectivities adapted to perform a particular categorization task and to perform particular output actions upon the categorization of certain types of objects, a plurality of processing repertoires, each connected to one or more of said sensory, motor and value repertoires by synaptic connection to form mappings, a plurality of reentrant signaling means between said neural mappings wherein during operation of said apparatus each sensory repertoire receives signals derived from at least one of said sensory means and outputs signals to at least one of said output effector means and the modification of said synaptic strengths alters the contributions of one or more neuronal groups to behavior providing integrated sensory and motor behavior, said neural mappings connected by reentrant signaling comprising classification n-tuples, wherein the apparatus is adapted to carry out categorization of the objects.

2. The apparatus of claim 1 for sorting the said objects in accord with categories established from characteristics of input data and wherein said repertoires comprise
vision system means,
reaching system means,
touch system means,
reentrant categorization system means, and
response system means.

3. The apparatus of claim 2 for establishing categories of objects and sorting the objects in accord with such categories wherein
said vision system comprises a scanning visual input device, and a foveation and fine-tracking oculomotor system,
said reaching system comprises a multi-jointed arm having a set of movement means and neuronal repertoires subserving the control of said arm causing it to reach out to such objects in order to trace or grasp them for sorting, and
said touch system comprises a tactile system means using a second set of movement means in said arm.

4. The apparatus of claim 1 for establishing categories of objects and sorting the objects in accord with such categories wherein each of said repertoires comprises cells having connections selected from among the following connections
connections chosen by a specific rule, and individually enumerated, such as connections forming a topographic mapping,
connections having a specified density-distance relationship, in which all cells in any group lying in a square band at a certain distance from a given target cell are connected with a given equal weight to said target cell, and
connections receiving input corresponding to the average activity of all cells in a specified source layer.

5. The apparatus of claim 1 for establishing categories of objects and sorting the objects in accord with such categories wherein each of said synapses has efficacies capable of differential modification dependant upon the state of synapses on the same cell.

6. The apparatus of claim 1 for establishing categories of objects and sorting the objects in accord with such categories wherein each of said synapses has efficacies capable of differential modification dependant upon the strength of a reentrant response.

7. The apparatus of claim 1 for establishing categories of objects and sorting the objects in accord with such categories wherein each of said synapses has efficacies capable of differential modification for the selection of connections receiving temporally correlated inputs.

8. The apparatus of claim 1 for establishing categories of objects and sorting the objects in accord with such categories wherein each of said synapses has efficacies capable of differential modification that includes a rule selector factor to generate value-dependent synaptic modifications for different connections.

9. The apparatus of claim 1 for establishing categories of objects and sorting the objects in accord with such categories wherein said repertoires are connected by pathways of signals and said reentrant signaling means comprises backwards connections from a repertoire to prior repertoires in one of said pathways.

10. The apparatus of claim 1 for establishing categories of objects and sorting the objects in accord with such categories wherein said repertoires are connected by pathways of signals and said reentrant signaling means comprises parallel connections between repertoires in different pathways.

11. The apparatus of claim 1 for establishing categories of objects and sorting the objects in accord with such categories wherein said reentrant signaling means comprises reciprocal connections each exchanging cell activity signals in one direction between two repertoires.

12. The apparatus of claim 11 for establishing categories of objects and sorting the objects in accord with such categories wherein repertoires are connected by pathways of signals and said reentrant signaling means comprises reciprocal connections between two repertoires in different sensory pathways.

13. The apparatus of claim 1 for establishing categories of objects and sorting the objects in accord with such categories wherein aid value repertoires include sensory afferents or afferents from other parts of the nervous system, a both topographic and non-topographic mappings and efferents that heterosynaptically influence large populations of synapses.

14. An apparatus for establishing categories of shape and patterning of physical objects and sorting the physical objects in accord with such categories comprising
optical sensor means to visually sense said objects and generate input signals in response thereto,
tactile sensor means to sense said objects by touch, said means being installed on a jointed arm capable of reaching out to bring said tactile means into contact with said objects, and generating tactile signals in response thereto,
kinesthetic sensor means to sense the angular positions and motions of joints in the said jointed arm and generating kinesthetic signals in response thereto,
processing means for receiving input data, for categorizing said input data and for generating output data in response to said input data,
output means being adapted to receive said output data and to manipulate said objects in response to said output data,
said processing means comprising a plurality of processing elements and memory registers configured in such a way as to constitute
a plurality of synapses, each of said synapses having efficacies capable of differential modification of the strength of connections between pairs of said processing elements, said efficacies determined by an amplification function,
a plurality of groups of neurons, each of said neuronal groups comprising a repertoire of neurons and including said neuron's associated axonal and dendritic arborization patterns,
a value repertoire adapted to increase a value parameter when the optical sensory means moves towards regions having predetermined optical characteristics and fixates upon them, whereby said repertoire provides heterosynaptic input to synapses thereby modulating the modification of connections from SC to OM,
a VR visual repertoire of said neuronal groups containing excitatory and inhibitory layers of neurons, for the purpose of forming a neuronal mapping of visual signals produced by the said optical sensor means an SC repertoire having excitatory cells connected to ocular motor neurons OM adapted to cause motion of said optical means, an MC repertoire adapted to cause gestural motions by said arm spontaneously or from input from vision and arm kinesthesia, an IN intermediate repertoire adapted to pass signals from said MC repertoire to an SG repertoire which controls said arm, and being adapted to block outputs from MC which do not lead to desired motions of the arm upon receiving inhibitory signals from the PK repertoire, a GR repertoire adapted to correlate configurations of the arm in space with target positions, a PK repertoire connected to said GR secondary repertoire, adapted to cause inhibition of incorrect gestures of the arm by sensing inhibitory signals to the IN repertoire, an SG repertoire connected to said IN secondary repertoire, adapted to integrate control signals from the reaching and tracing subsystems, producing coordinated motions of the said arm in response to signals from either source, a plurality of reentrant signaling means between said repertoires, said VR repertoire being mapped to SC, said SC repertoire being mapped to OM, said IN intermediate secondary repertoire adapted to send signals to said SG repertoire, and to receive sensory input and primary gesture signalling from MC, said GR secondary repertoire connected to said PK secondary repertoire, via repertoire IO wherein the position of the arm and the physical object are associated with signals corresponding to primary gestures that arise from MC.

15. The apparatus of claim 14 for establishing categories of shape and patterning of physical objects and sorting the physical objects in accord with such categories further comprising an LGN (lateral geniculate nucleus) repertoire having ON and OFF type neurons, said LGN ON neurons being adapted to respond strongly only to spots of light surrounded by a relatively dark area, and said LGN OFF neurons being adapted to respond strongly only to spots of darkness surrounded by a relatively light area, an R repertoire containing groups of neurons having a field of view and adapted to respond to vertical, horizontal, or oblique line segments, or to line segments ending within the field of view of one of said neurons, or to line segments which change direction within the field of view of one of said neurons an $R_2$ repertoire connected to cells in common with cells in R, wherein response signals in $R_2$ represent combinations of elementary visual features detected by R, an $R_M$ secondary repertoire having inputs from kinesthetic receptors in the touch-exploration motor system, wherein $R_M$ responds to two textures, smooth and rough, an ET secondary repertoire having inputs from $R_2$ and from $R_M$ and adapted to enhance activity in response to combinations of visual and tactile sensory signals as represented in $R_2$ and $R_M$, said combinations corresponding to various categories of objects to which the system may, from time to time, have been trained to respond, a triggering network adapted to end tracing by detecting novelty (and its absence) in the $R_M$ responses and integrating the appearance of novelty over time to recognize the completion of a trace and producing a response upon the termination of said appearance of novelty comprising two layers of neurons stimulated by signals indicative of rough or smooth units by $R_M$ but having refractory periods that prevent the resumption of activity after such activity has become depressed until a time interval long enough for a motor response to occur after stimulation, a third layer of neurons, stimulated by either of the first two or both, and a fourth layer of neurons, having inhibitory connections with the first, having a high level of varying activity, said triggering network being coupled to $R_2$ and $R_M$, to re-excite groups previously stimulated during examination of the stimulus causing aid response signals, wherein activation of $R_2$ and $R_M$ by neural events occurring independently in the two repertoires constitutes reentry and brings about categorization, and wherein physical objects of a particular class are sorted by virtue of the generation of a response in the arm upon triggering only when it is the case that responses accumulated in the $R_2$ and $R_M$ repertoires during the period of visual and tactile examination corresponding to a particular category previously established by selective amplification of synaptic connections between $R_2$ and $R_M$ on the one hand and repertoire ET on the other.

16. An automaton to analyze critical problems involving the acquisition and change with time of integrated sensory and motor behavior comprising an input array on which two-dimensional patterns or visual scenes are represented, an assembly of repertoires of differential responding elements interconnected by mappings comprising synaptic connections that transform input patterns, an arrangement for coupling these networks to specified motor-output functions, means for detection of motion, comprising a connected assembly of cells, multiple inputs from the input array or directly from other sensory means, or from the outputs of groups of cells in the same or different repertoires, a single time-dependent scalar variable, which characterizes the state of each cell, and which is dependent upon the strengths of the inputs to that cell, each input multiplied by a synaptic strength, means for enabling selection in both sensory and motor control portions, wherein (a) mutual training is achieved of both sensory and motor control portions through encounter with an environment and (b) signal combinations are automatically selected during said training, an amplification function to alter the synaptic strength, of a connection according to the activity of pre- and postsynaptic groups, said rule providing for the weakening of connections between pairs of units of which one, but not both, are active, said rule providing for the strengthening of connections between pairs of units of which both, or neither, are active, said rule providing for modulation of the amount of synaptic change according to a heterosynaptic input which signals the success or failure of recent behavioral activity of the apparatus by increasing or decreasing the strength of the synapses as determined by a value repertoire.

17. The invention of claim 16 further comprising value repertoires, which through reentry favor the learning of activities of value, said value repertoires further comprising connectivities which predispose their constituent groups to respond to the sequelae of adaptive behaviors, sensory afferents, both topographic and non-topographic mappings, and efferents that heterosynaptically influence large populations of synapses.

18. An apparatus according to claim 16 comprising a processing means comprising neurons, each of which is characterized by a state of activation determined by a response function, and synapses, each of which has a unidirectional connection between two of the neurons, each of the synapses having an efficacy capable of differential modification of the strength of said synapses determined by a response function according to a selective learning rule.

19. An apparatus according to claim 16 having groups of neurons connected more strongly among themselves than they are connected to neurons in other groups, and neural maps, corresponding to one of the sense functions or one of said motor output functions, and comprising repertoies of neuronal groups, the input connections to which are so arranged that a correspondence exists between either locations in space or other properties sensed by the sensory means on the one hand, and locations in each of said neural repertoires, such that responses to different objects or to the same object in different locations tend to occur in different locations in each of said neural maps.

20. An apparatus according to claim 16 in which the modification of synaptic efficacies of cells alters the contribution of selected neuronal groups to behavior, thereby providing integrated sensory and motor behavior.

* * * * *